US012682418B2

(12) United States Patent
Arachchige Dona et al.

(10) Patent No.: US 12,682,418 B2
(45) Date of Patent: Jul. 14, 2026

(54) HIGH RESOLUTION HUMAN IMAGING USING NEURAL NETWORK

(71) Applicants:Sakila Sandeepani Jayaweera Samaranayake Arachchige Dona, College Park, MD (US); Sai Deepika Regani, Campbell, CA (US); Yuqian Hu, Greenbelt, MD (US); Guozhen Zhu, Greenbelt, MD (US); Wei-Hsiang Wang, College Park, MD (US); Beibei Wang, Clarksville, MD (US); K. J. Ray Liu, Potomac, MD (US); Oscar Chi-Lim Au, Rockville, MD (US)

(72) Inventors: Sakila Sandeepani Jayaweera Samaranayake Arachchige Dona, College Park, MD (US); Sai Deepika Regani, Campbell, CA (US); Yuqian Hu, Greenbelt, MD (US); Guozhen Zhu, Greenbelt, MD (US); Wei-Hsiang Wang, College Park, MD (US); Beibei Wang, Clarksville, MD (US); K. J. Ray Liu, Potomac, MD (US); Oscar Chi-Lim Au, Rockville, MD (US)

( * ) Notice: Subject to any disclaimer, the term of this patent is extended or adjusted under 35 U.S.C. 154(b) by 0 days.

(21) Appl. No.: 19/004,301

(22) Filed: Dec. 28, 2024

(65) Prior Publication Data

US 2025/0139738 A1 May 1, 2025

Related U.S. Application Data

(63) Continuation-in-part of application No. 18/401,684, filed on Jan. 1, 2024, and a continuation-in-part of
(Continued)

(51) Int. Cl.
G06T 3/4046 (2024.01)
G06T 3/4053 (2024.01)

(52) U.S. Cl.
CPC .......... *G06T 3/4046* (2013.01); *G06T 3/4053* (2013.01)

(58) Field of Classification Search
CPC ........ G06N 3/045; G06N 3/08; G06N 3/0464; G06N 3/0475; G06N 3/049; G06N 3/0455;
(Continued)

(56) References Cited

U.S. PATENT DOCUMENTS

2021/0192762 A1* 6/2021 Guan ...................... G06T 15/06
2022/0036539 A1* 2/2022 Brauer ................. G06N 3/0475
2024/0062061 A1* 2/2024 Bone ...................... G06N 3/049

OTHER PUBLICATIONS

Beibei Wang et al., "The Promise of Radio Analytics: A Future Paradigm for Wireless Positioning, Tracking, and Sensing", IEEE Signal Processing Magazine, vol. 35, No. 3, pp. 59-80, May 2018.
(Continued)

*Primary Examiner* — Zhiyu Lu
(74) *Attorney, Agent, or Firm* — Slater Matsil, LLP

(57) ABSTRACT
High resolution human imaging using neural network is described. In one example, a described method comprises: assembling a k1-dimensional (k1-D) imaging matrix by a processor based on arranging and concatenating a plurality of k2-dimensional (k2-D) input imaging matrices; encoding the k1-D imaging matrix by an encoder, which is a k1-D encoding neural network, to generate a (k1+k3)-D first intermediate matrix; generating a (k2+k3)-D second intermediate matrix based on the (k1+k3)-D first intermediate matrix; and decoding the (k2+k3)-D second intermediate matrix by a decoder, which is a k2-D decoding neural network, to generate a k2-D output imaging matrix. There is at least one skip connection between the encoder and the decoder. An imaging resolution of the k2-D output imaging matrix is greater than the imaging resolution of any one of the plurality of k2-D input imaging matrices.

30 Claims, 17 Drawing Sheets

100

Related U.S. Application Data application No. 18/401,681, filed on Jan. 1, 2024, and a continuation-in-part of application No. 18/395,543, filed on Dec. 23, 2023, and a continuation-in-part of application No. 18/395,539, filed on Dec. 23, 2023, and a continuation-in-part of application No. 18/395, 533, filed on Dec. 23, 2023, and a continuation-in-part of application No. 18/395,544, filed on Dec. 23, 2023, and a continuation-in-part of application No. 18/395,537, filed on Dec. 23, 2023, and a continuation-in-part of application No. 18/391,529, filed on Dec. 20, 2023, and a continuation-in-part of application No. 18/379,622, filed on Oct. 12, 2023, now Pat. No. 12,256,360, and a continuation-in-part of application No. 18/199,963, filed on May 21, 2023, and a continuation-in-part of application No. 18/108,563, filed on Feb. 10, 2023, and a continuation-in-part of application No. 17/960,080, filed on Oct. 4, 2022, and a continuation-in-part of application No. 17/959,487, filed on Oct. 4, 2022, now Pat. No. 12,272,375, and a continuation-in-part of application No. PCT/US2022/045708, filed on Oct. 4, 2022, and a continuation-in-part of application No. 17/838,244, filed on Jun. 12, 2022, now Pat. No. 12,216,190, and a continuation-in-part of application No. 17/838,228, filed on Jun. 12, 2022, and a continuation-in-part of application No. 17/838,231, filed on Jun. 12, 2022, and a continuation-in-part of application No. 17/827,902, filed on May 30, 2022, and a continuation-in-part of application No. 17/537,432, filed on Nov. 29, 2021, and a continuation-in-part of application No. 17/149, 625, filed on Jan. 14, 2021.

(60) Provisional application No. 63/721,406, filed on Nov. 15, 2024, provisional application No. 63/651,921, filed on May 24, 2024.

(58) Field of Classification Search
CPC .......... G06N 3/088; G06N 3/094; G06N 3/04; G06N 3/084; G06T 2207/20084; G06T 11/00; G06T 13/40; G06T 2207/30196; G06T 3/60; G06T 7/194; G06T 11/60; G06T 15/06; G06T 15/50; G06T 15/506; G06T 15/60; G06T 19/20; G06T 2207/10024; G06T 2207/20081; G06T 2219/2012; G06T 7/50; G06T 7/90; A61B 5/0042; A61B 5/026; A61B 5/055; A61B 6/032; A61B 6/037; A61B 6/481; A61B 6/50; A61B 6/507; A61B 6/5211; G01R 33/5601; G01R 33/5608; G01R 33/56366; G06V 40/10; G06V 10/454; G06V 10/80; G06V 10/82; G06V 20/44; G06V 20/52; G01W 1/10; G01W 2201/00; G06F 2119/06; G06F 30/00; G06F 30/27; G06F 30/36; G06F 30/373
See application file for complete search history.

(56) References Cited

OTHER PUBLICATIONS

Feng Zhang et al., "WiSpeed: A Statistical Electromagnetic Approach for Device-Free Indoor Speed Estimation", IEEE Internet of Things Journal, vol. 5, No. 3, pp. 2163-2177, Jun. 2018.

Feng Zhang et al., "WiBall: A Time-Reversal Focusing Ball Method for Decimeter-Accuracy Indoor Tracking", IEEE Internet of Things Journal, vol. 5, No. 5, pp. 4031-4041, Oct. 2018.

Chenshu Wu et al., "EasiTrack: Decimeter-Level Indoor Tracking with Graph-based Particle Filtering", IEEE Internet of Things Journal., vol. 7, No. 3, pp. 2397-2411, Mar. 2020.

Chenshu Wu et al., "RF-based Inertial Measurement", ACM SIGCOMM, Beijing, China, Aug. 19-24, 2019.

Wei-Hsiang Wang et al., "Device-Free Room-Level Localization with WiFi Utilizing Spatial-Frequency-Time Diversity," IEEE Internet of Things Journal, vol. 11, No. 21, pp. 35689-35698, Nov. 2024.

Chenshu Wu et al., "mmTrack: Passive Multi-Person Localization Using Commodity Millimeter Wave Radio", IEEE International Conference on Computer Communications, Beijing, China, Apr. 27-30, 2020.

Qinyi Xu et al., "Radio Biometrics: Human Recognition Through a Wall", IEEE Trans. on Information Forensics and Security, vol. 12, No. 5, pp. 1141-1155, May 2017.

Qinyi Xu et al., "Trieds: Wireless Events Detection Through the Wall", IEEE Internet of Things Journal, vol. 4, No. 3, pp. 723-735, Jun. 2017.

Chen Chen et al., "TR-BREATH: Time-Reversal Breathing Rate Estimation and Detection", IEEE Trans. on Biomedical Engineering, vol. 65, No. 3, pp. 489-501, Mar. 2018.

Fengyu Wang et al., "Respiration Tracking for People Counting and Recognition", IEEE Internet of Things Journal, vol. 7, No. 6, pp. 5233-5245, Jun. 2020.

Fengyu Wang et al., "ViMo: Multi-person Vital Sign Monitoring using Commodity Millimeter Wave Radio", IEEE Internet of Things Journal, vol. 8, No. 3, pp. 1294-1307, Feb. 2021.

Beibei Wang et al., "Green Wireless Communications: A Time-Reversal Paradigm", IEEE Journal of Selected Areas in Communications , special issue on Energy-Efficient Wireless Communications, vol. 29, No. 8, pp. 1698-1710, Sep. 2011.

Feng Zhang et al., "WiDetect: Robust Motion Detection with a Statistical Electromagnetic Model", Proceedings of the ACM on Interactive, Mobile, Wearable and Ubiquitous Technologies (IMWUT), vol. 3, No. 3, Article 122:1-24, Sep. 2019.

Yuqian Hu et al., Robust Passive Proximity Detection using Wi-Fi, IEEE Internet of Things Journal, vol. 10, No. 7, pp. 6221-6234, Apr. 2023.

Yuqian Hu et al., "DeFall: Environment-Independent Passive Fall Detection Using WiFi," IEEE Internet of Things Journal, vol. 9, No. 11, pp. 546-557, Jun. 2022.

Sai Deepika Regani et al., "FallAware: An Explainable Learning Approach to Robust Fall Detection with WiFi," IEEE Journal of Selected Areas in Sensors, vol. 2, pp. 71-83, Dec. 2024.

Feng Zhang et al., "SMARS: Sleep Monitoring via Ambient Radio Signals", IEEE Trans. on Mobile Computing, vol. 20, No. 1, pp. 217-231, Jan. 2021.

Wei-Hsiang Wang et al., "WIResP: A Robust Wi-Fi-Based Respiration Monitoring via Spectrum Enhancement," IEEE Sensors Journal, vol. 24, No. 13, pp. 20999-21011, Jul. 2024.

K. J. Ray Liu et al., "Wireless AI: Wireless Sensing, Positioning, IoT, and Communications," Cambridge University Press, 2019.

Chenshu Wu et al., "Wi-Fi Can Do More: Toward Ubiquitous Wireless Sensing," IEEE Communications Standards Magazine, vol. 6, No. 2, pp. 42-49, Jun. 2022.

K. J. Ray Liu et al., "Statistical Principles of Time Reversal [Perspectives]," IEEE Signal Processing Magazine, vol. 41, No. 1, pp. 31-37, Jan. 2024.

Chenshu Wu et al., "GaitWay: Monitoring and Recognizing Gait Through the Walls", IEEE Trans. on Mobile Computing, vol. 20, No. 6, pp. 2186-2199, Jun. 2021.

Sai Deepika Regani et al., "Driver Authentication for Smart Car Using Wireless Sensing", IEEE Internet of Things Journal, vol. 7, No. 3, pp. 2235-2246, Mar. 2020.

Qinyi Xu et al., "Wireless AI in Smart Car: How Smart a Car Can Be?", IEEE Access.

Fengyu Wang et al., "Driver Vital Signs Monitoring Using Millimeter Wave Radio," IEEE Internet of Things Journal, vol. 9, No. 13, pp. 11283-11298, Jul. 2022.

Xiaolu Zeng et al., "WiCPD: Wireless Child Presence Detection System for Smart Cars," IEEE Internet of Things Journal, vol. 9, No. 24, pp. 24866-24881, Dec. 2022.

(56)         References Cited

OTHER PUBLICATIONS

Guozhen Zhu et al., "Wi-MoID: Human and Nonhuman Motion Discrimination Using WiFi With Edge Computing," IEEE Internet of Things Journal, vol. 11, No. 8, pp. 13900-13912, Apr. 2024.

Guozhen Zhu et al., "SrcSense: Robust WiFi-based Motion Source Recognition via Signal-Informed Deep Learning," IEEE Journal of Selected Areas in Sensors, vol. 2, pp. 40-53, Dec. 2024.

Chenshu Wu et al., "mSense: Towards Mobile Material Sensing with a Single Millimeter-Wave Radio", PACM on Interactive, Mobile, Wearable and Ubiquitous Technologies (IMWUT), Virtual Online, Sep. 2020.

Feng Zhang et al., "mmEye: Super-Resolution Millimeter Wave Imaging", IEEE Internet of Things Journal, vol. 8, No. 8, pp. 6995-7008, Apr. 2021.

Sakila S. Jayaweera et al., "HRNet: High-Resolution Neural Network for Human Imaging Using mmWave Radar," IEEE Internet of Things Journal, vol. 12, No. 1, pp. 881-893, Jan. 2025.

Sai Deepika Regani et al., "mmWrite: Passive Handwriting Tracking using a Single Millimeter Wave Radio", IEEE Internet of Things Journal, vol. 8, No. 17, pp. 13291-13305, Sep. 2021.

Fengyu Wang et al., "mmHRV: Contactless Heart Rate Variability Monitoring using Millimeter-Wave Radio", IEEE Internet of Things Journal, vol. 8, No. 22, pp. 16623-16636, Nov. 2021.

Yuqian Hu et al., "mmKey: Universal Virtual Keyboard using a Single Millimeter Wave Radio", IEEE Internet of Things Journal, vol. 9, No. 1, pp. 510-524, Jan. 2022.

Mohammed Zahid Ozturk et al., "GaitCube: Deep Data Cube Learning for Human Recognition with Millimeter-Wave Radio", IEEE Internet of Things Journal, vol. 9, No. 1, pp. 546-557, Jan. 2022.

Sai Deepika Regani et al., "GWrite: Enabling Through-the-Wall Gesture Writing Recognition Using WiFi," IEEE Internet of Things Journal, vol. 10, No. 7, pp. 5977-5991, Nov. 2022.

Mohammed Zahid Ozturk et al., "RadioMic: Sound Sensing via Radio Signals," IEEE Internet of Things Journal, vol. 10, No. 5, pp. 4431-4448, Oct. 2022.

Mohammed Zahid Ozturk et al., "RadioSES: mmWave-Based Audioradio Speech Enhancement and Separation System," IEEE/ACM Transactions on Audio Speech, and Language Processing, vol. 31, pp. 1333-1347, Mar. 2023.

Mohammed Zahid Ozturk et al., "RadioVAD: mmWave-Based Noise and Interference-Resilient Voice Activity Detection," IEEE Internet of Things Journal, vol. 11, No. 15, pp. 26005-26019, Aug. 2024.

* cited by examiner

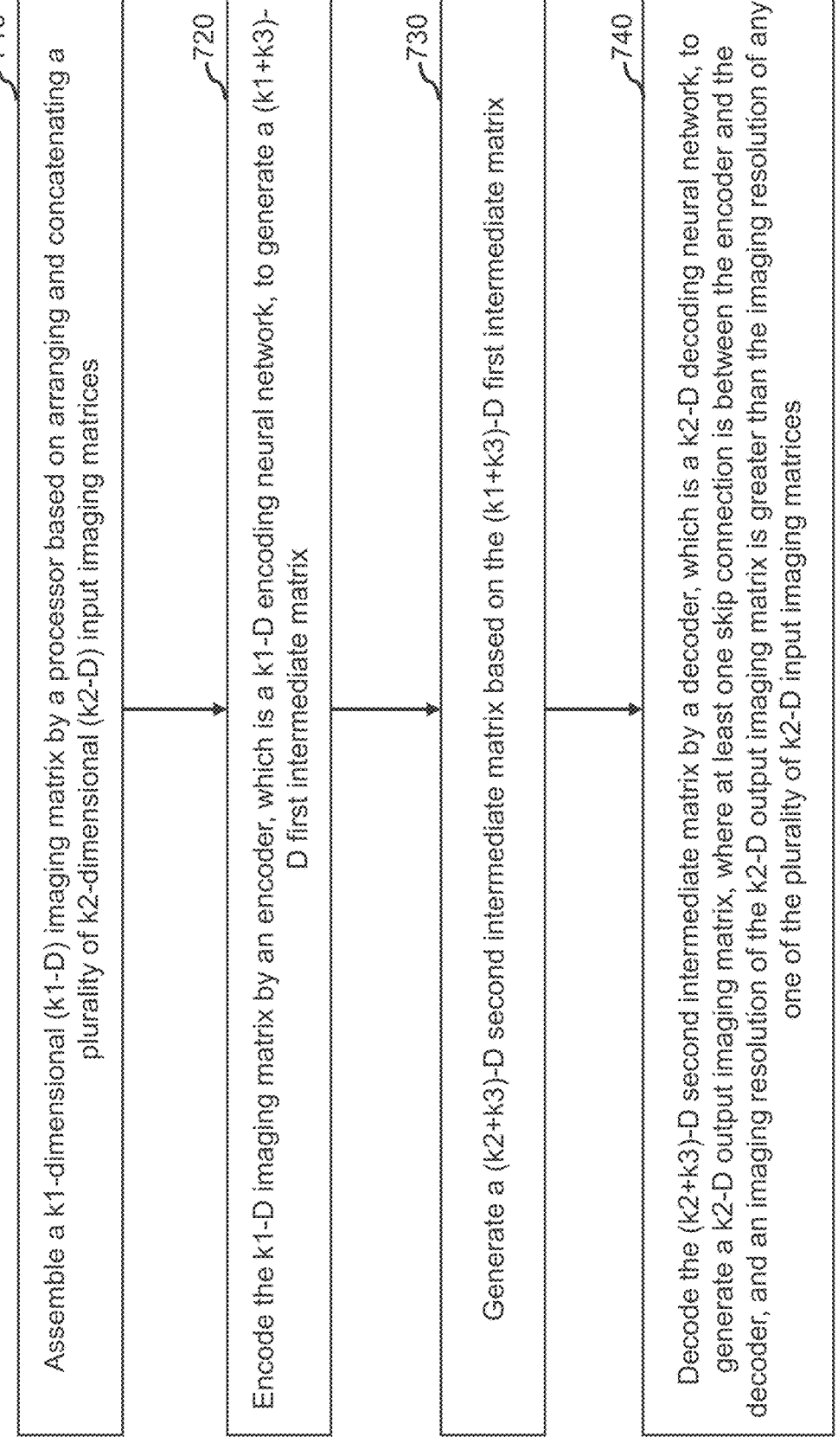

700

710 — Assemble a k1-dimensional (k1-D) imaging matrix by a processor based on arranging and concatenating a plurality of k2-dimensional (k2-D) input imaging matrices 720 — Encode the k1-D imaging matrix by an encoder, which is a k1-D encoding neural network, to generate a (k1+k3)-D first intermediate matrix 730 — Generate a (k2+k3)-D second intermediate matrix based on the (k1+k3)-D first intermediate matrix 740 — Decode the (k2+k3)-D second intermediate matrix by a decoder, which is a k2-D decoding neural network, to generate a k2-D output imaging matrix, where at least one skip connection is between the encoder and the decoder, and an imaging resolution of the k2-D output imaging matrix is greater than the imaging resolution of any one of the plurality of k2-D input imaging matrices

FIG. 7

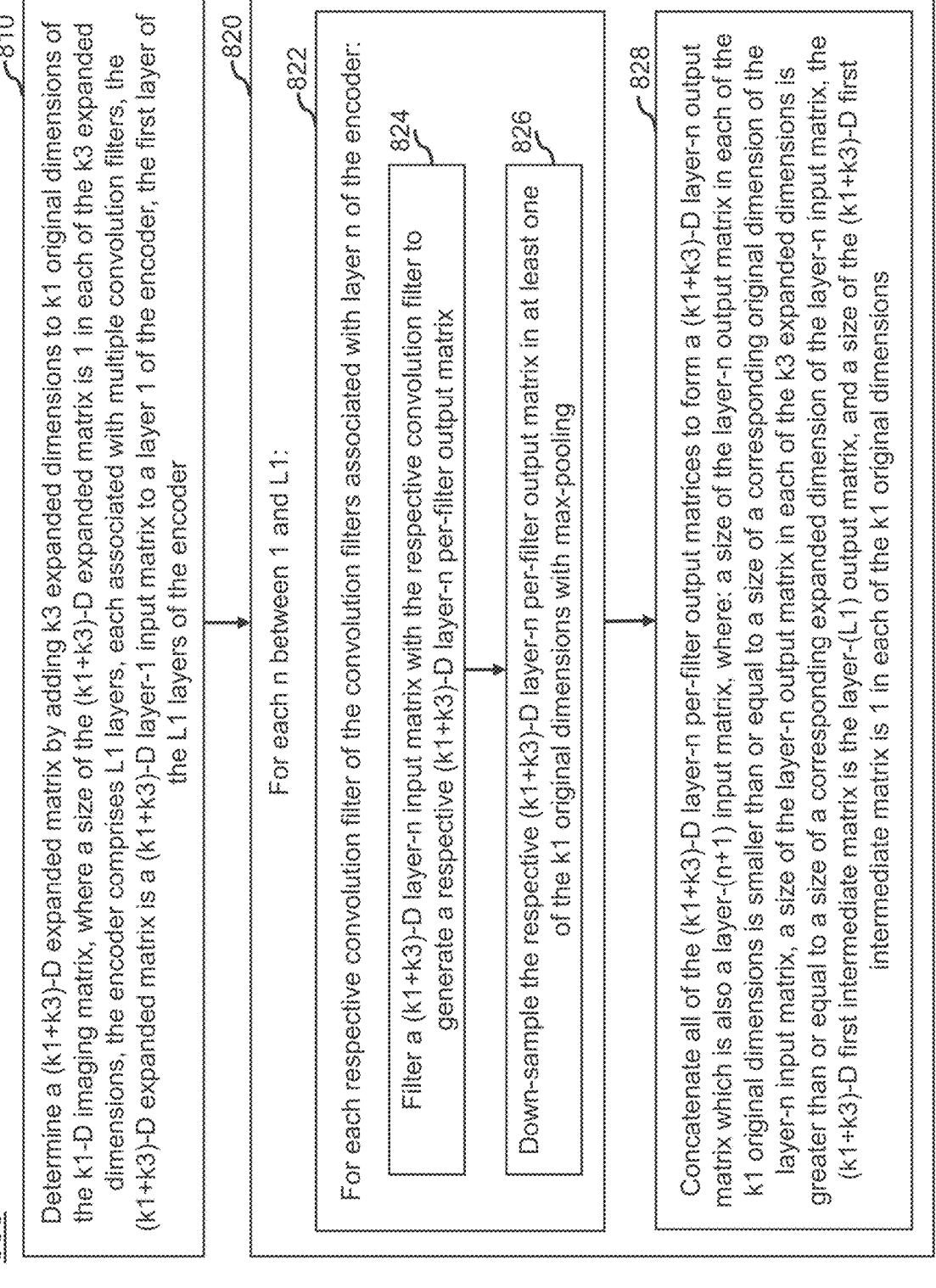

800

810

Determine a (k1+k3)-D expanded matrix by adding k3 expanded dimensions to k1 original dimensions of the k1-D imaging matrix, where a size of the (k1+k3)-D expanded matrix is 1 in each of the k3 expanded dimensions, the encoder comprises L1 layers, each associated with multiple convolution filters, the (k1+k3)-D expanded matrix is a (k1+k3)-D layer-1 input matrix to a layer 1 of the encoder, the first layer of the L1 layers of the encoder

820

For each n between 1 and L1:

822

For each respective convolution filter of the convolution filters associated with layer n of the encoder:

824

Filter a (k1+k3)-D layer-n input matrix with the respective convolution filter to generate a respective (k1+k3)-D layer-n per-filter output matrix

826

Down-sample the respective (k1+k3)-D layer-n per-filter output matrix in at least one of the k1 original dimensions with max-pooling

828

Concatenate all of the (k1+k3)-D layer-n per-filter output matrices to form a (k1+k3)-D layer-n output matrix which is also a layer-(n+1) input matrix, where: a size of the layer-n output matrix in each of the k1 original dimensions is smaller than or equal to a size of a corresponding original dimension of the layer-n input matrix, a size of the layer-n output matrix in each of the k3 expanded dimensions is greater than or equal to a size of a corresponding expanded dimension of the layer-n input matrix, the (k1+k3)-D first intermediate matrix is the layer-(L1) output matrix, and a size of the (k1+k3)-D first intermediate matrix is 1 in each of the k1 original dimensions

FIG. 8

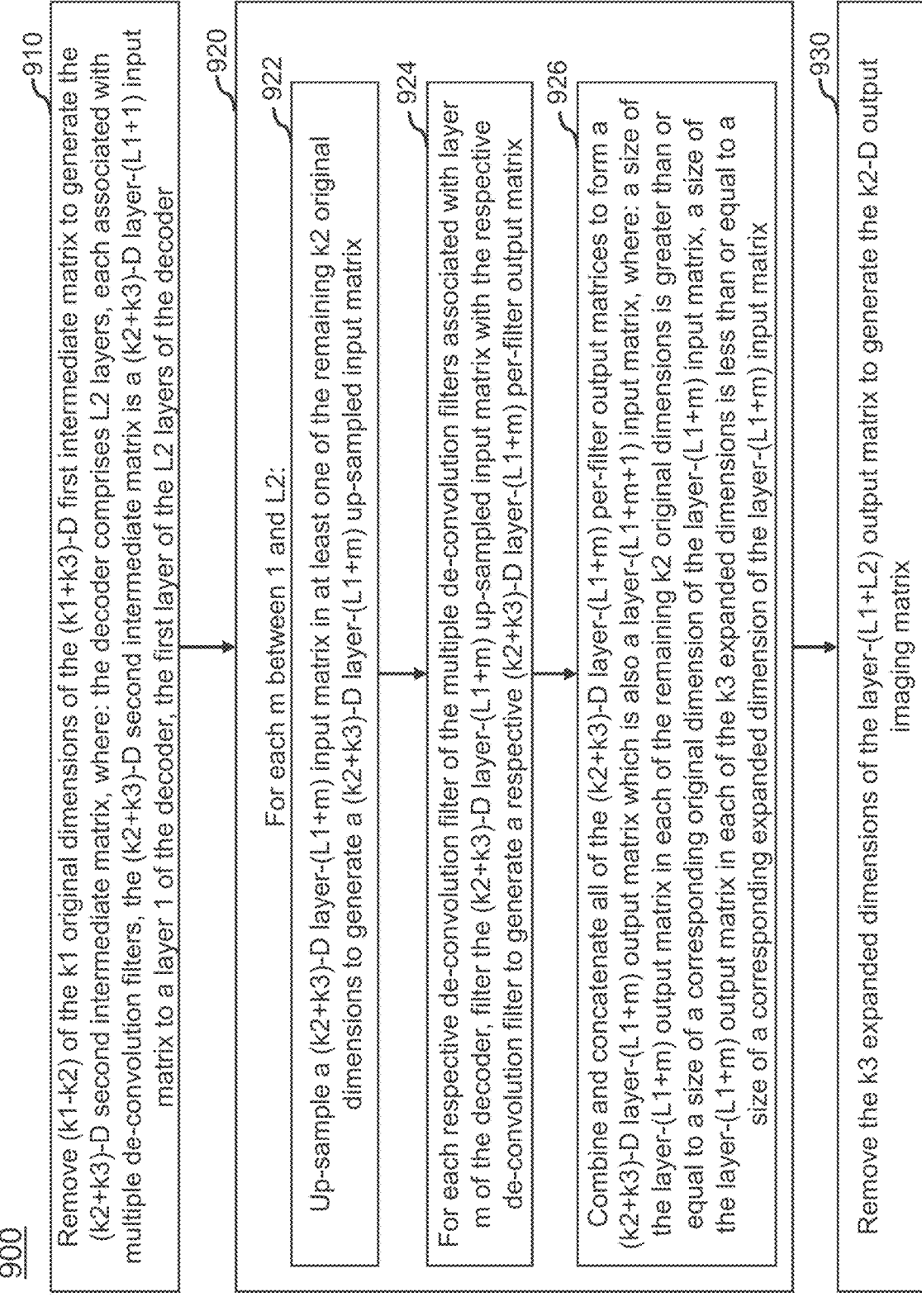

900

910

Remove (k1-k2) of the k1 original dimensions of the (k1+k3)-D first intermediate matrix to generate the (k2+k3)-D second intermediate matrix, where: the decoder comprises L2 layers, each associated with multiple de-convolution filters, the (k2+k3)-D second intermediate matrix is a (k2+k3)-D layer-(L1+1) input matrix to a layer 1 of the decoder, the first layer of the L2 layers of the decoder

920

For each m between 1 and L2:

922

Up-sample a (k2+k3)-D layer-(L1+m) input matrix in at least one of the remaining k2 original dimensions to generate a (k2+k3)-D layer-(L1+m) up-sampled input matrix

924

For each respective de-convolution filter of the multiple de-convolution filters associated with layer m of the decoder, filter the (k2+k3)-D layer-(L1+m) up-sampled input matrix with the respective de-convolution filter to generate a respective (k2+k3)-D layer-(L1+m) per-filter output matrix

926

Combine and concatenate all of the (k2+k3)-D layer-(L1+m) per-filter output matrices to form a (k2+k3)-D layer-(L1+m) output matrix which is also a layer-(L1+m+1) input matrix, where: a size of the layer-(L1+m) output matrix in each of the remaining k2 original dimensions is greater than or equal to a size of a corresponding original dimension of the layer-(L1+m) input matrix, a size of the layer-(L1+m) output matrix in each of the k3 expanded dimensions is less than or equal to a size of a corresponding expanded dimension of the layer-(L1+m) input matrix

930

Remove the k3 expanded dimensions of the layer-(L1+L2) output matrix to generate the k2-D output imaging matrix

FIG. 9

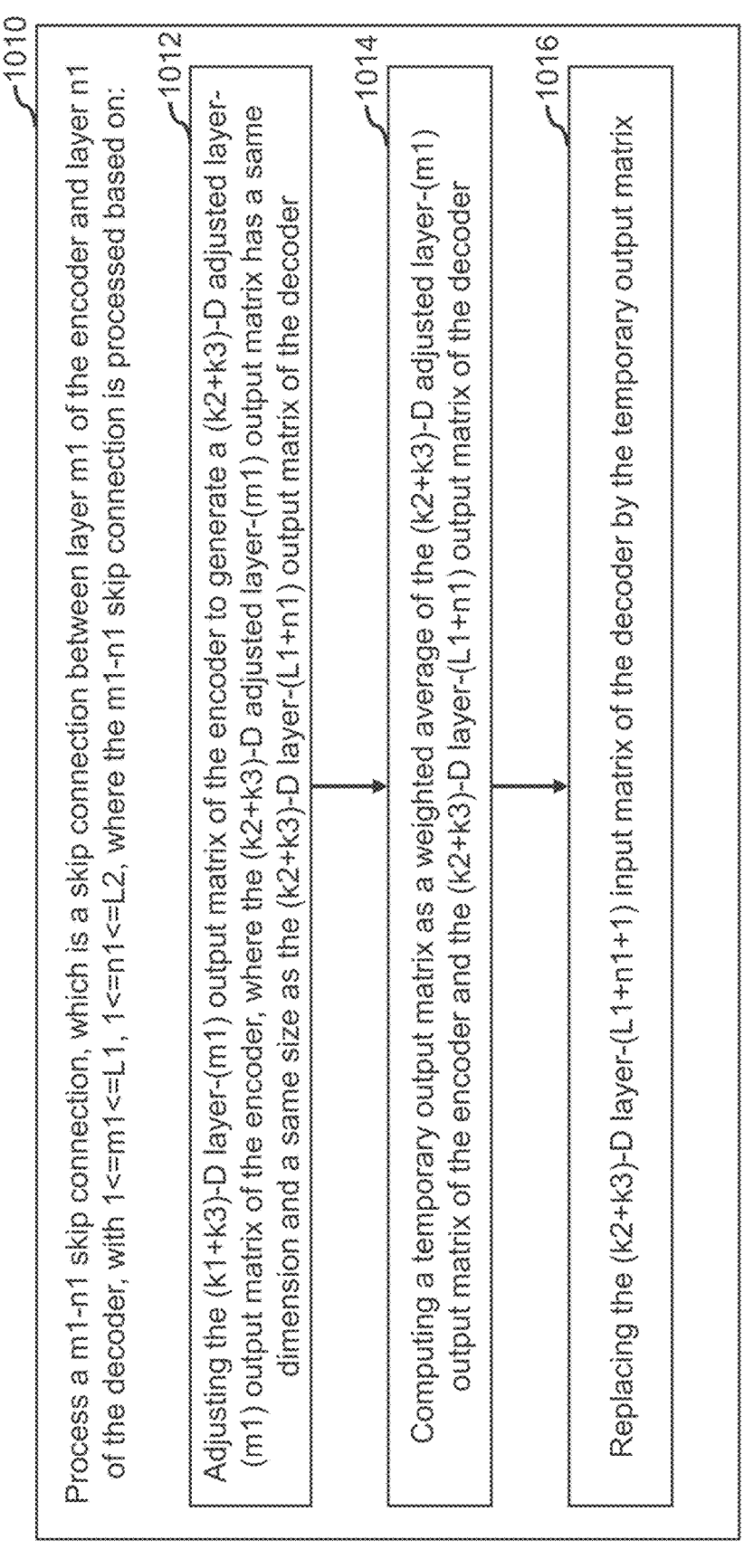

1000

1010 Process a m1-n1 skip connection, which is a skip connection between layer m1 of the encoder and layer n1 of the decoder, with 1<=m1<=L1, 1<=n1<=L2, where the m1-n1 skip connection is processed based on:

1012 Adjusting the (k1+k3)-D layer-(m1) output matrix of the encoder to generate a (k2+k3)-D adjusted layer-(m1) output matrix of the encoder, where the (k2+k3)-D adjusted layer-(m1) output matrix has a same dimension and a same size as the (k2+k3)-D layer-(L1+n1) output matrix of the decoder 1014 Computing a temporary output matrix as a weighted average of the (k2+k3)-D adjusted layer-(m1) output matrix of the encoder and the (k2+k3)-D layer-(L1+n1) output matrix of the decoder 1016 Replacing the (k2+k3)-D layer-(L1+n1+1) input matrix of the decoder by the temporary output matrix

FIG. 10

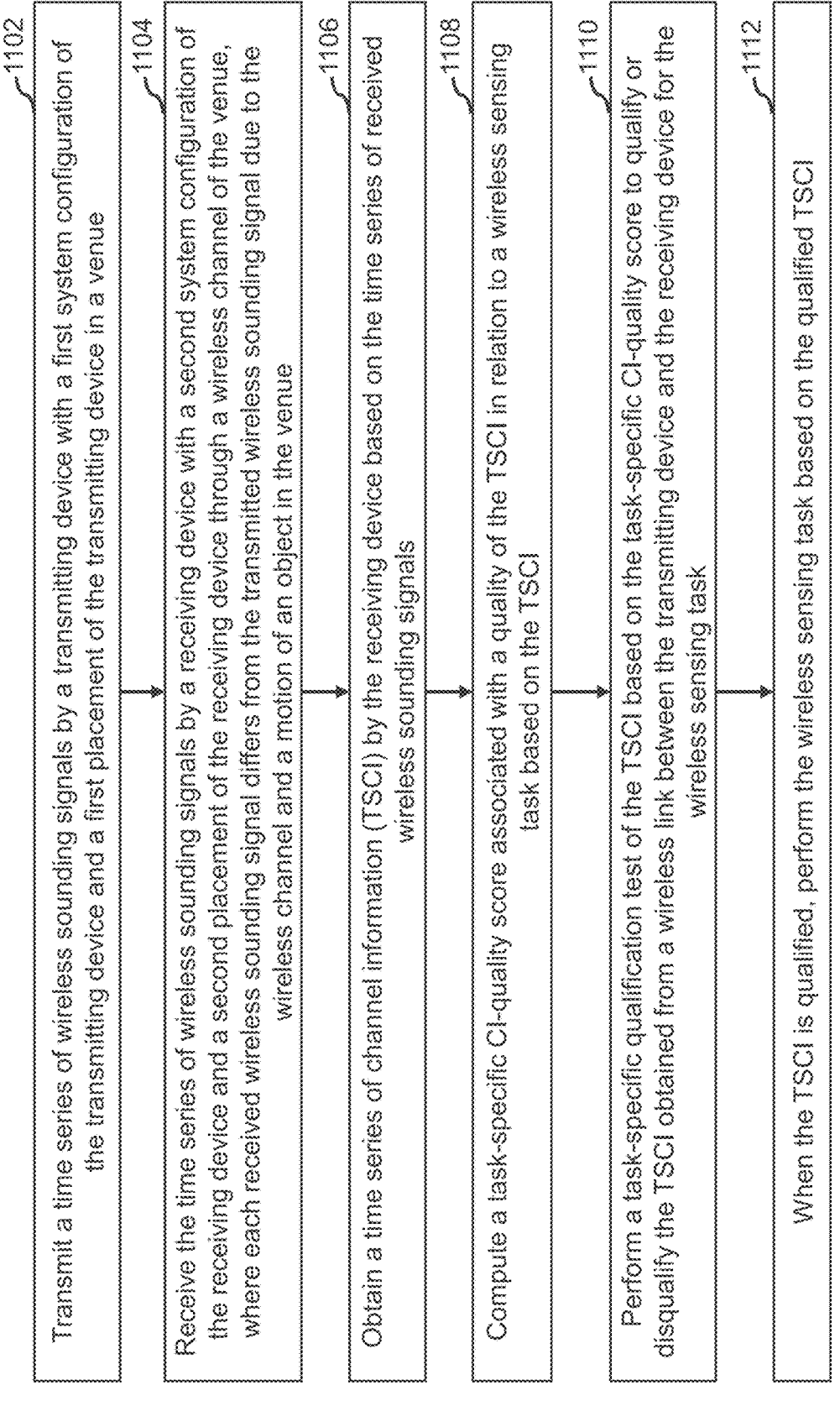

1100

1102 — Transmit a time series of wireless sounding signals by a transmitting device with a first system configuration of the transmitting device and a first placement of the transmitting device in a venue 1104 — Receive the time series of wireless sounding signals by a receiving device with a second system configuration of the receiving device and a second placement of the receiving device through a wireless channel of the venue, where each received wireless sounding signal differs from the transmitted wireless sounding signal due to the wireless channel and a motion of an object in the venue 1106 — Obtain a time series of channel information (TSCI) by the receiving device based on the time series of received wireless sounding signals 1108 — Compute a task-specific CI-quality score associated with a quality of the TSCI in relation to a wireless sensing task based on the TSCI 1110 — Perform a task-specific qualification test of the TSCI based on the task-specific CI-quality score to qualify or disqualify the TSCI obtained from a wireless link between the transmitting device and the receiving device for the wireless sensing task 1112 — When the TSCI is qualified, perform the wireless sensing task based on the qualified TSCI

FIG. 11

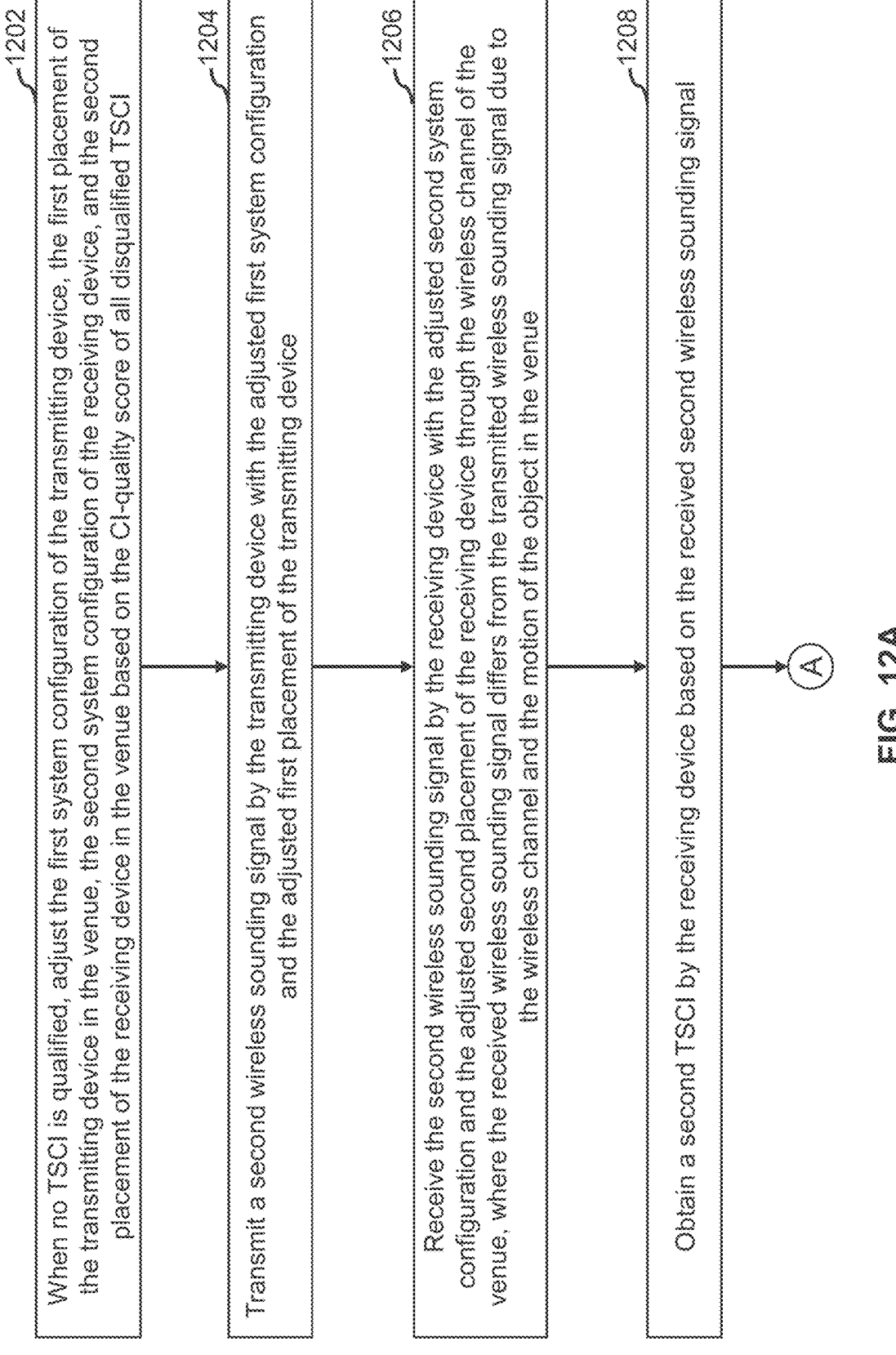

1200

1202 — When no TSCI is qualified, adjust the first system configuration of the transmitting device, the first placement of the transmitting device in the venue, the second system configuration of the receiving device, and the second placement of the receiving device in the venue based on the CI-quality score of all disqualified TSCI 1204 — Transmit a second wireless sounding signal by the transmitting device with the adjusted first system configuration and the adjusted first placement of the transmitting device 1206 — Receive the second wireless sounding signal by the receiving device with the adjusted second system configuration and the adjusted second placement of the receiving device through the wireless channel of the venue, where the received wireless sounding signal differs from the transmitted wireless sounding signal due to the wireless channel and the motion of the object in the venue 1208 — Obtain a second TSCI by the receiving device based on the received second wireless sounding signal

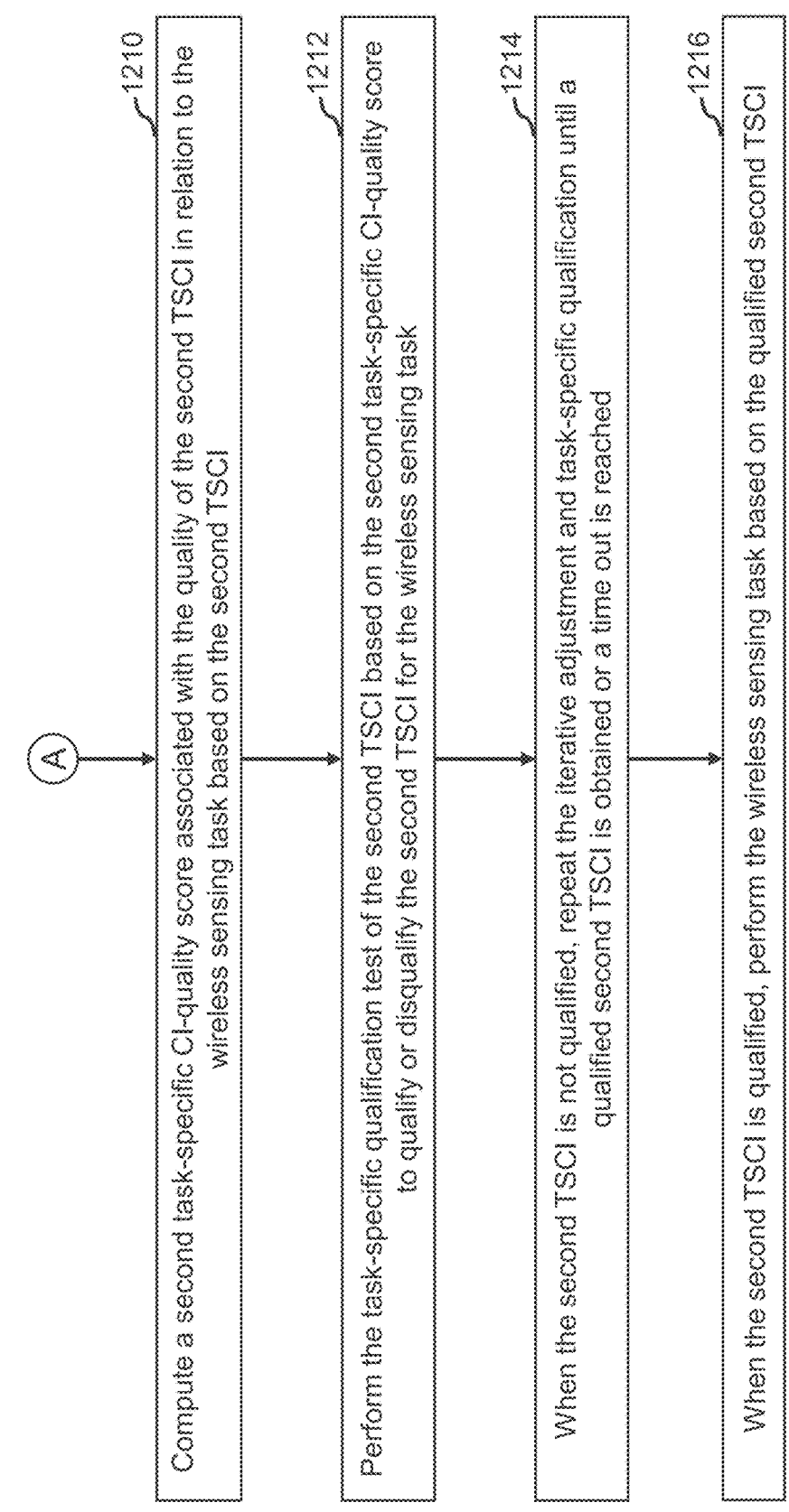

1200

A

1210 — Compute a second task-specific CI-quality score associated with the quality of the second TSCI in relation to the wireless sensing task based on the second TSCI 1212 — Perform the task-specific qualification test of the second TSCI based on the second task-specific CI-quality score to qualify or disqualify the second TSCI for the wireless sensing task 1214 — When the second TSCI is not qualified, repeat the iterative adjustment and task-specific qualification until a qualified second TSCI is obtained or a time out is reached 1216 — When the second TSCI is qualified, perform the wireless sensing task based on the qualified second TSCI

FIG. 12B

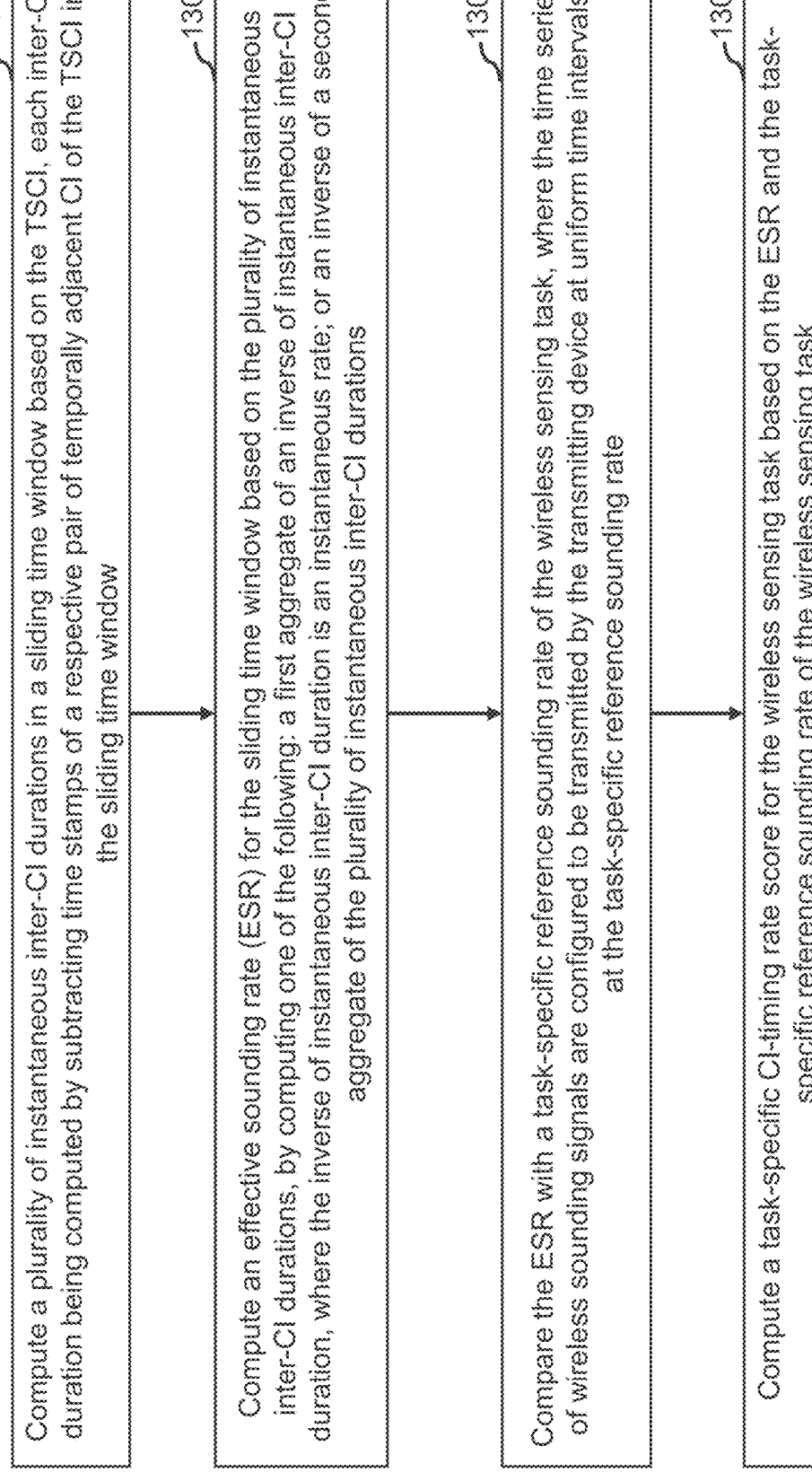

1300

1302 Compute a plurality of instantaneous inter-CI durations in a sliding time window based on the TSCI, each inter-CI duration being computed by subtracting time stamps of a respective pair of temporally adjacent CI of the TSCI in the sliding time window 1304 Compute an effective sounding rate (ESR) for the sliding time window based on the plurality of instantaneous inter-CI durations, by computing one of the following: a first aggregate of an inverse of instantaneous inter-CI duration, where the inverse of instantaneous inter-CI duration is an instantaneous rate, or an inverse of a second aggregate of the plurality of instantaneous inter-CI durations 1306 Compare the ESR with a task-specific reference sounding rate of the wireless sensing task, where the time series of wireless sounding signals are configured to be transmitted by the transmitting device at uniform time intervals at the task-specific reference sounding rate 1308 Compute a task-specific CI-timing rate score for the wireless sensing task based on the ESR and the task-specific reference sounding rate of the wireless sensing task

FIG. 13

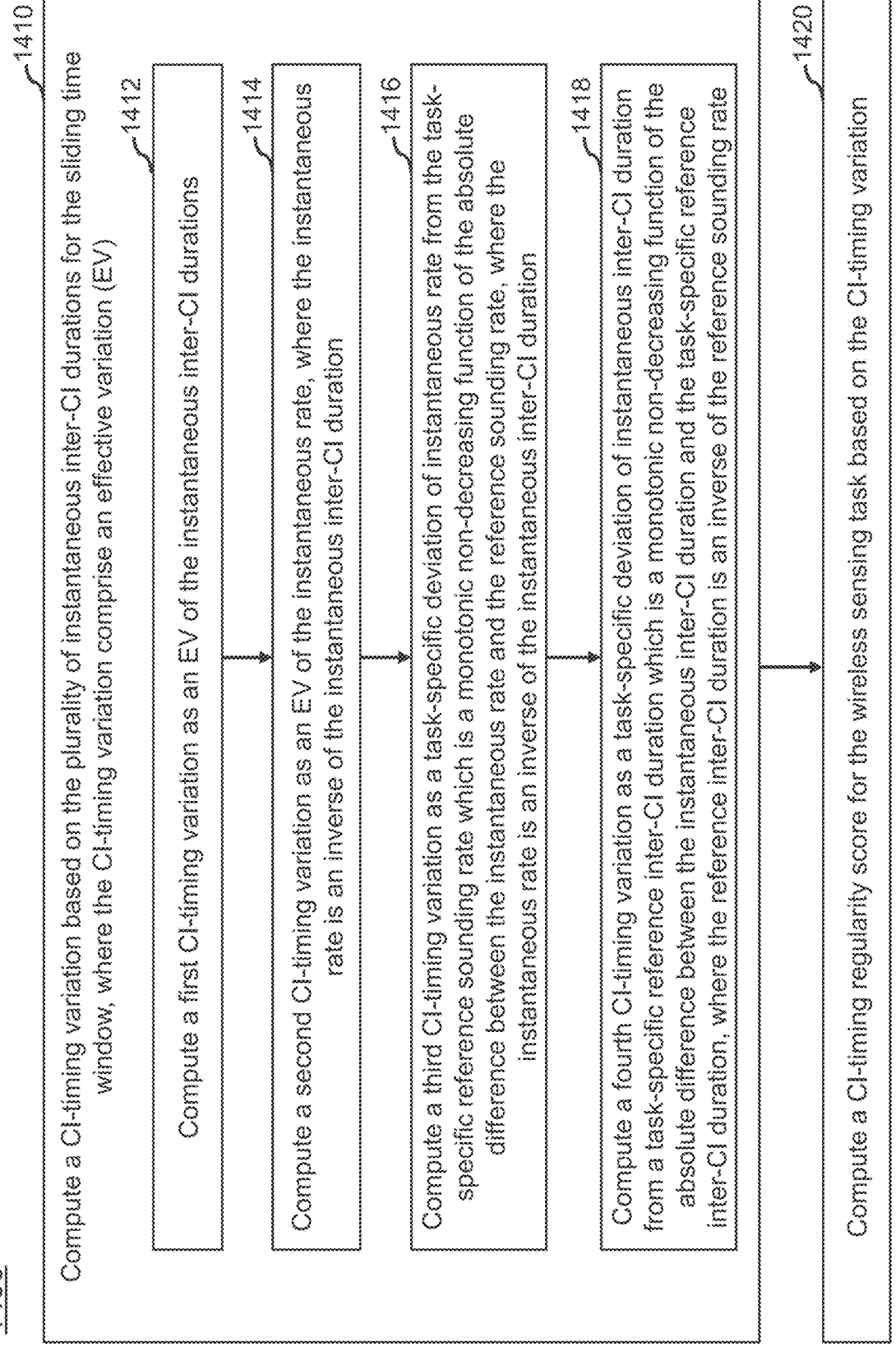

1400

1410 — Compute a CI-timing variation based on the plurality of instantaneous inter-CI durations for the sliding time window, where the CI-timing variation comprise an effective variation (EV)

1412 — Compute a first CI-timing variation as an EV of the instantaneous inter-CI durations 1414 — Compute a second CI-timing variation as an EV of the instantaneous rate, where the instantaneous rate is an inverse of the instantaneous inter-CI duration 1416 — Compute a third CI-timing variation as a task-specific deviation of instantaneous rate from the task-specific reference sounding rate which is a monotonic non-decreasing function of the absolute difference between the instantaneous rate and the reference sounding rate, where the instantaneous rate is an inverse of the instantaneous inter-CI duration 1418 — Compute a fourth CI-timing variation as a task-specific deviation of instantaneous inter-CI duration from a task-specific reference inter-CI duration which is a monotonic non-decreasing function of the absolute difference between the instantaneous inter-CI duration and the task-specific reference inter-CI duration, where the reference inter-CI duration is an inverse of the reference sounding rate 1420 — Compute a CI-timing regularity score for the wireless sensing task based on the CI-timing variation

FIG. 14

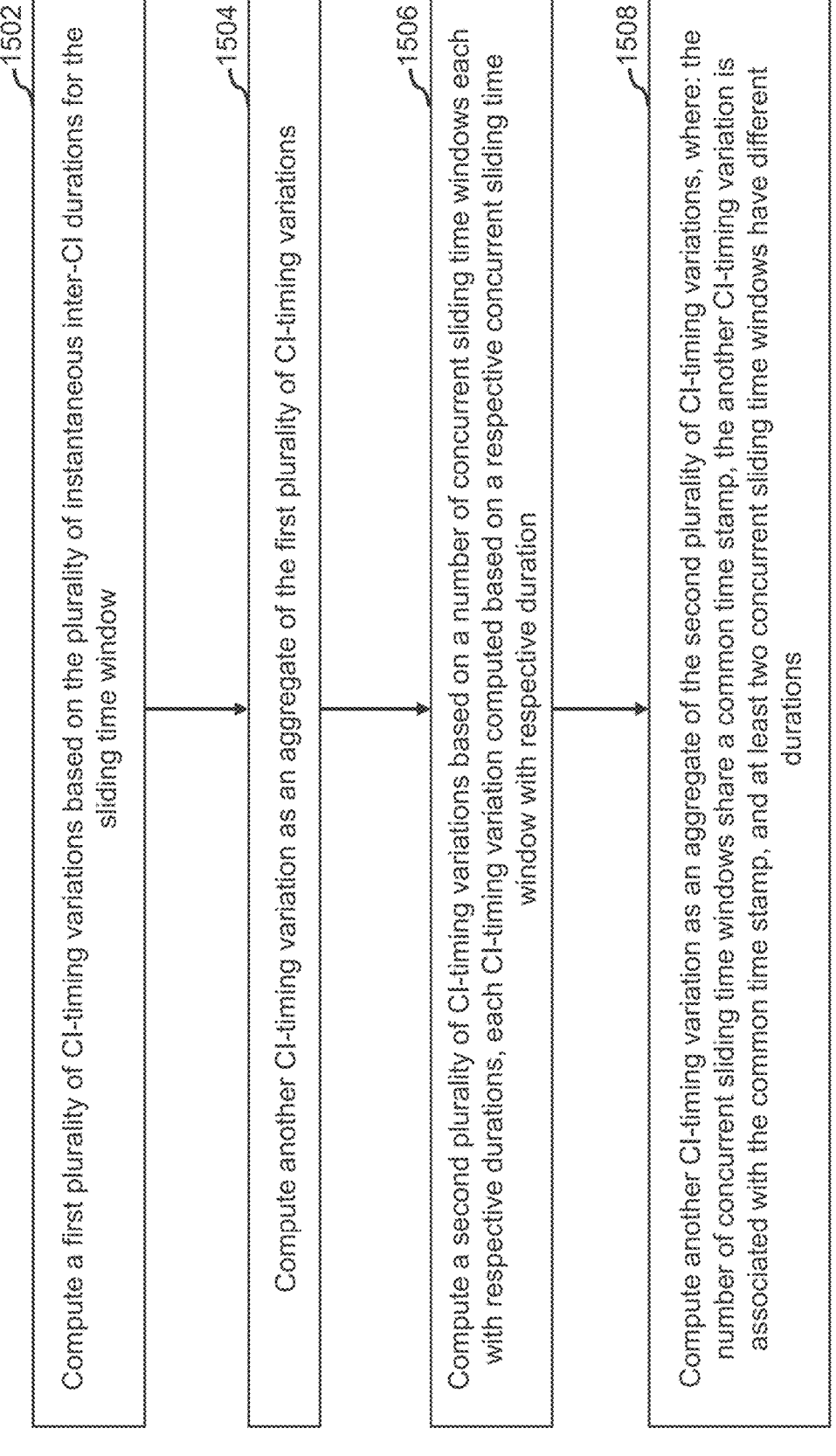

1500

1502 — Compute a first plurality of CI-timing variations based on the plurality of instantaneous inter-CI durations for the sliding time window 1504 — Compute another CI-timing variation as an aggregate of the first plurality of CI-timing variations 1506 — Compute a second plurality of CI-timing variations based on a number of concurrent sliding time windows each with respective durations, each CI-timing variation computed based on a respective concurrent sliding time window with respective duration 1508 — Compute another CI-timing variation as an aggregate of the second plurality of CI-timing variations, where: the number of concurrent sliding time windows share a common time stamp, the another CI-timing variation is associated with the common time stamp, and at least two concurrent sliding time windows have different durations

FIG. 15

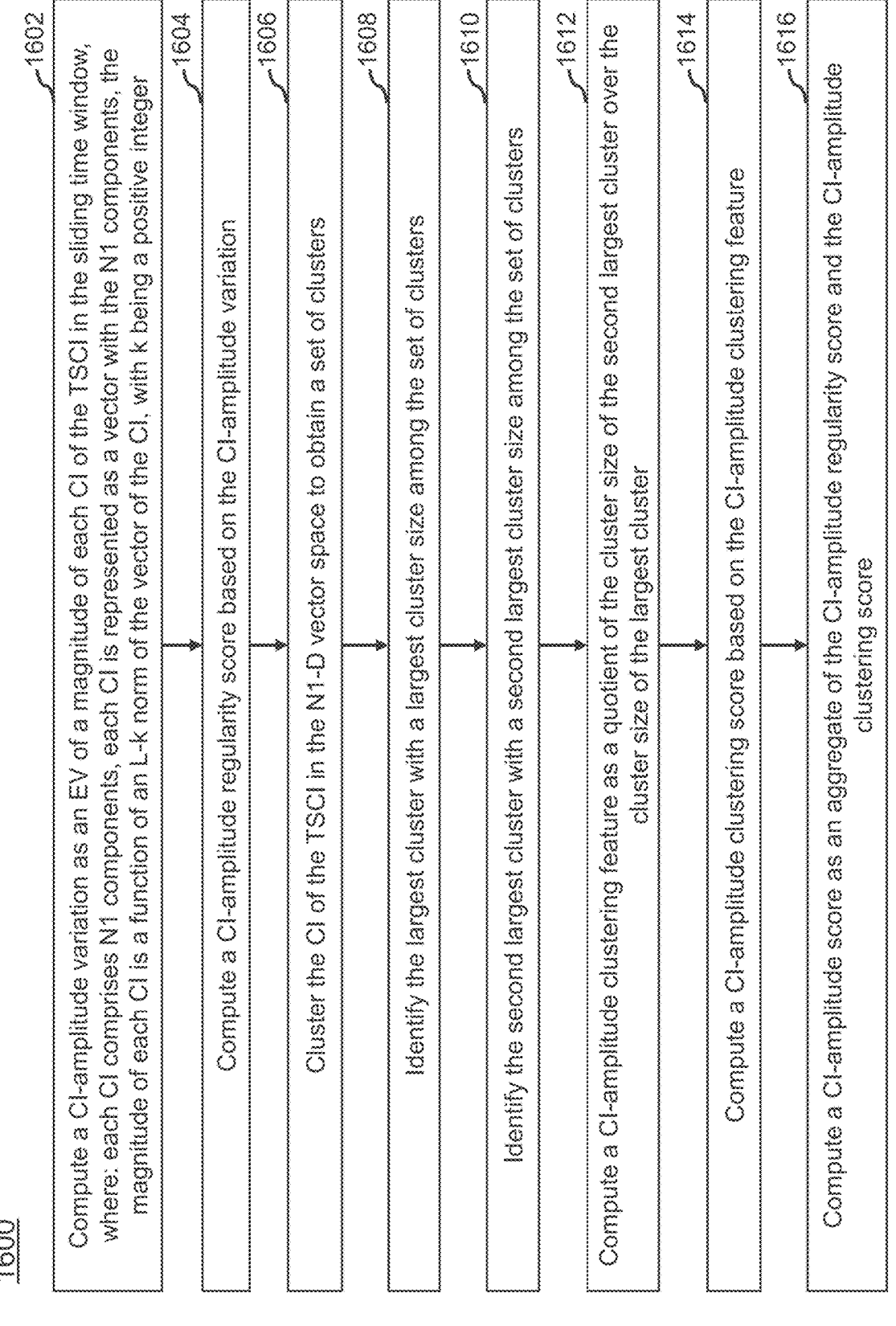

1600

1602 — Compute a CI-amplitude variation as an EV of a magnitude of each CI of the TSCI in the sliding time window, where: each CI comprises N1 components, each CI is represented as a vector with the N1 components, the magnitude of each CI is a function of an L-k norm of the vector of the CI, with k being a positive integer 1604 — Compute a CI-amplitude regularity score based on the CI-amplitude variation 1606 — Cluster the CI of the TSCI in the N1-D vector space to obtain a set of clusters 1608 — Identify the largest cluster with a largest cluster size among the set of clusters 1610 — Identify the second largest cluster with a second largest cluster size among the set of clusters 1612 — Compute a CI-amplitude clustering feature as a quotient of the cluster size of the second largest cluster over the cluster size of the largest cluster 1614 — Compute a CI-amplitude clustering score based on the CI-amplitude clustering feature 1616 — Compute a CI-amplitude score as an aggregate of the CI-amplitude regularity score and the CI-amplitude clustering score

FIG. 16

HIGH RESOLUTION HUMAN IMAGING USING NEURAL NETWORK

CROSS-REFERENCE TO RELATED APPLICATIONS

The present application hereby incorporates by reference the entirety of the disclosures of, and claims priority to, each of the following cases:

(a) U.S. Provisional Patent application 63/721,406, entitled "METHOD, APPARATUS, AND SYSTEM FOR WIRELESS SENSING", filed on Nov. 15, 2024, (b) U.S. Provisional Patent application 63/651,921, entitled "METHOD, APPARATUS, AND SYSTEM FOR WIRELESS SENSING IN NETWORK OF NETWORKS WITH INTER-NETWORK SOUNDING", filed on May 24, 2024, (c) U.S. patent application Ser. No. 17/149,625, entitled "METHOD, APPARATUS, AND SYSTEM FOR WIRELESS MONITORING WITH MOTION LOCALIZATION", filed on Jan. 14, 2021, (d) U.S. patent application Ser. No. 17/537,432, entitled "METHOD, APPARATUS, AND SYSTEM FOR AUTOMATIC AND ADAPTIVE WIRELESS MONITORING AND TRACKING", filed on Nov. 29, 2021, (e) U.S. patent application Ser. No. 17/827,902, entitled "METHOD, APPARATUS, AND SYSTEM FOR SPEECH ENHANCEMENT AND SEPARATION BASED ON AUDIO AND RADIO SIGNALS", filed on May 30, 2022, (f) U.S. patent application Ser. No. 17/838,228, entitled "METHOD, APPARATUS, AND SYSTEM FOR WIRELESS SENSING BASED ON CHANNEL INFORMATION", filed on Jun. 12, 2022, (g) U.S. patent application Ser. No. 17/838,231, entitled "METHOD, APPARATUS, AND SYSTEM FOR IDENTIFYING AND QUALIFYING DEVICES FOR WIRELESS SENSING", filed on Jun. 12, 2022, (h) U.S. patent application Ser. No. 17/838,244, entitled "METHOD, APPARATUS, AND SYSTEM FOR WIRELESS SENSING BASED ON LIKWISE MOTION STATISTICS", filed on Jun. 12, 2022, (i) U.S. patent application Ser. No. 17/959,487, entitled "METHOD, APPARATUS, AND SYSTEM FOR VOICE ACTIVITY DETECTION BASED ON RADIO SIGNALS", filed on Oct. 4, 2022, (j) U.S. patent application Ser. No. 17/960,080, entitled "METHOD, APPARATUS, AND SYSTEM FOR ENHANCED WIRELESS MONITORING OF VITAL SIGNS", filed on Oct. 4, 2022, (k) PCT Patent application PCT/US22/45708, entitled "METHOD, APPARATUS, AND SYSTEM FOR WIRELESS SENSING MEASUREMENT AND REPORTING", filed on Oct. 4, 2022, (l) U.S. patent application Ser. No. 18/108,563, entitled "METHOD, APPARATUS, AND SYSTEM FOR WIRELESS SENSING BASED ON MULTIPLE GROUPS OF WIRELESS DEVICES", filed on Feb. 10, 2023, (m) U.S. patent application Ser. No. 18/199,963, entitled "METHOD, APPARATUS, AND SYSTEM FOR WIRELESS SENSING MEASUREMENT AND REPORTING", filed on May 21, 2023, (n) U.S. patent application Ser. No. 18/379,622, entitled "METHOD, APPARATUS, AND SYSTEM FOR WIRELESS PROXIMITY DETECTION", filed on Oct. 12, 2023, (o) U.S. patent application Ser. No. 18/391,529, entitled "METHOD, APPARATUS, AND SYSTEM FOR WIRELESS HUMAN AND NON-HUMAN MOTIONDETECTION", filed on Dec. 20, 2023.

(p) U.S. patent application Ser. No. 18/395,533, entitled "METHOD, APPARATUS, AND SYSTEM FOR WIRELESS SENSING MEASUREMENT AND REPORTING", filed on Dec. 23, 2023.

(q) U.S. patent application Ser. No. 18/395,539, entitled "METHOD, APPARATUS, AND SYSTEM FOR WIRELESS SENSING MEASUREMENT AND REPORTING", filed on Dec. 23, 2023.

(r) U.S. patent application Ser. No. 18/395,543, entitled "METHOD, APPARATUS, AND SYSTEM FOR WIRELESS SENSING MEASUREMENT AND REPORTING", filed on Dec. 23, 2023.

(s) U.S. patent application Ser. No. 18/395,537, entitled "METHOD, APPARATUS, AND SYSTEM FOR WIRELESS SENSING MEASUREMENT AND REPORTING", filed on Dec. 23, 2023.

(t) U.S. patent application Ser. No. 18/395,544, entitled "METHOD, APPARATUS, AND SYSTEM FOR WIRELESS SENSING MEASUREMENT AND REPORTING", filed on Dec. 23, 2023.

(u) U.S. patent application Ser. No. 18/401,684, entitled "METHOD, APPARATUS, AND SYSTEM FOR WIRELESS SENSING MEASUREMENT AND REPORTING", filed on Jan. 1, 2024.

(v) U.S. patent application Ser. No. 18/401,681, entitled "METHOD, APPARATUS, AND SYSTEM FOR WIRELESS SENSING BASED ON DEEP LEARNING", filed on Jan. 1, 2024.

TECHNICAL FIELD

The present teaching generally relates to object imaging. More specifically, the present teaching relates to high resolution human imaging using neural network.

BACKGROUND

With the proliferation of Internet of Things (IoT) applications, billions of household appliances, phones, smart devices, security systems, environment sensors, vehicles and buildings, and other radio-connected devices will transmit data and communicate with each other or people, and everything will be able to be measured and tracked all the time. Among the various approaches to measure what is happening in the surrounding environment, wireless sensing has received an increasing attention in recent years because of the ubiquitous deployment of wireless radio devices. In addition, human activities affect wireless signal propagations, therefore understanding and analyzing the way how wireless signals react to human activities can reveal rich information about the activities. As more bandwidth becomes available in the new generation of wireless systems, wireless sensing will make many smart IoT applications only imagined today possible in the near future. That is because when the bandwidth increases, one can see many more multipaths, in a rich-scattering environment such as in indoors or metropolitan area, which can be treated as hundreds of virtual antennas/sensors. Because there may be many IoT devices available for wireless sensing, an efficient and effective method for making use multiple devices for wireless sensing is desirable.

Object imaging (e.g. objects such as human, animal, pet, furniture, machine, vehicle, etc.) using radio frequency (RF)

is an emerging area of research fueled by the increasing availability of RF-radar wireless devices. Even though existing works achieve object reconstruction (e.g. human body reconstruction for pose estimation purposes), object (e.g. human) identification with imaging has not been feasible due to its limited resolution.

SUMMARY

The present teaching generally relates to wireless sensing. More specifically, the present teaching relates to high resolution human imaging using neural network.

In one embodiment, a method for encoder-decoder-based high resolution imaging is described. The method comprises: assembling a k1-dimensional (k1-D) imaging matrix by a processor based on arranging and concatenating a plurality of k2-dimensional (k2-D) input imaging matrices; encoding the k1-D imaging matrix by an encoder, which is a k1-D encoding neural network, to generate a (k1+k3)-D first intermediate matrix; generating a (k2+k3)-D second intermediate matrix based on the (k1+k3)-D first intermediate matrix; and decoding the (k2+k3)-D second intermediate matrix by a decoder, which is a k2-D decoding neural network, to generate a k2-D output imaging matrix, wherein: there is at least one skip connection between the encoder and the decoder, and an imaging resolution of the k2-D output imaging matrix is greater than the imaging resolution of any one of the plurality of k2-D input imaging matrices.

In another embodiment, a device for encoder-decoder-based high resolution imaging is described. The device comprises: a processor; and a memory storing instructions, which when executed, cause the processor to perform operations comprising: assembling a k1-dimensional (k1-D) imaging matrix by arranging and concatenating a plurality of k2-dimensional (k2-D) input imaging matrices, encoding the k1-D imaging matrix using an encoder, which is a k1-D encoding neural network, to generate a (k1+k3)-D first intermediate matrix, generating a (k2+k3)-D second intermediate matrix based on the (k1+k3)-D first intermediate matrix, and decoding the (k2+k3)-D second intermediate matrix using a decoder, which is a k2-D decoding neural network, to generate a k2-D output imaging matrix, wherein: there is at least one skip connection between the encoder and the decoder, and an imaging resolution of the k2-D output imaging matrix is greater than the imaging resolution of any one of the plurality of k2-D input imaging matrices.

In yet another embodiment, a system for encoder-decoder-based high resolution imaging is described. The system comprises: a processor configured to assemble a k1-dimensional (k1-D) imaging matrix by arranging and concatenating a plurality of k2-dimensional (k2-D) input imaging matrices; an encoder, which is a k1-D encoding neural network, configured to encode the k1-D imaging matrix to generate a (k1+k3)-D first intermediate matrix, wherein the processor is further configured to generate a (k2+k3)-D second intermediate matrix based on the (k1+k3)-D first intermediate matrix; and a decoder, which is a k2-D decoding neural network, configured to decode the (k2+k3)-D second intermediate matrix to generate a k2-D output imaging matrix, wherein: there is at least one skip connection between the encoder and the decoder, and an imaging resolution of the k2-D output imaging matrix is greater than the imaging resolution of any one of the plurality of k2-D input imaging matrices.

Other concepts relate to software for implementing the present teaching on encoder-decoder-based high resolution imaging. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of example embodiments. These example embodiments are described in detail with reference to the drawings. These embodiments are non-limiting example embodiments, in which like reference numerals represent similar structures throughout the several views of the drawings.

FIG. 7 illustrates a flow chart of an example method for encoder-decoder-based high resolution imaging, according to some embodiments of the present disclosure.

FIG. 8 illustrates a flow chart of an example method for generating output matrices for different layers of an encoder, according to some embodiments of the present disclosure.

FIG. 9 illustrates a flow chart of an example method for generating an output imaging matrix, according to some embodiments of the present disclosure.

FIG. 10 illustrates a flow chart of an example method for processing a skip connection, according to some embodiments of the present disclosure.

FIG. 11 illustrates a flow chart of an example method for quality evaluation of channel measurements for wireless sensing, according to some embodiments of the present disclosure.

FIG. 12A and FIG. 12B illustrate a flow chart of an example method for task-specific qualification, according to some embodiments of the present disclosure.

FIG. 13 illustrates a flow chart of an example method for computing a task-specific CI-timing rate score, according to some embodiments of the present disclosure.

FIG. 14 illustrates a flow chart of an example method for computing a CI-timing regularity score, according to some embodiments of the present disclosure.

FIG. 15 illustrates a flow chart of an example method for computing an aggregate of a plurality of CI-timing variations, according to some embodiments of the present disclosure.

FIG. 16 illustrates a flow chart of an example method for computing a CI-amplitude score, according to some embodiments of the present disclosure.

DETAILED DESCRIPTION

Figure 1:
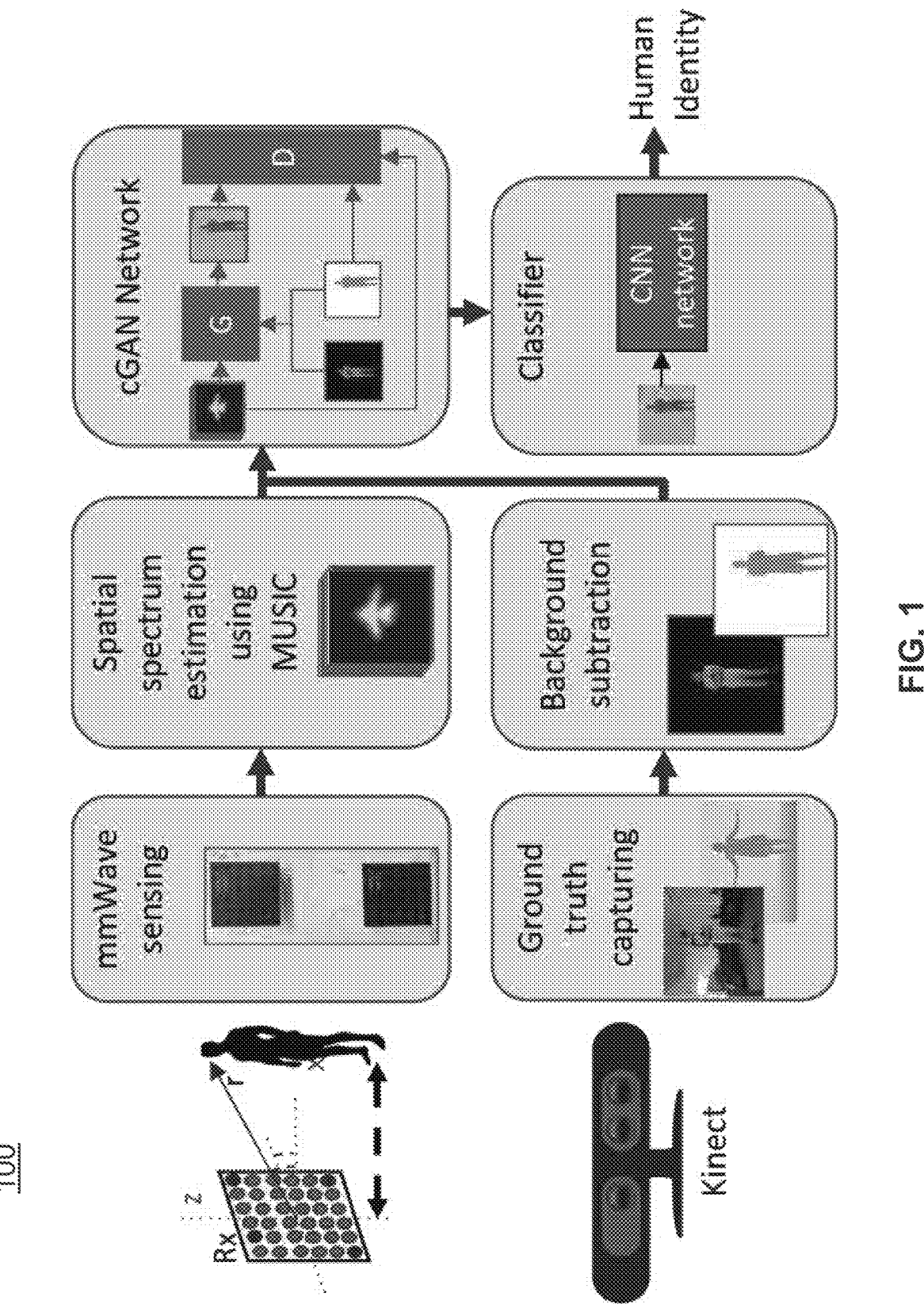
FIG. 1 illustrates an example framework of a system for encoder-decoder-based high resolution imaging, according to some embodiments of the present disclosure.

The symbol "/" disclosed herein means "and/or". For example, "A/B" means "A and/or B." In some embodiments, a method/device/system/software of a wireless monitoring system is disclosed. A time series of channel information (CI) of a wireless multipath channel is obtained using a processor, a memory communicatively coupled with processor and a set of instructions stored in memory. The time series of CI (TSCI) may be extracted from a wireless signal transmitted from a Type1 heterogeneous wireless device (e.g. wireless transmitter (TX), "Bot" device) to a Type2 heterogeneous wireless device (e.g. wireless receiver (RX), "Origin" device) in a venue through the channel. The channel is impacted by an expression/motion of an object in venue. A characteristics/spatial-temporal information (STI)/motion information (MI) of object/expression/motion may be computed/monitored based on the TSCI. A task may be performed based on the characteristics/STI/MI. A task-related presentation may be generated in a user-interface (UI) on a device of a user.

Expression may comprise placement, placement of moveable parts, location/speed/acceleration/position/orientation/direction/identifiable place/region/presence/spatial coordinate, static expression/presentation/state/size/length/width/height/angle/scale/curve/surface/area/volume/pose/posture/manifestation/body language, dynamic expression/motion/sequence/movement/activity/behavior/gesture/gait/extension/contraction/distortion/deformation, body expression (e.g. head/face/eye/mouth/tongue/hair/voice/neck/limbs/arm/hand/leg/foot/muscle/moveable parts), surface expression/shape/texture/material/color/electromagnetic (EM) characteristics/visual pattern/wetness/reflectance/translucency/flexibility, material property (e.g. living tissue/hair/fabric/metal/wood/leather/plastic/artificial material/solid/liquid/gas/temperature), expression change, and/or some combination.

Wireless multipath channel may comprise: communication channel, analog frequency channel (e.g. with carrier frequency near 700/800/900 MHz, or 1.8/1.9/2.4/3/5/6/27/60/70+ GHz), coded channel (e.g. in CDMA), and/or channel of wireless/cellular network/system (e.g. WLAN, WiFi, mesh, 4G/LTE/5G/6G/7G/8G, Bluetooth, Zigbee, UWB, RFID, microwave). It may comprise multiple channels, which may be consecutive (e.g. adjacent/overlapping bands) or non-consecutive (e.g. non-overlapping bands, 2.4 GHz/5 GHz). While channel is used to transmit wireless signal and perform sensing measurements, data (e.g. TSCI/feature/component/characteristics/STI/MI/analytics/task outputs, auxiliary/non-sensing data/network traffic) may be communicated/transmitted in channel.

Wireless signal may comprise a series of probe signals. It may be any of: EM radiation, radio frequency (RF)/light/bandlimited/baseband signal, signal in licensed/unlicensed/ISM band, wireless/mobile/cellular/optical communication/network/mesh/downlink/uplink/unicast/multicast/broadcast signal. It may be compliant to standard/protocol (e.g. WLAN, WWAN, WPAN, WBAN, international/national/industry/defacto, IEEE/802/802.11/15/16, WiFi, 802.11n/ac/ ax/be/bf, 3G/4G/LTE/5G/6G/7G/8G, 3GPP/Bluetooth/BLE/Zigbee/NFC/RFID/UWB/WiMax). A probe signal may comprise any of: protocol/standard/beacon/pilot/sounding/excitation/illumination/handshake/synchronization/reference/source/motion probe/detection/sensing/management/control/data/null-data/beacon/pilot/request/response/association/reassociation/disassociation/authentication/action/report/poll/announcement/extension/enquiry/acknowledgement frame/packet/signal, and/or null-data-frame (NDP)/RTS/CTS/QoS/CF-Poll/CF-Ack/block acknowledgement/reference/training/synchronization. It may comprise line-of-sight (LOS)/non-LOS components (or paths/links). It may have data embedded. Probe signal may be replaced by (or embedded in) data signal. Each frame/packet/signal may comprise: preamble/header/payload. It may comprise: training sequence, short (STF)/long (LTF) training field, L-STF/L-LTF/L-SIG/HE-STF/HE-LTF/HE-SIG-A/HE-SIG-B, channel estimation field (CEF). It may be used to transfer power wirelessly from Type1 device to Type2 device. Sounding rate of signal may be adjusted to control amount of transferred power. Probe signals may be sent in burst.

TSCI may be extracted/obtained (e.g. by IC/chip) from wireless signal at a layer of Type2 device (e.g. layer of OSI reference model, PHY/MAC/data link/logical link control/network/transport/session/presentation/application layer, TCP/IP/internet/link layer). It may be extracted from received wireless/derived signal. It may comprise wireless sensing measurements obtained in communication protocol (e.g. wireless/cellular communication standard/network, 4G/LTE/5G/6G/7G/8G, WiFi, IEEE 802.11/11bf/15/16). Each CI may be extracted from a probe/sounding signal, and may be associated with time stamp. TSCI may be associated with starting/stopping time/duration/amount of CI/sampling/sounding frequency/period. A motion detection/sensing signal may be recognized/identified base on probe signal. TSCI may be stored/retrieved/accessed/preprocessed/processed/postprocessed/conditioned/analyzed/monitored. TSCI/features/components/characteristics/STI/MI/analytics/task outcome may be communicated to edge/cloud server/Type1/Type2/hub/data aggregator/another device/system/network.

Type1/Type2 device may comprise components (hardware/software) such as electronics/chip/integrated circuit (IC)/RF circuitry/antenna/modem/TX/RX/transceiver/RF interface (e.g. 2.4/5/6/27/60/70+ GHz radio/front/back haul radio)/network/interface/processor/memory/module/circuit/board/software/firmware/connectors/structure/enclosure/housing/structure. It may comprise access point (AP)/base-station/mesh/router/repeater/hub/wireless station/client/terminal/"Origin Satellite"/"Tracker Bot", and/or internet-of-things (IoT)/appliance/wearable/accessory/peripheral/furniture/amenity/gadget/vehicle/module/wireless-enabled/unicast/multicast/broadcasting/node/hub/target/sensor/portable/mobile/cellular/communication/motion-detection/source/destination/standard-compliant device. It may comprise additional attributes such as auxiliary functionality/network connectivity/purpose/brand/model/appearance/form/shape/color/material/specification. It may be heterogeneous because the above (e.g. components/device types/additional attributes) may be different for different Type1 (or Type2) devices.

Type1/Type2 devices may/may not be authenticated/associated/collocated. They may be same device. Type1/Type2/portable/nearby/another device, sensing/measurement session/link between them, and/or object/expression/motion/characteristics/STI/MI/task may be associated with an identity/identification/identifier (ID) such as UUID, associated/unassociated STA ID (ASID/USID/AID/UID). Type2 device may passively observe/monitor/receive wireless signal from Type1 device without establishing connection (e.g. association/authentication/handshake) with, or requesting service from, Type1 device. Type1/Type2 device may move with object/another object to be tracked.

Type1 (TX) device may function as Type2 (RX) device temporarily/sporadically/continuously/repeatedly/interchangeably/alternately/simultaneously/contemporaneously/concurrently; and vice versa. Type1 device may be Type2 device. A device may function as Type1/Type2 device temporarily/sporadically/continuously/repeatedly/simultaneously/concurrently/contemporaneously. There may be multiple wireless nodes each being Type1/Type2 device. TSCI may be obtained between two nodes when they exchange/communicate wireless signals. Characteristics/STI/MI of object may be monitored individually based on a TSCI, or jointly based on multiple TSCI.

Motion/expression of object may be monitored actively with Type1/Type2 device moving with object (e.g. wearable devices/automated guided vehicle/AGV), or passively with Type1/Type2 devices not moving with object (e.g. both fixed devices).

Task may be performed with/without reference to reference/trained/initial database/profile/baseline that is trained/collected/processed/computed/transmitted/stored in training phase. Database may be re-training/updated/reset.

Presentation may comprise UI/GUI/text/message/form/webpage/visual/image/video/graphics/animation/graphical/symbol/emoticon/sign/color/shade/sound/music/speech/audio/mechanical/gesture/vibration/haptics presentation. Time series of characteristic/STI/MI/task outcome/another quantity may be displayed/presented in presentation. Any computation may be performed/shared by processor (or logic unit/chip/IC)/Type1/Type2/user/nearby/another device/local/edge/cloud server/hub/data/signal analysis subsystem/sensing initiator/response/SBP initiator/responder/AP/non-AP. Presentation may comprise any of: monthly/weekly/daily/simplified/detailed/cross-sectional/small/large/form-factor/color-coded/comparative/summary/web view, animation/voice announcement/another presentation related to periodic/repetition characteristics of repeating motion/expression.

Multiple Type1 (or Type 2) devices may interact with a Type2 (or Type1) device. The multiple Type1 (or Type2) devices may be synchronized/asynchronous, and/or may use same/different channels/sensing parameters/settings (e.g. sounding frequency/bandwidth/antennas). Type2 device may receive another signal from Type1/another Type1 device. Type1 device may transmit another signal to Type2/another Type2 device. Wireless signals sent (or received) by them may be sporadic/temporary/continuous/repeated/synchronous/simultaneous/concurrent/contemporaneous. They may operate independently/collaboratively. Their data (e.g. TSCI/feature/characteristics/STI/MI/intermediate task outcomes) may be processed/monitored/analyzed independently or jointly/collaboratively.

Any devices may operate based on some state/internal state/system state. Devices may communicate directly, or via another/nearby/portable device/server/hub device/cloud server. Devices/system may be associated with one or more users, with associated settings. Settings may be chosen/selected/pre-programmed/changed/adjusted/modified/varied over time. The method may be performed/executed in shown order/another order. Steps may be performed in parallel/iterated/repeated. Users may comprise human/adult/ older adult/man/woman/juvenile/child/baby/pet/animal/creature/machine/computer module/software. Step/operation/processing may be different for different devices (e.g. based on locations/orientation/direction/roles/user-related characteristics/settings/configurations/available resources/bandwidth/power/network connection/hardware/software/processor/co-processor/memory/battery life/antennas/directional antenna/power setting/device parameters/characteristics/conditions/status/state). Any/all device may be controlled/coordinated by a processor (e.g. associated with Type1/Type2/nearby/portable/another device/server/designated source). Some device may be physically in/of/attached to a common device.

Type1 (or Type2) device may be capable of wirelessly coupling with multiple Type2 (or Type1) devices. Type1 (or Type2) device may be caused/controlled to switch/establish wireless coupling (e.g. association/authentication) from Type2 (or Type1) device to another Type2 (or another Type1) device. The switching may be controlled by server/hub device/processor/Type1 device/Type2 device. Radio channel may be different before/after switching. A second wireless signal may be transmitted between Type1 (or Type2) device and second Type2 (or second Type1) device through the second channel. A second TSCI of second channel may be extracted/obtained from second signal. The first/second signals, first/second channels, first/second Type1 device, and/or first/second Type2 device may be same/similar/co-located.

Type1 device may transmit/broadcast wireless signal to multiple Type2 devices, with/without establishing connection (association/authentication) with individual Type2 devices. It may transmit to a particular/common MAC address, which may be MAC address of some device (e.g. dummy receiver). Each Type2 device may adjust to particular MAC address to receive wireless signal. Particular MAC address may be associated with venue, which may be recorded in an association table of an Association Server (e.g. hub device). Venue may be identified by Type1 device/Type2 device based on wireless signal received at particular MAC address.

For example, Type2 device may be moved to a new venue. Type1 device may be newly set up in venue such that Type1 and Type2 devices are not aware of each other. During set up, Type1 device may be instructed/guided/caused/controlled (e.g. by dummy receiver, hardware pin setting/connection, stored setting, local setting, remote setting, downloaded setting, hub device, and/or server) to send wireless signal (e.g. series of probe signals) to particular MAC address. Upon power up, Type2 device may scan for probe signals according to a table of MAC addresses (e.g. stored in designated source, server, hub device, cloud server) that may be used for broadcasting at different locations (e.g. different MAC address used for different venue such as house/office/enclosure/floor/multi-storey building/store/airport/mall/stadium/hall/station/subway/lot/area/zone/region/district/city/country/continent). When Type2 device detects wireless signal sent to particular MAC address, it can use the table to identify venue.

Channel may be selected from a set of candidate/selectable/admissible channels. Candidate channels may be associated with different frequency bands/bandwidth/carrier frequency/modulation/wireless standards/coding/encryption/payload characteristics/network/ID/SSID/characteristics/settings/parameters. Particular MAC address/selected channel may be changed/adjusted/varied/modified over time (e.g. according to time table/rule/policy/mode/condition/situation/change). Selection/change may be based on availability/collision/traffic pattern/co-channel/inter-channel interference/effective bandwidth/random selection/pre-selected list/plan. It may be done by a server (e.g. hub device). They may be communicated (e.g. from/to Type1/Type2/hub/another device/local/edge/cloud server).

Wireless connection (e.g. association/authentication) between Type1 device and nearby/portable/another device may be established (e.g. using signal handshake). Type1 device may send first handshake signal (e.g. sounding frame/probe signal/request-to-send RTS) to the nearby/portable/another device. Nearby/portable/another device may reply to first signal by sending second handshake signal (e.g. command/clear-to-send/CTS) to Type1 device, triggering Type1 device to transmit/broadcast wireless signal to multiple Type2 devices without establishing connection with the Type2 devices. Second handshake signals may be response/acknowledge (e.g. ACK) to first handshake signal. Second handshake signal may contain information of venue/Type1 device. Nearby/portable/another device may be a dummy device with purpose (e.g. primary purpose, secondary purpose) to establish wireless connection with Type1 device, to receive first signal, or send second signal. Nearby/portable/another device may be physically attached to Type1 device.

In another example, nearby/portable/another device may send third handshake signal to Type1 device triggering Type1 device to broadcast signal to multiple Type2 devices without establishing connection with them. Type1 device may reply to third signal by transmitting fourth handshake signal to the another device.

Nearby/portable/another device may be used to trigger multiple Type1 devices to broadcast. It may have multiple RF circuitries to trigger multiple transmitters in parallel. Triggering may be sequential/partially sequential/partially/fully parallel. Parallel triggering may be achieved using additional device (s) to perform similar triggering in parallel to nearby/portable/another device. After establishing connection with Type1 device, nearby/portable/another device may suspend/stop communication with Type1 device. It may enter an inactive/hibernation/sleep/stand-by/low-power/OFF/power-down mode. Suspended communication may be resumed. Nearby/portable/another device may have the particular MAC address and Type1 device may send signal to particular MAC address.

The (first) wireless signal may be transmitted by a first antenna of Type1 device to some first Type2 device through a first channel in a first venue. A second wireless signal may be transmitted by a second antenna of Type1 device to some second Type2 device through a second channel in a second venue. First/second signals may be transmitted at first/second (sounding) rates respectively, perhaps to first/second MAC addresses respectively. Some first/second channels/signals/rates/MAC addresses/antennas/Type2 devices may be same/different/synchronous/asynchronous. First/second venues may have same/different sizes/shape/multipath characteristics. First/second venues/immediate areas around first/second antennas may overlap. First/second channels/signals may be WiFi+LTE (one being WiFi, one being LTE), or WiFi+WiFi, or WiFi (2.4 GHz)+WiFi (5 GHz), or WiFi (5 GHz, channel=a1, BW=a2)+WiFi (5 GHz/channel=b1, BW=b2). Some first/second items (e.g. channels/signals/rates/MAC addresses/antennas/Type1/Type2 devices) may be changed/adjusted/varied/modified over time (e.g. based on time table/rule/policy/mode/condition/situation/another change).

Each Type1 device may be signal source of multiple Type2 devices (i.e. it sends respective probe signal to respective Type2 device). Each respective Type2 device may choose asynchronously the Type1 device from among all Type1 devices as its signal source. TSCI may be obtained by each respective Type2 device from respective series of probe signals from Type1 device. Type2 device may choose Type1 device from among all Type1 devices as its signal source (e.g. initially) based on identity/identification/identifier of Type1/Type2 device, task, past signal sources, history, characteristics, signal strength/quality, threshold for switching signal source, and/or information of user/account/profile/access info/parameters/input/requirement/criteria.

Database of available/candidate Type1 (or Type2) devices may be initialized/maintained/updated by Type2 (or Type1) device. Type2 device may receive wireless signals from multiple candidate Type1 devices. It may choose its Type1 device (i.e. signal source) based on any of: signal quality/strength/regularity/channel/traffic/characteristics/properties/states/task requirements/training task outcome/MAC addresses/identity/identifier/past signal source/history/user instruction/another consideration.

An undesirable/bad/poor/problematic/unsatisfactory/unacceptable/intolerable/faulty/demanding/undesirable/inadequate/lacking/inferior/unsuitable condition may occur when (1) timing between adjacent probe signals in received wireless signal becomes irregular, deviating from agreed sounding rate (e.g. time perturbation beyond acceptable range), and/or (2) processed/signal strength of received signal is too weak (e.g. below third threshold, or below fourth threshold for significant percentage of time), wherein processing comprises any lowpass/bandpass/highpass/median/moving/weighted average/linear/nonlinear/smoothing filtering. Any thresholds/percentages/parameters may be time-varying. Such condition may occur when Type1/Type2 device become progressively far away, or when channel becomes congested.

Some settings (e.g. Type1-Type2 device pairing/signal source/network/association/probe signal/sounding rate/scheme/channel/bandwidth/system state/TSCI/TSMA/task/task parameters) may be changed/varied/adjusted/modified. Change may be according to time table/rule/policy/mode/condition (e.g. undesirable condition)/another change. For example, sounding rate may normally be 100 Hz, but changed to 1000 Hz in demanding situations, and to 1 Hz in low power/standby situation.

Settings may change based on task requirement (e.g. 100 Hz normally and 1000 Hz momentarily for 20 seconds). In task, instantaneous system may be associated adaptively/dynamically to classes/states/conditions (e.g. low/normal/high priority/emergency/critical/regular/privileged/non-subscription/subscription/paying/non-paying). Settings (e.g. sounding rate) may be adjusted accordingly. Change may be controlled by: server/hub/Type1/Type2 device. Scheduled changes may be made according to time table. Changes may be immediate when emergency is detected, or gradual when developing condition is detected.

Characteristics/STI/MI may be monitored/analyzed individually based on a TSCI associated with a particular Type1/Type2 device pair, or jointly based on multiple TSCI associated multiple Type1/Type2 pairs, or jointly based on any TSCI associated with the particular Type2 device and any Type1 devices, or jointly based on any TSCI associated with the particular Type1 device and any Type2 devices, or globally based on any TSCI associated with any Type1/Type2 devices.

A classifier/classification/recognition/detection/estimation/projection/feature extraction/processing/filtering may be applied (e.g. to CI/CI-feature/characteristics/STI/MI), and/or trained/re-trained/updated. In a training stage, training may be performed based on multiple training TSCI of some training wireless multipath channel, or characteristic/STI/MI computed from training TSCI, the training TSCI obtained from training wireless signals transmitted from training Type1 devices and received by training Type2 devices. Re-training/updating may be performed in an operating stage based on training TSCI/current TSCI. There may be multiple classes (e.g. groupings/categories/events/motions/expression/activities/objects/locations) associated with venue/regions/zones/location/environment/home/office/building/warehouse/facility object/expression/motion/movement/process/event/manufacturing/assembly-line/maintenance/repairing/navigation/object/emotional/mental/state/condition/stage/gesture/gait/action/motion/presence/movement/daily/activity/history/event.

Classifier may comprise linear/nonlinear/binary/multi-class/Bayes classifier/Fisher linear discriminant/logistic regression/Markov chain/Monte Carlo/deep/neural network/perceptron/self-organization maps/boosting/meta algorithm/decision tree/random forest/genetic programming/kernel learning/KNN/support vector machine (SVM).

Feature extraction/projection may comprise any of: subspace projection/principal component analysis (PCA)/independent component analysis (ICA)/vector quantization/singular value decomposition (SVD)/eigen-decomposition/eigenvalue/time/frequency/orthogonal/non-orthogonal decomposition, processing/preprocessing/postprocessing. Each CI may comprise multiple components (e.g. vector/combination of complex values). Each component may be preprocessed to give magnitude/phase or a function of such.

Feature may comprise: output of feature extraction/projection, amplitude/magnitude/phase/energy/power/strength/intensity, presence/absence/proximity/likelihood/histogram, time/period/duration/frequency/component/decomposition/projection/band, local/global/maximum (max)/minimum (min)/zero-crossing, repeating/periodic/typical/habitual/one-time/atypical/abrupt/mutually-exclusive/evolving/transient/changing/time/related/correlated feature/pattern/trend/profile/events/tendency/inclination/behavior, cause-and-effect/short-term/long-term/correlation/statistics/frequency/period/duration, motion/movement/location/map/coordinate/height/speed/acceleration/angle/rotation/size/volume, suspicious/dangerous/alarming event/warning/belief/proximity/collision, tracking/breathing/heartbeat/gait/action/event/statistical/hourly/daily/weekly/monthly/yearly parameters/statistics/analytics, well-being/health/disease/medical statistics/analytics, an early/instantaneous/contemporaneous/delayed indication/suggestion/sign/indicator/verifier/detection/symptom of a state/condition/situation/disease/biometric, baby/patient/machine/device/temperature/vehicle/parking lot/venue/lift/elevator/spatial/road/fluid flow/home/room/office/house/building/warehouse/storage/system/ventilation/fan/pipe/duct/people/human/car/boat/truck/airplane/drone/downtown/crowd/impulsive event/cyclo-stationary/environment/vibration/material/surface/3D/2D/local/global, and/or another measurable quantity/variable. Feature may comprise monotonic function of feature, or sliding aggregate of features in sliding window.

Training may comprise AI/machine/deep/supervised/unsupervised/discriminative training/auto-encoder/linear discriminant analysis/regression/clustering/tagging/labeling/Monte Carlo computation.

A current event/motion/expression/object in venue at current time may be classified by applying classifier to current TSCI/characteristics/STI/MI obtained from current wireless signal received by Type2 device in venue from Type1 devices in an operating stage. If there are multiple Type1/Type2 devices, some/all (or their locations/antenna locations) may be a permutation of corresponding training Type1/Type2 devices (or locations/antenna locations). Type1/Type2 device/signal/channel/venue/object/motion may be same/different from corresponding training entity. Classifier may be applied to sliding windows. Current TSCI/characteristics/STI/MI may be augmented by training TSCI/characteristics/STI/MI (or fragment/extract) to bootstrap classification/classifier.

A first section/segment (with first duration/starting/ending time) of a first TSCI (associated with first Type1-Type2 device pair) may be aligned (e.g. using dynamic time warping/DTW/matched filtering, perhaps based on some mismatch/distance/similarity score/cost, or correlation/auto-correlation/cross-correlation) with a second section/segment (with second duration/starting/ending time) of a second TSCI (associated with second Type1-Type2 device pair), with each CI in first section mapped to a CI in second section. First/second TSCI may be preprocessed. Some similarity score (component/item/link/segment-wise) may be computed. The similarity score may comprise any of: mismatch/distance/similarity score/cost. Component-wise similarity score may be computed between a component of first item (CI/feature/characteristics/STI/MI) of first section and corresponding component of corresponding mapped item (second item) of second section. Item-wise similarity score may be computed between first/second items (e.g. based on aggregate of corresponding component-wise similarity scores). An aggregate may comprise any of: sum/weighted sum, weighted average/robust/trimmed mean/arithmetic/geometric/harmonic mean, median/mode. Link-wise similarity score may be computed between first/second items associated with a link (TX-RX antenna pair) of first/second Type1-Type2 device pairs (e.g. based on aggregate of corresponding item-wise similarity scores). Segment-wise similarity score may be computed between first/second segments (e.g. based on aggregate of corresponding link-wise similarity scores). First/second segment may be sliding.

In DTW, a function of any of: first/second segment, first/second item, another first (or second) item of first (or second) segment, or corresponding timestamp/duration/difference/differential, may satisfy a constraint. Time difference between first/second items may be constrained (e.g. upper/lower bounded). First (or second) section may be entire first (or second) TSCI. First/second duration/starting/ending time may be same/different.

In one example, first/second Type1-Type2 device pairs may be same and first/second TSCI may be same/different. When different, first/second TSCI may comprise a pair of current/reference, current/current or reference/reference TSCI. For "current/reference", first TSCI may be current TSCI obtained in operating stage and second TSCI may be reference TSCI obtained in training stage. For "reference/reference", first/second TSCI may be two TSCI obtained during training stage (e.g. for two training events/states/classes). For "current/current", first/second TSCI may be two TSCI obtained during operating stage (e.g. associated with two different antennas, or two measurement setups). In another example, first/second Type1-Type2 device pairs may be different, but share a common device (Type1 or Type2).

Aligned first/second segments (or portion of each) may be represented as first/second vectors. Portion may comprise all items (for "segment-wise"), or all items associated with a TX-RX link (for "link-wise"), or an item (for "item-wise"), or a component of an item (for "component-wise"). Similarity score may comprise combination/aggregate/function of any of: inner product/correlation/autocorrelation/correlation indicator/covariance/discriminating score/distance/Euclidean/absolute/L_k/weighted distance (between first/second vectors). Similarity score may be normalized by vector length. A parameter derived from similarity score may be modeled with a statistical distribution. A scale/location/another parameter of the statistical distribution may be estimated.

Recall there may be multiple sliding segments. Classifier may be applied to a sliding first/second segment pair to obtain a tentative classification result. It may associate current event with a particular class based on one segment pair/tentative classification result, or multiple segment pairs/tentative classification results (e.g. associate if similarity scores prevail (e.g. being max/min/dominant/matchless/most significant/excel) or significant enough (e.g. higher/lower than some threshold) among all candidate classes for N consecutive times, or for a high/low enough percentage, or most/least often in a time period).

Channel information (CI) may comprise any of: signal strength/amplitude/phase/timestamp, spectral power measurement, modem parameters, dynamic beamforming information, transfer function components, radio state, measurable variables, sensing data/measurement, coarse/fine-grained layer information (e.g. PHY/MAC/datalink layer), digital gain/RF filter/frontend-switch/DC offset/correction/IQ-compensation settings, environment effect on wireless signal propagation, channel input-to-output transformation, stable behavior of environment, state profile, wireless channel measurements/received signal strength indicator (RSSI)/channel state information (CSI)/channel impulse response (CIR)/channel frequency response (CFR)/characteristics of frequency components (e.g. subcarriers)/channel characteristics/channel filter response, auxiliary information, data/meta/user/account/access/security/session/status/supervisory/device/network/household/neighborhood/environment/real-time/sensor/stored/encrypted/compressed/protected data, identity/identifier/identification.

Each CI may be associated with timestamp/arrival time/frequency band/signature/phase/amplitude/trend/characteristics, frequency-like characteristics, time/frequency/time-frequency domain element, orthogonal/non-orthogonal decomposition characteristics of signal through channel. Timestamps of TSCI may be irregular and may be corrected (e.g. by interpolation/resampling) to be regular, at least for a sliding time window.

TSCI may be/comprise a link-wise TSCI associated with an antenna of Type1 device and an antenna of Type2 device. For Type1 device with M antennas and Type2 device with N antennas, there may be MN link-wise TSCI.

CI/TSCI may be preprocessed/processed/postprocessed/stored/retrieved/transmitted/received. Some modem/radio state parameter may be held constant. Modem parameters may be applied to radio subsystem and may represent radio state. Motion detection signal (e.g. baseband signal, packet decoded/demodulated from it) may be obtained by processing (e.g. down-converting) wireless signal (e.g. RF/WiFi/LTE/5G/6G signal) by radio subsystem using radio state represented by stored modem parameters. Modem parameters/radio state may be updated (e.g. using previous modem parameters/radio state). Both previous/updated modem parameters/radio states may be applied in radio subsystem (e.g. to process signal/decode data). In the disclosed system, both may be obtained/compared/analyzed/processed/monitored.

Each CI may comprise N1 CI components (CIC) (e.g. time/frequency domain component, decomposition components), each with corresponding CIC index. Each CIC may comprise a real/imaginary/complex quantity, magnitude/phase/Boolean/flag, and/or some combination/subset. Each CI may comprise a vector/matrix/set/collection of CIC. CIC of TSCI associated with a particular CIC index may form a CIC time series. TSCI may be divided into N1 time series of CIC (TSCIC), each associated with respective CIC index. Characteristics/STI/MI may be monitored based on TSCIC. Some TSCIC may be selected based on some criteria/cost function/signal quality metric (e.g. SNR, interference level) for further processing.

Multi-component characteristics/STI/MI of multiple TSCIC (e.g. two components with indices 6 and 7, or three components indexed at 6, 7, 10) may be computed. In particular, k-component characteristics may be a function of k TSCIC with k corresponding CIC indices. With k=1, it is single-component characteristics which may constitute/form a one-dimensional (1D) function as CIC index spans all possible values. For k=2, two-component characteristics may constitute/form a 2D function. In special case, it may depend only on difference between the two indices. In such case, it may constitute 1D function. A total characteristics may be computed based on one or more multi-component characteristics (e.g. weighted average/aggregate). Characteristics/STI/MI of object/motion/expression may be monitored based on any multi-component characteristics/total characteristics.

Characteristics/STI/MI may comprise: instantaneous/short-/long-term/historical/repetitive/repeated/repeatable/recurring/periodic/pseudoperiodic/regular/habitual/incremental/average/initial/final/current/past/future/predicted/changing/deviational/change/time/frequency/orthogonal/non-orthogonal/transform/decomposition/deterministic/stochastic/probabilistic/dominant/key/prominent/representative/characteristic/significant/insignificant/indicative/common/averaged/shared/typical/prototypical/persistent/abnormal/abrupt/impulsive/sudden/unusual/unrepresentative/atypical/suspicious/dangerous/alarming/evolving/transient/one-time quantity/characteristics/analytics/feature/information, cause-and-effect, correlation indicator/score, auto/cross correlation/covariance, autocorrelation function (ACF), spectrum/spectrogram/power spectral density, time/frequency function/transform/projection, initial/final/temporal/change/trend/pattern/tendency/inclination/behavior/activity/history/profile/event, location/position/localization/spatial coordinate/change on map/path/navigation/tracking, linear/rotational/horizontal/vertical/location/distance/displacement/height/speed/velocity/acceleration/change/angular speed, direction/orientation, size/length/width/height/azimuth/area/volume/capacity, deformation/transformation, object/motion direction/angle/shape/form/shrinking/expanding, behavior/activity/movement, occurrence, fall-down/accident/security/event, period/frequency/rate/cycle/rhythm/count/quantity, timing/duration/interval, starting/initiating/ending/current/past/next time/quantity/information, type/grouping/classification/composition, presence/absence/proximity/approaching/receding/entrance/exit, identity/identifier, head/mouth/eye/breathing/heart/hand/handwriting/arm/body/gesture/leg/gait/organ characteristics, tidal volume/depth of breath/airflow rate/inhale/exhale time/ratio, gait/walking/tool/machine/complex motion, signal/motion characteristic/information/feature/statistics/parameter/magnitude/phase/degree/dynamics/anomaly/variability/detection/estimation/recognition/identification/indication, slope/derivative/ higher order derivative of function/feature/mapping/transformation of another characteristics, mismatch/distance/similarity score/cost/metric, Euclidean/statistical/weighted distance, L1/L2/Lk norm, inner/outer product, tag, test quantity, consumed/unconsumed quantity, state/physical/health/well-being/emotional/mental state, output responses, any composition/combination, and/or any related characteristics/information/combination.

Test quantities may be computed. Characteristics/STI/MI may be computed/monitored based on CI/TSCI/features/similarity scores/test quantities. Static (or dynamic) segment/profile may be identified/computed/analyzed/monitored/extracted/obtained/marked/presented/indicated/highlighted/stored/communicated by analyzing CI/TSCI/features/functions of features/test quantities/characteristics/STI/MI (e.g. target motion/movement presence/detection/estimation/recognition/identification). Test quantities may be based on CI/TSCI/features/functions of features/characteristics/STI/MI. Test quantities may be processed/tested/analyzed/compared.

Test quantity may comprise any/any function of: data/vector/matrix/structure, characteristics/STI/MI, CI information (CII, e.g. CI/CIC/feature/magnitude/phase), directional information (DI, e.g. directional CII), dominant/representative/characteristic/indicative/key/archetypal/example/paradigmatic/prominent/common/shared/typical/prototypical/averaged/regular/persistent/usual/normal/atypical/unusual/abnormal/unrepresentative data/vector/matrix/structure, similarity/mismatch/distance score/cost/metric, auto/cross correlation/covariance, sum/mean/average/weighted/trimmed/arithmetic/geometric/harmonic mean, variance/deviation/absolute/square deviation/averaged/median/total/standard deviation/derivative/slope/variation/total/absolute/square variation/spread/dispersion/variability, divergence/skewness/kurtosis/range/interquartile range/coefficient of variation/dispersion/L-moment/quartile coefficient of dispersion/mean absolute/square difference/Gini coefficient/relative mean difference/entropy/maximum (max)/minimum (min)/median/percentile/quartile, variance-to-mean ratio, max-to-min ratio, variation/regularity/similarity measure, transient event/behavior, statistics/mode/likelihood/histogram/probability distribution function (pdf)/moment generating function/expected function/value, behavior, repeatedness/periodicity/pseudo-periodicity, impulsiveness/suddenness/occurrence/recurrence, temporal profile/characteristics, time/timing/duration/period/frequency/trend/history, starting/initiating/ending time/quantity/count, motion classification/type, change, temporal/frequency/cycle change, etc.

Identification/identity/identifier/ID may comprise: MAC address/ASID/USID/AID/UID/UUID, label/tag/index, web link/address, numeral/alphanumeric ID, name/password/account/account ID, and/or another ID. ID may be assigned (e.g. by software/firmware/user/hardware, hardwired, via dongle). ID may be stored/retrieved (e.g. in database/memory/cloud/edge/local/hub server, stored locally/remotely/permanently/temporarily). ID may be associated with any of: user/customer/household/information/data/address/phone number/social security number, user/customer number/record/account, timestamp/duration/timing. ID may be made available to Type1/Type2 device/sensing/SBP initiator/responder. ID may be for registration/initialization/communication/identification/verification/detection/recognition/authentication/access control/cloud access/networking/social networking/logging/recording/cataloging/classification/tagging/association/pairing/transaction/electronic transaction/intellectual property control (e.g. by local/cloud/server/hub, Type1/Type2/nearby/user/another device, user).

Object may be person/pet/animal/plant/machine/user, baby/child/adult/older person, expert/specialist/leader/commander/manager/personnel/staff/officer/doctor/nurse/worker/teacher/technician/serviceman/repairman/passenger/patient/customer/student/traveler/inmate/high-value person/, object to be tracked, vehicle/car/AGV/drone/robot/wagon/transport/remote-controlled machinery/cart/moveable objects/goods/items/material/parts/components/machine/lift/elevator, merchandise/goods/cargo/people/items/food/package/luggage/equipment/cleaning tool in/on workflow/assembly-line/warehouse/factory/store/supermarket/distribution/logistic/transport/manufacturing/retail/wholesale/business center/facility/hub, phone/computer/laptop/tablet/dongle/plugin/companion/tool/peripheral/accessory/wearable/furniture/appliance/amenity/gadget, IoT/networked/smart/portable devices, watch/glasses/speaker/toys/stroller/keys/wallet/purse/handbag/backpack, goods/cargo/luggage/equipment/motor/machine/utensil/table/chair/air-conditioner/door/window/heater/fan, light/fixture/stationary object/television/camera/audio/video/surveillance equipment/parts, ticket/parking/toll/airplane ticket, credit/plastic/access card, object with fixed/changing/no form, mass/solid/liquid/gas/fluid/smoke/fire/flame, signage, electromagnetic (EM) source/medium, and/or another object.

Object may have multiple parts, each with different movement (e.g. position/location/direction change). Object may be a person walking forward. While walking, his left/right hands may move in different directions, with different instantaneous motion/speed/acceleration.

Object may/may not be communicatively coupled with some network, such as WiFi, MiFi, 4G/LTE/5G/6G/7G/8G, Bluetooth/NFC/BLE/WiMax/Zigbee/mesh/adhoc network. Object may be bulky machinery with AC power supply that is moved during installation/cleaning/maintenance/renovation. It may be placed on/in moveable platforms such as elevator/conveyor/lift/pad/belt/robot/drone/forklift/car/boat/vehicle. Type1/Type2 device may attach to/move with object. Type1/Type2 device may be part of/embedded in portable/another device (e.g. module/device with module, which may be large/sizeable/small/heavy/bulky/light, e.g. coin-sized/cigarette-box-sized). Type1/Type2/portable/another device may/may not be attached to/move with object, and may have wireless (e.g. via Bluetooth/BLE/Zigbee/NFC/WiFi) or wired (e.g. USB/micro-USB/Firewire/HDMI) connection with a nearby device for network access (e.g. via WiFi/cellular network). Nearby device may be object/phone/AP/IoT/device/appliance/peripheral/amenity/furniture/vehicle/gadget/wearable/networked/computing device. Nearby device may be connected to some server (e.g. cloud server via network/internet). It may/may not be portable/moveable, and may/may not move with object. Type1/Type2/portable/nearby/another device may be powered by battery/solar/DC/AC/other power source, which may be replaceable/non-replaceable, and rechargeable/non-rechargeable. It may be wirelessly charged.

Type1/Type2/portable/nearby/another device may comprise any of: computer/laptop/tablet/pad/phone/printer/monitor/battery/antenna, peripheral/accessory/socket/plug/charger/switch/adapter/dongle, internet-of-thing (IoT), TV/sound bar/HiFi/speaker/set-top box/remote control/panel/gaming device, AP/cable/broadband/router/repeater/extender, appliance/utility/fan/refrigerator/washer/dryer/microwave/oven/stove/range/light/lamp/tube/pipe/tap/lightng/air-conditioner/heater/smoke detector, wearable/watch/ glasses/goggle/button/bracelet/chain/jewelry/ring/belt/ clothing/garment/fabric/shirt/pant/dress/glove/handwear/ shoe/footwear/hat/headwear/bag/purse/wallet/makeup/ cosmetic/ornament/book/magazine/paper/stationary/ signage/poster/display/printed matter, furniture/fixture/ table/desk/chair/sofa/bed/cabinet/shelf/rack/storage/box/ bucket/basket/packaging/carriage/tile/shingle/brick/block/ mat/panel/curtain/cushion/pad/carpet/material/building material/glass, amenity/sensor/clock/pot/pan/ware/con-tainer/bottle/can/utensil/plate/cup/bowl/toy/ball/tool/pen/ racket/lock/bell/camera/microphone/painting/frame/mirror/ coffee-maker/door/window, food/pill/medicine, embeddable/implantable/gadget/instrument/equipment/de-vice/apparatus/machine/controller/mechanical tool, garage-opener, key/plastic/payment/credit card/ticket, solar panel, key tracker, fire-extinguisher, garbage can/bin, WiFi-en-abled device, smart device/machine/machinery/system/ house/office/building/warehouse/facility/vehicle/car/bi-cycle/motorcycle/boat/vessel/airplane/cart/wagon, home/ vehicle/office/factory/building/manufacturing/production/ computing/security/another device.

One/two/more of Type1/Type2/portable/nearby/another device/server may determine an initial characteristics/STI/ MI of object, and/or may share intermediate information. One of Type1/Type2 device may move with object (e.g. "Tracker Bot"). The other one of Type1/Type2 device may not move with object (e.g. "Origin Satellite", "Origin Reg-ister"). Either may have known characteristics/STI/MI. Ini-tial STI/MI may be computed based on known STI/MI.

Venue may be any space such as sensing area, room/ house/home/office/workplace/building/facility/warehouse/ factory/store/vehicle/property, indoor/outdoor/enclosed/ semi-enclosed/open/semi-open/closed/over-air/floating/ underground space/area/structure/enclosure, space/area with wood/glass/metal/material/structure/frame/beam/panel/col-umn/wall/floor/door/ceiling/window/cavity/gap/opening/re-flection/refraction medium/fluid/construction material/ fixed/adjustable layout/shape, human/animal/plant body/ cavity/organ/bone/blood/vessel/air-duct/windpipe/teeth/ soft/hard/rigid/non-rigid tissue, manufacturing/repair/ maintenance/mining/parking/storage/transportation/ shipping/logistic/sports/entertainment/amusement/public/ recreational/government/community/seniors/elderly care/ geriatric/space facility/terminal/hub, distribution center/ store, machine/engine/device/assembly line/workflow, urban/rural/suburban/metropolitan area, staircase/escalator/ elevator/hallway/walkway/tunnel/cave/cavern/channel/ duct/pipe/tube/lift/well/pathway/roof/basement/den/alley/ road/path/highway/sewage/ventilation system/network, car/ truck/bus/van/container/ship/boat/submersible/train/tram/ airplane/mobile home, stadium/city/playground/park/field/ track/court/gymnasium/hall/mart/market/supermarket/ plaza/square/construction site/hotel/museum/school/ hospital/university/garage/mall/airport/train/bus station/ terminal/hub/platform, valley/forest/wood/terrain/ landscape/garden/park/patio/land, and/or gas/oil/water pipe/ line. Venue may comprise inside/outside of building/facility. Building/facility may have one/multiple floors, with a por-tion underground.

A event may be monitored based on TSCI. Event may be object/motion/gesture/gait related, such as fall-down, rota-tion/hesitation/pause, impact (e.g. person hitting sandbag/ door/bed/window/chair/table/desk/cabinet/box/another per-son/animal/bird/fly/ball/bowling/tennis/soccer/volley ball/ football/baseball/basketball), two-body action (e.g. person releasing balloon/catching fish/molding clay/writing paper/ typing on computer), car moving in garage, person carrying smart phone/walking around venue, autonomous/moveable object/machine moving around (e.g. vacuum cleaner/utility/ self-driving vehicle/car/drone).

Task may comprise: (a) sensing task, any of: monitoring/ sensing/detection/recognition/estimation/verification/identi-fication/authentication/classification/locationing/guidance/ navigation/tracking/counting of/in any of: object/objects/ vehicle/machine/tool/human/baby/elderly/patient/intruder/ pet presence/proximity/activity/daily-activity/well-being/ breathing/vital sign/heartbeat/health condition/sleep/sleep stage/walking/location/distance/speed/acceleration/naviga-tion/tracking/exercise/safety/danger/fall-down/intrusion/se-curity/life-threat/emotion/movement/motion/degree/pattern/ periodic/repeated/cyclo-stationary/stationary/regular/ transient/sudden/suspicious motion/irregularity/trend/ change/breathing/human biometrics/environment informatics/gait/gesture/room/region/zone/venue, (b) com-putation task, any of: signal processing/preprocess/postpro-cessing/conditioning/denoising/calibration/analysis/feature extraction/transformation/mapping/supervised/unsuper-vised/semi-supervised/discriminative/machine/deep learn-ing/training/clustering/training/PCA/eigen-decomposition/ frequency/time/functional decomposition/neural network/ map-based/model-based processing/correction/geometry estimation/analytics computation, (c) IoT task, any of: smart task for venue/user/object/human/pet/house/home/office/ workplace/building/facility/warehouse/factory/store/ve-hicle/property/structure/assembly-line/IoT/device/system, energy/power management/transfer, wireless power transfer, interacting/engage with user/object/intruder/human/animal (e.g. presence/motion/gesture/gait/activity/behavior/voice/ command/instruction/query/music/sound/image/vide o/lo-cation/movement/danger/threat detection/recognition/moni-toring/analysis/response/execution/synthesis, generate/ retrieve/play/display/render/synthesize dialog/exchange/ response/presentation/experience/media/multimedia/ expression/sound/speech/music/image/imaging/video/ animation/webpage/text/message/notification/reminder/ enquiry/warning, detect/recognize/monitor/interpret/ analyze/record/store user/intruder/object input/motion/ gesture/location/activity), activating/controlling/configuring (e.g. turn on/off/control/lock/unlock/open/close/adjust/con-figure) a device/system (e.g. vehicle/drone/electrical/me-chanical/air-conditioning/heating/lighting/ventilation/ clearning/entertainment/IoT/security/siren/access system/ device/door/window/garage/lift/elevator/escalator/speaker/ television/light/peripheral/accessory/wearable/furniture/ appliance/amenity/gadget/alarm/camera/gaming/coffee/ cooking/heater/fan/housekeeping/home/office machine/ device/robot/vacuum cleaner/assembly line), (d) miscellaneous task, any of: transmission/coding/encryption/ storage/analysis of data/parameters/analytics/derived data, upgrading/administration/configuration/coordination/broad-casting/synchronization/networking/encryption/communi-cation/protection/compression/storage/database/archiving/ query/cloud computing/presentation/augmented/virtual reality/other processing/task. Task may be performed by some of: Type1/Type2/nearby/portable/another device, and/ or hub/local/edge/cloud server.

Task may also comprise: detect/recognize/monitor/locate/ interpret/analyze/record/store user/visitor/intruder/object/ pet, interact/engage/converse/dialog/exchange with user/ob-ject/visitor/intruder/human/baby/pet, detect/locate/localize/ recognize/monitor/analyze/interpret/learn/train/respond/ execute/synthesize/generate/record/store/summarize health/ well-being/daily-life/activity/behavior/pattern/exercise/ food-intake/restroom visit/work/play/rest/sleep/relaxation/ danger/routine/timing/habit/trend/normality/normalcy/ anomaly/regularity/irregularity/change/presence/motion/ gesture/gait/expression/emotion/state/stage/voice/command/instruction/question/query/music/sound/location/ movement/fall-down/threat/discomfort/sickness/ environment/, generate/retrieve/play/display/render/ synthesize dialog/exchange/response/presentation/report/ experience/media/multimedia/expression/sound/speech/ music/image/imaging/video/animation/webpage/text/ message/notification/reminder/enquiry/warning, detect/ recognize/monitor/interpret/analyze/record/store user/ intruder/object input/motion/gesture/location/activity), detect/check/monitor/locate/manage/control/adjust/config-ure/lock/unlock/arm/disarm/open/close/fully/partially/acti-vat e/turn on/off some system/device/object (e.g. vehicle/ robot/drone/electrical/mechanical/air-conditioning/heating/ ventilation/HVAC/lighting/cleaning/entertainment/IoT/ security/siren/access systems/devices/items/components, door/window/garage/lift/elevator/escalator/speaker/televi-sion/light/peripheral/accessory/wearable/furniture/appli-ance/amenity/gadget/alarm/camera/gaming/coffee/cooking/ heater/fan/housekeeping/home/office machine/device/ vacuum cleaner/assembly line/window/garage/door/blind/ curtain/panel/solar panel/sun shade), detect/monitor/locate user/pet do something (e.g. sitting/sleeping on sofa/in bed-room/running on treadmill/cooking/watching TV/eating in kitchen/dining room/going upstairs/downstairs/outside/in-side/using rest room), do something (e.g. generate message/ response/warning/clarification/notification/report) automati-cally upon detection, do something for user automatically upon detecting user presence, turn on/off/wake/control/ad-just/dim light/music/radio/TV/HiFi/STB/computer/speaker/ smart device/air-conditioning/ventilation/heating system/ curtains/light shades, turn on/off/pre-heat/control coffee-machine/hot-water-pot/cooker/oven/microwave oven/ another cooking device, check/manage temperature/setting/ weather forecast/telephone/message/mail/system check, present/interact/engage/dialog/converse (e.g. through smart speaker/display/screen; via webpage/email/messaging sys-tem/notification system).

When user arrives home by car, task may be to, automati-cally, detect user/car approaching, open garage/door upon detection, turn on driveway/garage light as user approaches garage, and/or turn on air conditioner/heater/fan. As user enters house, task may be to, automatically, turn on entrance light/off driveway/garage light, play greeting message to welcome user, turn on user's favorite music/radio/news/ channel, open curtain/blind, monitor user's mood, adjust lighting/sound environment according to mood/current/im-minent event (e.g. do romantic lighting/music because user is scheduled to eat dinner with girlfriend soon) on user's calendar, warm food in microwave that user prepared in morning, do diagnostic check of all systems in house, check weather forecast for tomorrow/news of interest to user, check calendar/to-do list, play reminder, check telephone answering/messaging system/email, give verbal report using dialog system/speech synthesis, and/or remind (e.g. using audible tool such as speakers/HiFi/speech synthesis/sound/ field/voice/music/song/dialog system, using visual tool such as TV/entertainment system/computer/notebook/tablet/dis-play/light/color/brightness/patterns symbols, using haptic/ virtual reality/gesture/tool, using smart device/appliance/ material/furniture/fixture, using server/hub device/cloud/ fog/edge server/home/mesh network, using messaging/ notification/communication/scheduling/email tool, using UI/GUI, using scent/smell/fragrance/taste, using neural/ner-vous system/tool, or any combination) user of someone's birthday/call him, prepare/give report. Task may turn on air conditioner/heater/ventilation system in advance, and/or adjust temperature setting of smart thermostat in advance. As user moves from entrance to living room, task may be to turn on living room light, open living room curtain, open window, turn off entrance light behind user, turn on TV/set-top box, set TV to user's favorite channel, and/or adjust an appliance according to user's preference/conditions/states (e.g. adjust lighting, choose/play music to build romantic atmosphere).

When user wakes up in morning, task may be to detect user moving around in bedroom, open blind/curtain/win-dow, turn off alarm clock, adjust temperature from night-time to day-time profile, turn on bedroom light, turn on restroom light as user approaches restroom, check radio/ streaming channel and play morning news, turn on coffee machine, preheat water, and/or turn off security system. When user walks from bedroom to kitchen, task may be to turn on kitchen/hallway lights, turn off bedroom/restroom lights, move music/message/reminder from bedroom to kitchen, turn on kitchen TV, change TV to morning news channel, lower kitchen blind, open kitchen window, unlock backdoor for user to check backyard, and/or adjust tempera-ture setting for kitchen.

When user leaves home for work, task may be to detect user leaving, play farewell/have-a-good-day message, open/ close garage door, turn on/off garage/driveway light, close/ lock all windows/doors (if user forgets), turn off appliance (e.g. stove/microwave/oven), turn on/arm security system, adjust light/air-conditioning/heating/ventilation systems to "away" profile to save energy, and/or send alerts/reports/ updates to user's smart phone.

Motion may comprise any of: no-motion, motion sequence, resting/non-moving motion, movement/change in position/location, daily/weekly/monthly/yearly/repeating/ activity/behavior/action/routine, transient/time-varying/fall-down/repeating/repetitive/periodic/pseudo-periodic motion/ breathing/heartbeat, deterministic/non-deterministic/ probabilistic/chaotic/random motion, complex/combination motion, non-/pseudo-/cyclo-/stationary random motion, change in electro-magnetic characteristics, human/animal/ plant/body/machine/mechanical/vehicle/drone motion, air-/ wind-/weather-/water-/fluid-/ground/sub-surface/seismic motion, man-machine interaction, normal/abnormal/danger-ous/warning/suspicious motion, imminent/rain/fire/flood/ tsunami/explosion/collision, head/facial/eye/mouth/tongue/ neck/finger/hand/arm/shoulder/upper/lower/body/chest/ abdominal/hip/leg/foot/joint/knee/elbow/skin/below-skin/ subcutaneous tissue/blood vessel/intravenous/organ/heart/ lung/stomach/intestine/bowel/eating/breathing/talking/ singing/dancing/coordinated motion, facial/eye/mouth expression, and/or hand/arm/gesture/gait/UI/keystroke/typ-ing stroke.

Type1/Type2 device may comprise heterogeneous IC, low-noise amplifier (LNA), power amplifier, transmit-re-ceive switch, media access controller, baseband radio, and/ or 2.4/3.65/4.9/5/6/sub-7/over-7/28/60/76 GHz/another radio. Heterogeneous IC may comprise processor/memory/ software/firmware/instructions. It may support broadband/ wireless/mobile/mesh/cellular network, WLAN/WAN/ MAN, standard/IEEE/3GPP/WiFi/4G/LTE/5G/6G/7G/8G, IEEE 802.11/a/b/g/n/ac/ad/af/ah/ax/ay/az/be/bf/15/16, and/ or Bluetooth/BLE/NFC/Zigbee/WiMax.

Processor may comprise any of: general-/special-/pur-pose/embedded/multi-core processor, microprocessor/mi-crocontroller, multi-/parallel/CISC/RISC processor, CPU/ GPU/DSP/ASIC/FPGA, and/or logic circuit. Memory may comprise non-/volatile, RAM/ROM/EPROM/EEPROM, hard disk/SSD, flash memory, CD-/DVD-ROM, magnetic/optical/organic/storage system/network, network/cloud/edge/local/external/internal storage, and/or any non-transitory storage medium. Set of instructions may comprise machine executable codes in hardware/IC/software/firmware, and may be embedded/pre-loaded/loaded upon-boot-up/on-the-fly/on-demand/pre-installed/installed/down-loaded.

Processing/preprocessing/postprocessing may be applied to data (e.g. TSCI/feature/characteristics/STI/MI/test quantity/intermediate/data/analytics) and may have multiple steps. Step/pre-/post-/processing may comprise any of: computing function of operands/LOS/non-LOS/single-link/multi-link/component/item/quantity, magnitude/norm/phase/feature/energy/timebase/similarity/distance/characterization score/measure computation/extraction/correction/cleaning, linear/nonlinear/FIR/IIR/MA/AR/ARMA/Kalman/particle filtering, lowpass/bandpass/highpass/median/rank/quartile/percentile/mode/selective/adaptive filtering, interpolation/intrapolation/extrapolation/decimation/subsampling/upsampling/resampling, matched filtering/enhancement/restoration/denoising/smoothing/conditioning/spectral analysis/mean subtraction/removal, linear/nonlinear/inverse/frequency/time transform, Fourier transform (FT)/DTFT/DFT/FFT/wavelet/Laplace/Hilbert/Hadamard/trigonometric/sine/cosine/DCT/power-of-2/sparse/fast/frequency transform, zero/cyclic/padding, graph-based transform/processing, decomposition/orthogonal/non-orthogonal/over-complete projection/eigen-decomposition/SVD/PCA/ICA/compressive sensing, grouping/folding/sorting/comparison/soft/hard/thresholding/clipping, first/second/high order derivative/integration/convolution/multiplication/division/addition/subtraction, local/global/maximization/minimization, recursive/iterative/constrained/batch processing, least mean square/absolute error/deviation, cost function optimization, neural network/detection/recognition/classification/identification/estimation/labeling/association/tagging/mapping/remapping/training/clustering/machine/supervised/unsupervised/semi-supervised learning/network, vector/quantization/encryption/compression/matching pursuit/scrambling/coding/storing/retrieving/transmitting/receiving/time-domain/frequency-domain/normalization/scaling/expansion/representing/merging/combining/splitting/tracking/monitoring/shape/silhouette/motion/activity/analysis, pdf/histogram estimation/importance/Monte Carlo sampling, error detection/protection/correction, doing nothing, time-varying/adaptive processing, conditioning/weighted/averaging/over selected components/links, arithmetic/geometric/harmonic/trimmed mean/centroid/medoid computation, morphological/logical operation/permutation/combination/sorting/AND/OR/XOR/union/intersection, vector operation/addition/subtraction/multiplication/division, and/or another operation. Processing may be applied individually/jointly. Acceleration using GPU/DSP/coprocessor/multicore/multiprocessing may be applied.

Function may comprise: characteristics/feature/magnitude/phase/energy, scalar/vector/discrete/continuous/polynomial/exponential/logarithmic/trigonometric/transcendental/logical/piecewise/linear/algebraic/nonlinear/circular/piecewise linear/real/complex/vector-valued/inverse/absolute/indicator/limiting/floor/rounding/sign/composite/sliding/moving function, derivative/integration, function of function, one-to-one/one-to-many/many-to-one/many-to-many function, mean/mode/median/percentile/max/min/ range/statistics/histogram, local/global max/min/zero-crossing, variance/variation/spread/dispersion/deviation/standard deviation/divergence/range/interquartile range/total variation/absolute/total deviation, arithmetic/geometric/harmonic/trimmed mean/square/cube/root/power, thresholding/clipping/rounding/truncation/quantization/approximation, time function processed with an operation (e.g. filtering), sine/cosine/tangent/cotangent/secant/cosecant/elliptical/parabolic/hyperbolic/game/zeta function, probabilistic/stochastic/random/ergodic/stationary/deterministic/periodic/repeated function, inverse/transformation/frequency/discrete time/Laplace/Hilbert/sine/cosine/triangular/wavelet/integer/power-of-2/sparse transform, orthogonal/non-orthogonal/eigen projection/decomposition/eigenvalue/singular value/PCA/ICA/SVD/compressive sensing, neural network, feature extraction, function of moving window of neighboring items of time series, filtering function/convolution, short-time/discrete transform/Fourier/cosine/sine/Hadamard/wavelet/sparse transform, matching pursuit, approximation, graph-based processing/transform/graph signal processing, classification/identification/class/group/category/labeling, processing/preprocessing/postprocessing, machine/learning/detection/estimation/feature extraction/learning network/feature extraction/denoising/signal enhancement/coding/encryption/mapping/vector quantization/remapping/lowpass/highpass/bandpass/matched/Kalman/particle/FIR/IIR/MA/AR/ARMA/median/mode/adaptive filtering, first/second/high order derivative/integration/zero crossing/smoothing, up/down/random/importance/Monte Carlo sampling/resampling/converting, interpolation/extrapolation, short/long term statistics/auto/cross correlation/moment generating function/time averaging/weighted averaging, special/Bessel/Beta/Gamma/Gaussian/Poisson/integral complementary error function.

Sliding time window may have time-varying width/size. It may be small/large at beginning to enable fast/accurate acquisition and increase/decrease over time to steady-state size comparable to motion frequency/period/transient motion duration/characteristics/STI/MI to be monitored. Window size/time shift between adjacent windows may be constant/adaptively/dynamically/automatically changed/adjusted/varied/modified (e.g. based on battery life/power consumption/available computing power/change in amount of targets/nature of motion to be monitored/user request/choice/instruction/command).

Characteristics/STI/MI may be determined based on characteristic value/point of function and/or associated argument of function (e.g. time/frequency). Function may be outcome of a regression. Characteristic value/point may comprise local/global/constrained/significant/first/second/i^th maximum/minimum/extremum/zero-crossing (e.g. with positive/negative time/frequency/argument) of function. Local signal-to-noise-ratio (SNR) or SNR-like parameter may be computed for each pair of adjacent local max (peak)/local min (valley) of function, which may be some function (e.g. linear/log/exponential/monotonic/power/polynomial) of fraction or difference of a quantity (e.g. power/magnitude) of local max over the quantity of local min. Local max (or min) may be significant if its SNR is greater than threshold and/or if its amplitude is greater (or smaller) than another threshold. Local max/min may be selected/identified/computed using persistence-based approach. Some significant local max/min may be selected based on selection criterion (e.g. quality criterion/condition, strongest/consistent significant peak in a range). Unselected significant peaks may be stored/monitored as "reserved" peaks for use in future selection in future sliding time windows. E.g. a particular peak (e.g. at particular argument/time/frequency) may appear consistently over time. Initially, it may be significant but not selected (as other peaks may be stronger). Later, it may become stronger/dominant consistently. When selected, it may be back-traced in time and selected in earlier time to replace previously selected peaks (momentarily strong/dominant but not persistent/consistent). Consistency of peak may be measured by trace, or duration of being significant. Alternatively, local max/min may be selected based on finite state machine (FSM). Decision thresholds may be time-varying, adjusted adaptively/dynamically (e.g. based on back-tracing timing/FSM, or data distribution/statistics).

A similarity score (SS)/component SS may be computed based on two temporally adjacent CI/CIC, of one TSCI or of two different TSCI. The pair may come from same/different sliding window (s). SS or component SS may comprise: time reversal resonating strength (TRRS), auto/cross correlation/covariance, inner product of two vectors, L1/L2/Lk/Euclidean/statistical/weighted/distance score/norm/metric/quality metric, signal quality condition, statistical characteristics, discrimination score, neural network/deep learning network/machine learning/training/discrimination/weighted averaging/preprocessing/denoising/signal conditioning/filtering/time correction/timing compensation/phase offset compensation/transformation/component-wise operation/feature extraction/FSM, and/or another score.

Any threshold may be fixed (e.g. 0, 0.5, 1, 1.5, 2), pre-determined and/or adaptively/dynamically determined (e.g. by FSM, or based on time/space/location/antenna/path/link/state/battery life/remaining battery life/available resource/power/computation power/network bandwidth). Threshold may be applied to test quantity to differentiate two events/conditions/situations/states, A and B. Data (e.g. CI/TSCI/feature/similarity score/test quantity/characteristics/STI/MI) may be collected under A/B in training situation. Test quantity (e.g. its distribution) computed based on data may be compared under A/B to choose threshold based on some criteria (e.g. maximum likelihood (ML), maximum aposterior probability (MAP), discriminative training, minimum Type 1 (or 2) error for given Type 2 (or 1) error, quality criterion, signal quality condition). Threshold may be adjusted (e.g. to achieve different sensitivity), automatically/semi-automatically/manually/adaptively/dynamically, once/sometimes/often/periodically/repeatedly/occasionally/sporadically/on-demand (e.g. based on object/movement/location direction/action/characteristics/STI/MI/size/property/trait/habit/behavior/venue/feature/fixture/furniture/barrier/material/machine/living thing/thing/boundary/surface/medium/map/constraint/model/event/state/situation/condition/time/timing/duration/state/history/u ser/preference). An iterative algorithm may stop after N iterations, after time-out period, or after test quantity satisfies a condition (e.g. updated quantity greater than threshold) which may be fixed/adaptively/dynamically adjusted.

Searching for local extremum may comprise constrained/minimization/maximization, statistical/dual/constraint/convex/global/local/combinatorial/infinite-dimensional/multi-objective/multi-modal/non-differentiable/particle-swarm/simulation-based optimization, linear/nonlinear/quadratic/higher-order regression, linear/nonlinear/stochastic/constraint/dynamic/mathematical/disjunctive/convex/semidefinite/conic/cone/interior/fractional/integer/sequential/quadratic programming, conjugate/gradient/subgradient/coordinate/reduced descent, Newton's/simplex/iterative/point/ellipsoid/quasi-Newton/interpolation/memetic/genetic/evolutionary/pattern-/gravitational-search method/algorithm, constraint satisfaction, calculus of variations, optimal control, space mapping, heuristics/meta-heuristics, numerical analysis, simultaneous perturbation stochastic approximation, stochastic tunneling, dynamic relaxation, hill climbing, simulated annealing, differential evolution, robust/line/Tabu/reactive search/optimization, curve fitting, least square, variational calculus, and/or variant. It may be associated with an objective/loss/cost/utility/fitness/energy function.

Regression may be performed using regression function to fit data, or function (e.g. ACF/transform/mapped) of data, in regression window. During iterations, length/location of regression window may be changed. Regression function may be linear/quadratic/cubic/polynomial/another function. Regression may minimize any of: mean/weighted/absolute/square deviation, error, aggregate/component/weighted/mean/sum/absolute/square/high-order/another error/cost (e.g. in projection domain/selected axes/orthogonal axes), robust error (e.g. first error (e.g. square) for smaller error magnitude, second error (e.g. absolute) for larger error magnitude), and/or weighted sum/mean of multiple errors (e.g. absolute/square error). Error associated with different links/path may have different weights (e.g. link with less noise may have higher weight). Regression parameter (e.g. time-offset associated with max/min regression error of regression function in regression window, location/width of window) may be initialized and/or updated during iterations (e.g. based on target value/range/profile, characteristics/STI/MI/test quantity, object motion/quantity/count/location/state, past/current trend, location/amount/distribution of local extremum in previous windows, carrier/subcarrier frequency/bandwidth of signal, amount of antennas associated with the channel, noise characteristics, histogram/distribution/central/F-distribution, and/or threshold). When converged, current time offset may be at center/left/right (or fixed relative location) of regression window.

In presentation, information may be displayed/presented (e.g. with venue map/environmental model). Information may comprise: current/past/corrected/approximate/map/location/speed/acceleration/zone/region/area/segmentation/coverage-area, direction/path/trace/history/traffic/summary, frequently-visited areas, customer/crowd event/distribution/behavior, crowd-control information, acceleration/speed/vital-sign/breathing/heart-rate/activity/emotion/sleep/state/rest information, motion-statistics/MI/STI, presence/absence of motion/people/pets/object/vital sign, gesture (e.g. hand/arm/foot/leg/body/head/face/mouth/eye)/meaning/control (control of devices using gesture), location-based gesture-control/motion-interpretation, identity/identifier (ID) (e.g. of object/person/user/pet/zone/region, device/machine/vehicle/drone/car/boat/bicycle/TV/air-con/fan/, self-guided machine/device/vehicle), environment/weather information, gesture/gesture control/motion trace, earthquake/explosion/storm/rain/fire/temperature, collision/impact/vibration, event/door/window/open/close/fall-down/accident/burning/freezing/water-/wind-/air-movement event, repeated/pseudo-periodic event (e.g. running on treadmill, jumping up/down, skipping rope, somersault), and/or vehicle event. Location may be one/two/three dimensional (e.g. expressed/represented as 1D/2D/3D rectangular/polar coordinates), relative (e.g. w.r.t. map/environmental model) or relational (e.g. at/near/distance-from a point, halfway between two points, around corner, upstairs, on table top, at ceiling, on floor, on sofa).

Information (e.g. location) may be marked/displayed with some symbol. Symbol may be time-varying/flashing/pulsating with changing color/intensity/size/orientation. Symbol may be a number reflecting instantaneous quantity (e.g. analytics/gesture/state/status/action/motion/breathing/heart rate, temperature/network traffic/connectivity/remaining power). Symbol/size/orientation/color/intensity/rate/characteristics of change may reflect respective motion. Information may be in text or presented visually/verbally (e.g. using pre-recorded voice/voice synthesis)/mechanically (e.g. animated gadget, movement of movable part).

User device may comprise smart phone/tablet/speaker/camera/display/TV/gadget/vehicle/appliance/device/IoT, device with UI/GUI/voice/audio/record/capture/sensor/playback/display/animation/VR/AR (augmented reality)/voice (assistance/recognition/synthesis) capability, and/or tablet/laptop/PC.

Map/floor plan/environmental model (e.g. of home/office/building/store/warehouse/facility) may be 2-/3-/higher-dimensional. It may change/evolve over time (e.g. rotate/zoom/move/jump on screen). Walls/windows/doors/entrances/exits/forbidden areas may be marked. It may comprise multiple layers (overlays). It may comprise maintenance map/model comprising water pipes/gas pipes/wiring/cabling/air ducts/crawl-space/ceiling/underground layout.

Venue may be segmented/subdivided/zoned/grouped into multiple zones/regions/sectors/sections/territories/districts/precincts/localities/neighborhoods/areas/stretches/expance such as bedroom/living/dining/rest/storage/utility/warehouse/conference/work/walkway/kitchen/foyer/garage/first/second floor/offices/reception room/area/regions. Segments/regions/areas may be presented in map/floor plan/model with presentation characteristic (e.g. brightness/intensity/luminance/color/chrominance/texture/animation/flashing/rate).

An example of disclosed system/apparatus/method. Stephen and family want to install disclosed wireless motion detection system to detect motion in their 2000 sqft two-storey town house in Seattle, Washington. Because his house has two storeys, Stephen decides to use one Type2 device (named A) and two Type1 devices (named B and C) in ground floor. His ground floor has three rooms: kitchen, dining and living rooms arranged in straight line, with dining room in middle. He put A in dining room, and B in kitchen and C in living room, partitioning ground floor into 3 zones (dining room, living room, kitchen). When motion is detected by AB pair and/or AC pair, system would analyze TSCI/feature/characteristics/STI/MI and associate motion with one of 3 zones.

When Stephen and family go camping in holiday, he uses mobile phone app (e.g. Android phone app or iPhone app) to turn on motion detection system. If system detects motion, warning signal is sent to Stephen (e.g. SMS, email, push message to mobile phone app). If Stephen pays monthly fee (e.g. $10/month), a service company (e.g. security company) will receive warning signal through wired (e.g. broadband)/wireless (e.g. WiFi/LTE/5G) network and perform security procedure (e.g. call Stephen to verify any problem, send someone to check on house, contact police on behalf of Stephen).

Stephen loves his aging mother and cares about her well-being when she is alone in house. When mother is alone in house while rest of family is out (e.g. work/shopping/vacation), Stephen turns on motion detection system using his mobile app to ensure mother is ok. He uses mobile app to monitor mother's movement in house. When Stephen uses mobile app to see that mother is moving around house among the three regions, according to her daily routine, Stephen knows that mother is ok. Stephen is thankful that motion detection system can help him monitor mother's well-being while he is away from house.

On typical day, mother would wake up at 7 am, cook her breakfast in kitchen for 20 minutes, eat breakfast in dining room for 30 minutes. Then she would do her daily exercise in living room, before sitting down on sofa in living room to watch favorite TV show. Motion detection system enables Stephen to see timing of movement in 3 regions of house. When motion agrees with daily routine, Stephen knows roughly that mother should be doing fine. But when motion pattern appears abnormal (e.g. no motion until 10 am, or in kitchen/motionless for too long), Stephen suspects something is wrong and would call mother to check on her. Stephen may even get someone (e.g. family member/neighbor/paid personnel/friend/social worker/service provider) to check on mother.

One day Stephen feels like repositioning a device. He simply unplugs it from original AC power plug and plugs it into another AC power plug. He is happy that motion detection system is plug-and-play and the repositioning does not affect operation of system. Upon powering up, it works right away.

Sometime later, Stephen decides to install a similar setup (i.e. one Type2 and two Type1 devices) in second floor to monitor bedrooms in second floor. Once again, he finds that system set up is extremely easy as he simply needs to plug Type2 device and Type1 devices into AC power plug in second floor. No special installation is needed. He can use same mobile app to monitor motion in both ground/second floors. Each Type2 device in ground/second floors can interact with all Type1 devices in both ground/second floors. Stephen has more than double capability with combined systems.

Disclosed system can be applied in many applications. Type1/Type2 devices may be any WiFi-enabled devices (e.g. smart IoT/appliance/TV/STB/speaker/refrigerator/stove/oven/microwave/fan/heater/air-con/router/phone/computer/tablet/accessory/plug/pipe/lamp/smoke detector/furniture/fixture/shelf/cabinet/door/window/lock/sofa/table/chair/piano/utensil/wearable/watch/tag/key/ticket/belt/wallet/pen/hat/necklace/implantable/phone/eyeglasses/glass panel/gaming device) at home/office/facility, on table, at ceiling, on floor, or at wall. They may be placed in conference room to count people. They may form a well-being monitoring system to monitor daily activities of older adults and detect any sign of symptoms (e.g. dementia, Alzheimer's disease). They may be used in baby monitors to monitor vital signs (breathing) of babies. They may be placed in bedrooms to monitor sleep quality and detect any sleep apnea. They may be placed in cars to monitor well-being of passengers and drivers, detect sleepy drivers or babies left in hot cars. They may be used in logistics to prevent human trafficking by monitoring any human hidden in trucks/containers. They may be deployed by emergency service at disaster area to search for trapped victims in debris. They may be deployed in security systems to detect intruders.

In some embodiments, the present disclosure discloses HRNet, a deep neural network system based on cGAN architecture, to achieve high-resolution object (human) silhouette images, which can be used for object (e.g. human) identification. HRNet can use radar spatial spectrum (e.g. generated using a modified MUSIC algorithm) as input. It may be trained with some reference images (e.g. images/video obtained from some reference device, Kinect images, depth images, infra-red images, visual/RGB/YUV/YIQ/YCbCr images) as ground truth.

In some embodiments, the reconstructed high resolution object images can be used in sensing applications such as pose estimation, human identification, elderly monitoring, activity recognition. Compared with traditional camera-based or depth sensor-based imaging, RF imaging is robust to atmospheric conditions such as smoke, fog, and/or changing lighting conditions. Furthermore, the ubiquitous availability of devices and smaller size of antenna arrays provide light-weight, cost-effective solutions with easy deployment.

In some embodiments, the disclosed system can be tested using a commodity mmWave radar device operating at 60 GHz. In some examples, experiments performed with seven users (human objects) in three different environments show that the disclosed system can reconstruct object (e.g. human) images with mean silhouette difference when compared with Kinect images. Moreover, the system achieved a high average classification accuracy for twelve users and for seven users in unseen environments; thereby verifying robustness to environment changes.

WiFi sensing, as a part of RF sensing, has been widely explored for various (e.g. human) sensing applications such as vital sign monitoring, activity sensing, human/object tracking, etc. However, imaging is still challenging as the smaller bandwidth and limited antennas inherently limit the resolution. Nevertheless, object (e.g. human) body reconstruction and pose estimation have become feasible with deep-learning approaches. Previous works highly depend on the data patterns in the training dataset, which includes the environment information. As a result, the approaches may not generalize well to unseen environments. Given the impracticality of gathering training data samples from every new environment, there is a demand for a more robust approach that can learn to generate environment-independent features suitable for the required task.

Millimeter wave (mmWave) signals provide higher resolution due to their larger bandwidth and antenna arrays, making it easier to distinguish between a human subject and the surrounding environment to exact environment-independent features, which enable high-resolution applications such as keystroke recognition, handwriting tracking and sound separation. Using this finer resolution information from the mmWave devices, accurate object (e.g. human) pose estimation and tracking can be achieved using Frequency-Modulated-Continuous-Wave (FMCW) radar and deep neural networks. Due to the sparsity and high dimensionality of point cloud data, point cloud-based methods rely on complex network architectures that require larger data sets for training. Moreover, point cloud data can be easily corrupted by noise, which can significantly change the model's performance. Thus, it is crucial to ensure high-quality data collection. On the other hand, range-velocity heatmaps-based models have lower complexity than point cloud networks. However, these models still require larger datasets to capture different data patterns and cannot capture unique human features as they rely on pre-defined key points estimation. The resolution of some work is limited and does not capture unique features of the object (e.g. human) body that can be used to identify the object (e.g. human) target.

In some embodiments, to improve the resolution and overcome the aforementioned challenges, HRNet (High-Resolution Neural Network) is disclosed with a novel deep neural network design to create high-resolution images from low-resolution spatial spectrums. The design followed the conditional Generative Adversarial Network (cGAN) architecture, which has been used in automobile capturing using radar. Given the larger size and more defined shapes, automobile imaging is easier than human imaging. Moreover, the weaker reflections from the object (e.g. human) body make it harder to capture the object (e.g. human) image with high enough accuracy. To tackle these challenges, the cGAN design is modified to integrate multiple loss functions in the training stage to extract critical information about the object (e.g. human) body structure. The system can combine additional modality (e.g. RGB modality, Kinect depth maps) to extract finer details. Furthermore, the system may use the UNet architecture within the generator, rather than the encoder-decoder module, to retain more information during downsampling. With the above modifications, HRNet generates high-resolution images for a dataset with 12 different users in some embodiments.

In an embodiment, the system uses a 60 GHz commodity mmWave device with a 802.11ad chipset which has a colocated transmitter and receiver antenna arrays with 32 antennas. FIG. 1 illustrates an example framework of a system 100 for encoder-decoder-based high resolution imaging, according to some embodiments of the present disclosure.

In some embodiments, cGAN of HRNet has a generator (G) and a discriminator (D). The system may first pre-process the channel information (e.g. channel impulse response/CIR) received from the mmWave device to remove background information and estimate the environment-independent spatial spectrum using the MUSIC algorithm. This estimated spatial spectrum allows the system to extract human features from the CIR, thereby simplifying the training process. The resolution of the preprocessed input may be further improved using HRNet, which includes a "generator" (G) and a "discriminator" (D). The generator uses a UNet network design with a k1-dimensional ("k1"-D, e.g. 3D) encoder and a k2-dimensional ("k2-D", e.g. 2D) decoder. The k1 may be greater than k2, equal to k2, or smaller than k2.

Figure 2:
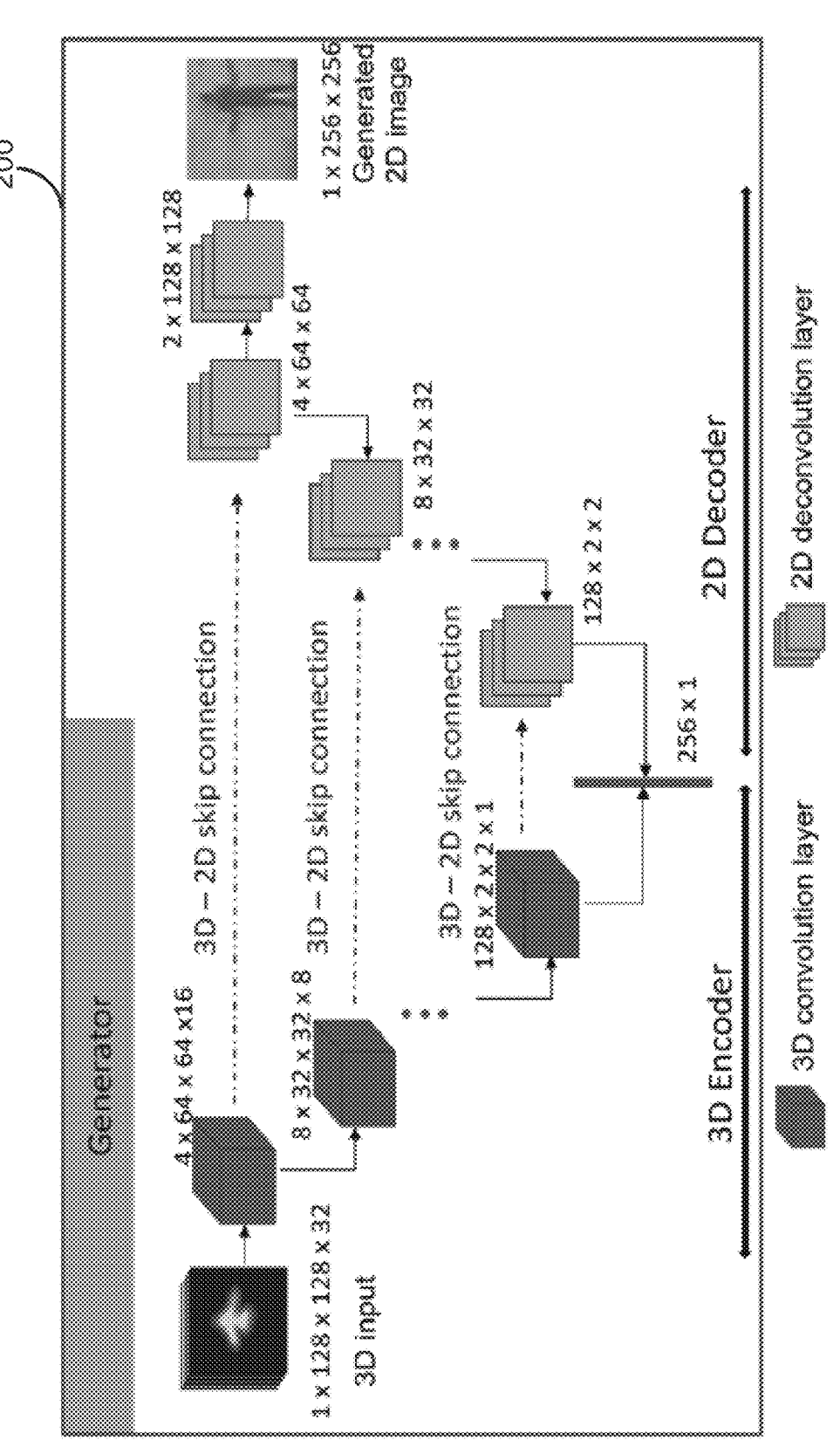
FIG. 2 illustrates an example architecture of a generator in a system for encoder-decoder-based high resolution imaging, according to some embodiments of the present disclosure.

In some embodiments, the generator has a k1-D encoder and k2-D decoder. One goal here is for the generator (the k1-D encoder and k2-D decoder) of the HRNet to take a k1-D input and generate a k2-D output. The k1-D encoder has k1-D input (an input matrix of size $M_1 \times M_2 \times \ldots \times M(k_1)$) and 1-D intermediate output (a vector of size P). The k2-D decoder takes the 1-D intermediate output and has k2-D output (an output matrix of size $N_1 \times N_2 \times \ldots \times N(k_2)$). FIG. 2 illustrates an example architecture of a generator 200 in a system for encoder-decoder-based high resolution imaging, according to some embodiments of the present disclosure, where for $k_1 = 3$, $k_2 = 2$.

In some embodiments, (k2+1)-D input is generated for the encoder. For each transmitter (or receiver), a respective k2-D spatial spectrum (e.g. 2D image for $k_2 = 2$) may be obtained using the MUSIC (or modified MUSIC) algorithm. When there are multiple transmitters (or receivers) in the mmWave device, multiple k2-D spatial spectrums may be obtained. The multiple k2-D spatial spectrums may be stacked/combined to generate/create/form a (k2+1)-D input (e.g. 3D input for $k_2 = 2$) for the HRNet. In this case, $k_1 = k_2 + 1$, and the goal of the HRNet is to use the (k2+1)-D input to generate the k2-D output. The input dimension ($k_1 = k_2 + 1$) is different from the output dimension ($k_2$).

In some embodiments, for a special case of $k_2 = 2$, HRNet may generate a 2D output image based on 3D input formed by stacking multiple 2D spatial spectrum. Let the size of the 2D spatial spectrum (a 2D matrix) be $M_1 \times M_2$. Suppose there are M3 transmitter (or receiver) such that there may be M3 $M_1 \times M_2$ spatial spectrums. A 3D input matrix of size $M_1 \times M_2 \times M_3$ may be formed by stacking the M3 spatial spectrums each of size $M_1 \times M_2$. In this case, the goal of HRNet may be to generate a 2D output matrix of size N1×N2 based on the 3D input matrix of size M1×M2×M3.

In some embodiments, for resolution improvement, with k1>=k2, the goal is for the output to have higher resolution/ size than the input. Thus N1>=M1, and N2>=M2. For example, N1=2*M1, and N2=2*M2. Or, N1=1.7*M1, N2=2*M2. Or, N1=3*M1 and N2=4*M2. (The input aspect ratio may be same as or different from the output aspect ratio.)

In some embodiments, (k2+2)-D input is generated for the encoder. In one embodiment, the (k2+1)-D input at multiple time instances may be considered/used together by the HRNet to generate the k2-D output. A (k2+2)-D input may be generated as input to the HRNet by stacking/combining the multiple (k2+1)-D input at the multiple time instances. In this case, k1=k2+2 and the goal is to use the (k2+2)-D input to generate the k2-D output. For the case of k2=2, suppose M4 time instances are used. Then a 4D matrix of size M1×M2×M3×M4 may be formed by stacking the M4 3D matrices each of size M1×M2×M3. And the goal is to generate a 2D output matrix of size N1×N2 based on the 4D input matrix of size M1×M2×M3×M4. The k2=2 case may be suitable for the scenario in which the target is stationary/ motionless during the given time instances such that generating a high-resolution 2D output image of the target is desirable. For the scenario that the target is moving during the given time instances, generating 3D output (k2=3, e.g. video or a sequence of images) from the 4D input data may be desirable.

In some embodiments, (k2+3)-D input is generated for the encoder. In one embodiment, multiple mmWave devices may be placed/positioned at different locations/depths/ angles and may be used by the HRNet to generate the k2-D output. Suppose the multiple time instance may be used together by the HRNet also such that a (k2+2)-D may be generated for each mmWave device. Using the multiple mmWave devices, a (k2+3)-D input may be generated as input to the HRNet by stacking/combining the multiple (k2+2)-D matrices. In this case, k1=k2+3 and the goal is to use the (k2+3)-D input to generate the k2-D output. For the case of k2=2, suppose M5 mmWave device are used. Then a 5D matrix of size M1×M2×M3×M4×M5 may be formed by stacking the M5 4D matrices each of size M1×M2×M3× M4. The goal is to generate a 2D output matrix of size N1×N2 based on the 5D input matrix of size M1×M2×M3× M4×M5. In some embodiments, recursively, a k1-D input (matrix) may be generated by stacking/combining multiple (k1−1)-D input (matrix).

In some embodiments, there are multiple generator/discriminator pairs in HRNet. In one embodiment, the HRNet may comprise multiple generator/discriminator pairs, each pair with respective k1-D encoder and respective k2-D decoder in the respective generator. The pair of (k1, k2) may be different for different generators (or for different generator/discriminator pairs). In a first generator/discriminator pair (or first generator), the respective k1 may be greater than the respective k2. In a second generator/discriminator pair (or second generator), the respective k1 may be equal to the respective k2. In a third generator/discriminator pair (or third generator), the respective k1 may be less than the respective k2.

In some embodiments, outputs of multiple generators are aligned/aggregated. The respective k1 and/or k2 parameters of the multiple generators may be same/different. The respective outputs (i.e. the set of respective k2-D output) of the multiple generators may have same/different size (even for those with same dimension k2). The respective outputs of some (or all) generators may be partially/totally aligned/ not aligned. The outputs (especially the aligned outputs) may be fused/aggregated/combined (e.g. sum, weighted sum, product, weighted product, average, weighted average, arithmetic mean, geometric mean, harmonic mean, median, mode, percentile, etc.) to generate a fused/aggregated/combined output. In particular, some (or all) output elements/ pixels/matrix elements of some/all outputs may be aligned, and the aligned elements/pixels may be fused/aggregated/ combined to generate respective fused/aggregated/combined output element/pixels.

In some embodiments, HRNet may have a GAN structure with a generator/discriminator pair to synthesize/generate synthetic output (the k2-D output) based on input z (the k1-D input). The generator may have an encoder/decoder structure. A U-Net-based structure (with associated "skip connections") may be added to the GAN structure of HRNet to capture both global and local structures, enabled by per-pixel (or per-element) feedbacks. HRNet may further have a conditional GAN structure in which additional information from different modalities (e.g. RGB image, kinect, depth) may be used (e.g. in discriminator). As the task may be imaging of object such as person, the different modalities may include RGB image, gray scale image, depth (e.g. from kinect). Loss function for training may incorporate perceptual/visual/structural measures.

Figure 3:
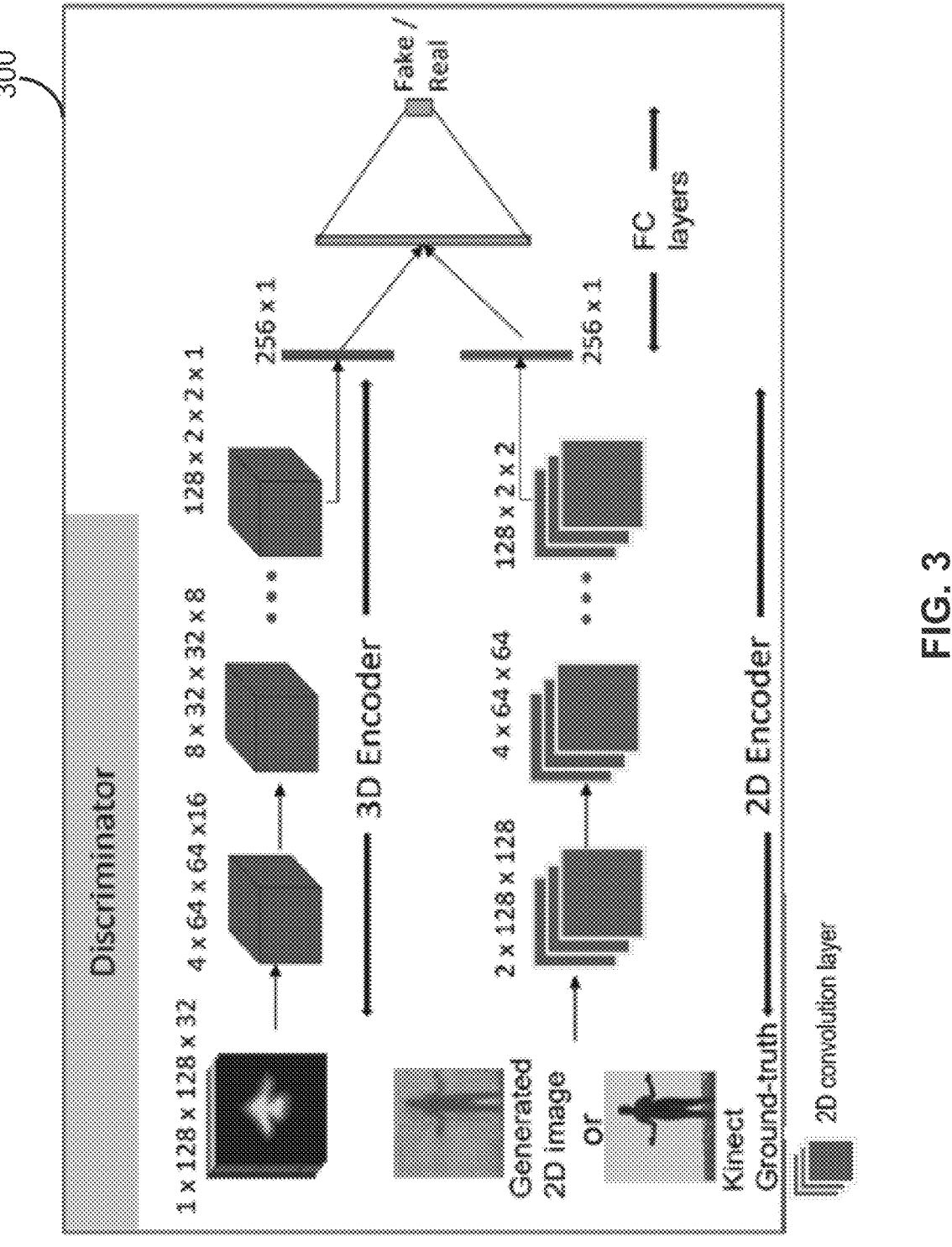
FIG. 3 illustrates an example architecture of a discriminator in a system for encoder-decoder-based high resolution imaging, according to some embodiments of the present disclosure.

FIG. 3 illustrates an example architecture of a discriminator 300 in a system for encoder-decoder-based high resolution imaging, according to some embodiments of the present disclosure, with 2 stream network architecture. In some embodiments of a cGAN structure, the generator G creates synthetic samples while the discriminator D differentiates between synthetic and natural samples. They compete in an adversarial game to improve the generator's ability to generate genuine-like (e.g. resembling/"appearing" to be genuine) synthetic samples and the discriminator's ability to identify between the genuine sample and the genuine-like synthetic samples. The aim is to produce synthetic samples that closely approximate their natural counterparts. This constitutes a min-max optimization task: $\min\_G \{\max\_D (L\_\{GAN\})\}$ wherein $L\_\{GAN\}=E\_x[\log D(x)]+E\_z[\log(1-D(G(z)))]$, and E is cross entropy of binary classifier of binary classifier of the discriminator. The task of the generator G is to minimize the generator loss to generate synthesized samples that cannot be distinguished by the discriminator D: $\min\_G (L\_\{GAN\})$. The task of the discriminator D is to separate real samples and synthesized samples better: $\max\_D (L\_\{GAN\})$. In typical GAN/cGAN structure, the input z of the generator and the output G(z) of the generator have same dimensions (e.g. both k2-D). They may even have same sizes. But in some embodiments, input and output may have different dimensions (k1-D input, k2-D output).

In an embodiment, an innovative feature of HRNet is that the input z and the output G(z) may have same/different dimensions and/or same/different sizes. In particular, the k1-D input matrix z and the k2-D output matrix G(z) may have different dimensions and different sizes (input size of M1×M2× . . . ×M(k1) versus output size of N1×N2× . . . ×N(k2)).

The generator G may comprise an encoder and a decoder. In some embodiments, encoder input matrix is expanded. In the encoder, the k1-D input matrix of size M1×M2× . . . ×M(k1) may be expanded/converted/changed/considered/ represented as an expanded, higher dimensional (k1+k3)-D matrix, with k3 additional/expanded dimensions added to the original/initial k1 dimensions and a size of 1 in each of the k3 additional/expanded dimensions. For example, for k3=1, the k1-D input matrix may be considered as (k1+1)-D expanded matrix of size P1×M1×M2× . . . ×M(k1), where P1=1. Or, the k1-D input matrix may be considered as (k1+2)-D expanded matrix of size P1×P2×M1×M2× . . . ×M(k1), where P1=P2=1. Or, the k1-D input matrix may be considered as (k1+3)-D expanded matrix of size P1×P2× P3×M1×M2× . . . ×M(k1), where P1=P2=P3=1. And so on.

In some embodiments, the encoder of the generator G may comprise a series/sequence/concatenation of L1 layers/ stages/steps/operations E^i to progressively "downsample" the expanded (k1+k3)-D matrix to a lower-dimensional intermediate output y, where y=E^{L1}(E^{L1−1}( . . . E^2(E^1(z)) . . . )). For example, E^1 is first applied. Then E^2. Then E^3. And so on. E^{L1} is the last.

In some embodiments, for each layer/stage/step/operation E^i, the respective input matrix and the respective output matrix may have same dimension and same/different sizes. In general, the input matrix of E^i is the output matrix of E^{i−1}. The output matrix of E^i is the input matrix of E^{i+1}. The input matrix of E^1 is the (k3+k1)-D expanded matrix of size P1×P2× . . . P(k3)×M1×M2× . . . ×M(k1).

In some embodiments, downsampling in "original" dimensions of output matrix size is performed over encoder layers. For E^i, let the respective input matrix be of size P1^{i−1}×P2^{i−1}× . . . ×P(k3)^{i−1}×M1^{i−1}×M2^{i−1}× . . . ×M(k1) ^{i−1}. Let the respective output matrix be of size P1^{i}×P2^{i}× . . . ×P(k3)^{i}×M1^{i}×M2^{i}× . . . ×M(k1) ^{i}. The size of the "original dimensions" (i.e. dimensions associated with M1, M2, . . . , M(k1)) may be progressively reduced. In other words, M1^{i}<=M1^{i−1}; M2^{i}<=M2^{i−1}; . . . ; M(k1)^{i}<=M(k1)^{i−1}. In one embodiment, the size of the "original dimensions" may be recursively halved (i.e. reduced by a factor of 2), with M1^{i}=M1^{i−1}/2; M2^{i}=M2^{i−1}/2; . . . ; M(k1) ^{i}=M(k1)^{i−1}/2. For any dimension (e.g. the dimension associated with M3), the recursive down-sampling may continue until the size of the dimension becomes 1 (e.g. until M3^{k}=1) at which point the size reduction (for that dimension) stops (e.g. down-sampling/size-reduction for the dimension associated with M3 stops when M3^{k}=1). If the halving operation gives a non-integer, the halved value may be rounded up or down.

In some embodiments, upsampling in "expanded" dimensions of output matrix size is performed over encoder layers. While the size of the "original dimensions" may be progressively reduced, the size of the "expanded dimensions" (i.e. dimensions associated with P1, P2, . . . , P(k3)) may be progressively increased. In other words, P1^{i}>=P1^{i−1}; P2^{i}>=P2^{i−1}; . . . ; P(k3)^{i}>=P(k3)^{i−1}. In one embodiment, the size of the expanded dimensions may be doubled recursively (i.e. increased by a factor of 2), with P1^{i}=P1^{i−1}*2; P2^{i}=P2^{i−1}*2; . . . ; P(k3)^{i}>=P(k3)^{i−1}*2.

In some embodiments, effective dimension reduction is performed in intermediate encoder output. After the L1 layers/stages/steps/operations (E^1, E^2, . . . , E^{L1}), the size in some/all of the "original" dimension may be reduced to 1. Let Q be the amount of dimensions of the intermediate output y with corresponding size (of each such dimension) reduced to 1. Not counting the Q dimensions with size 1, the remaining dimensions (or effective dimensions) of y may be k3+k1−Q (as any dimension with a size of 1 may be considered trivial/immaterial/redundant). The Q may be less than, equal to, or larger than k1 or k3. The effective dimension of y may be greater than, equal to, or less than k1 or k3. In one embodiment, the effective dimension k3+k1−Q is equal to k3 (i.e. Q=k1). In particular, k3+k1−Q may be equal to 1 if Q=k1 and k3=1. When the effective dimension is 1, the size of y in the dimension (the final, non-trivial dimension) can be any number greater than 1.

In some embodiments, processing is performed in each encoder layer. Each layer/stage/step/operation E^i may comprise applying convolution with zero padding using respective kernels and down-sampling (e.g. using max-pooling) with respective strides in respective dimensions (e.g. a stride of 2 when the respective size halved, a stride of 4 when the respective size is reduced by a factor of 4, and so on). ReLU (rectified linear unit, with activation function f(x)=x for x>0 and f(x)=0 for x<=0) or Re-LU activation may be applied. The respective kernel may be a (k1+k3)-D kernel. In any dimension of any kernel, the respective size of the kernel in the dimension may be any positive integer. The (k1+k3)-D kernel may be separable/non-separable. The (k1+k3)-D kernel may be a matrix generated/computed based on two or more 1-dimensional (1-D) kernels (each 1-D kernel being a vector). The (k1+k3)-D kernel may be computed based on an outer-product of two 1-D kernels (outer-product of two vectors), or an outer-product of a 1-D kernel and a multi-dimensional kernel.

In some embodiments, there may be multiple k1-D encoder kernels. There may be a different amount of k1-D kernels for different layers/stages/steps/operations. The amount of any layer/stage/step/operation may be a function of the respective output matrix size (e.g. P1^{i}× P2^{i}× . . . ×P(k3)^{i}×M1^{i}×M2^{i}× . . . ×M(k1) ^{i}). For E^i, the multiple k1-D kernels may comprise a total of (P1^{i}/P1^{i−1})×(P2^{i}/P2^{i−1})× . . . ×(P(k3) ^{i}/P (k3)*^{i−1}) of the k1-D kernels, wherein each of P1^{i}/ P1^{i−1}, P2^{i}/P2^{i−1}, . . . , P(k3) ^{i}/P(k3)*^{i−1} is an integer. Each k1-D kernel may be applied to the original dimensions (i.e. convolution may be performed in the original dimensions using each k1-D kernel).

In some embodiments, the k1-D input matrix z may be constructed by stacking M(k1)*M(k1−1)* . . . *M(k2+1) spatial spectrums each being k2-D (each spatial spectrum being of size M1×M2× . . . ×M(k2)). For the case of k1>k2, one or more or all k1-D kernels may be k2-D kernels that may be applied to the k2 dimensions associated with the k2-D spatial spectrums.

In some embodiments, there may be multiple k2-D encoder kernels. There may be a different amount of k2-D kernels for different layers/stages/steps/operations. Recall that the k1-D input matrix z may be constructed by stacking M(k1)×M(k1−1)× . . . ×M(k2+1) spatial spectrums each being k2-D (each spatial spectrum being of size M1× M2× . . . ×M(k2)). And k1 may be greater than k2. For E^i, the multiple k2-D kernel may comprise a total of (P1^{i}/ P1^{i−1})×(P2^{i}/P2^{i−1})× . . . ×(P(k3)^{i}/P(k3)^{i−1})×M(k1)×M(k1-1)× . . . ×M(k2+1) of the k2-D kernels. Each k2-D kernel may be applied to the k2 dimensions associated with the k2-D spatial spectrums.

In some embodiments, in HRNet, the decoder of the generator may take the intermediate output y of the encoder as input matrix and generate a k2-D output matrix G(z) of size N1×N2× . . . ×N(k2). The decoder may comprise a series/sequence/concatenation of L2 layers/stages/steps/operations D^i to progressively "upsample" y to generate the k2-D output matrix G(z), where G(z)=D^{L2}(D^ {L2−1}( . . . D^2(D^1(y)) . . . )). For example, D^1 is first applied. Then D^2. Then D^3. And so on. D^{L2} is the last. The L2 may be greater than, equal to, or smaller than L1.

In some embodiments, the input matrix of D^1 may be a (k2+k3)-D matrix y3, which is derived from the (k1+k3)-D intermediate output matrix y of size $P1^{\{LL\}}\times P2^{\{L1\}}\times \ldots \times P(k3)^{\{L1\}}\times M1^{\{L1\}}\times M2^{\{L1\}}\times \ldots \times M(k1)^{\{L1\}}$. As described above, the size of Q dimensions of y may be 1 such that the effective dimension of y may be (k1+k3−Q). Q may be equal to k1 such that k1+k3−Q may be equal to k3. In particular, the trivial dimensions of y (i.e. those dimensions with size 1 in y) may be those associated with the k1 original dimensional and the remaining non-trivial dimensions may be the k3 expanded dimensions. And the size of y may be $P1^{\{L\}}\times P2^{\{L1\}}\times \ldots \times P(k3)^{\{L1\}}\times 1\times 1\times \ldots \times 1$, wherein $M1^{\{L1\}}=M2^{\{L1\}}=\ldots=M(k1)^{\{L1\}}=1$. If k1>=k2, the matrix y3 is constructed from y by removing k1-k2 trivial dimensions, such that the size of y3 may be $P1^{\{L1\}}\times P2^{\{L1\}}\times \ldots \times P(k3)^{\{L1\}}\times 1\times 1\times \ldots \times 1$, wherein $M1^{\{L1\}}=M2^{\{L1\}}=\ldots=M(k2)^{\{L1\}}=1$. If k1<k2, the matrix y3 is constructed from y by adding k2-k1 trivial dimensions, such that the size of y3 may be $P1^{\{L\}}\times P2^{\{L1\}}\times \ldots \times P(k3)^{\{L1\}}\times 1\times 1\times \ldots \times 1$, wherein $M1^{\{L1\}}=M2^{\{L1\}}=\ldots=M(k2)^{\{L1\}}=1$. The output matrix of $D^{\wedge}1$ may be a (k3+k2)-D matrix of size $P1^{\{L1+1\}}\times P2^{\{L1+1\}}\times \ldots \times P(k3)^{\{L1+1\}}\times M1^{\{L1+1\}}\times M2^{\{L1+1\}}\times \ldots \times M(k2)^{\{L1+1\}}$.

In some embodiments, up-sampling in "original" dimensions of output matrix size is performed over subsequent decoder layers. For each subsequent layer/stage/step/operation $D^{\wedge}i=2, 3, \ldots L2$), let the respective input matrix of $D^{\wedge}i$ be of size $P1^{\{L1+i-1\}}\times P2^{\{L1+i-1\}}\times \ldots \times P(k3)^{\{L1+i-1\}}\times M1^{\{L1+i-1\}}\times M2^{\{L1+i-1\}}\times \ldots \times M(k2)^{\{L1+i-1\}}$. And let the respective output matrix of $D^{\wedge}i$ be of size $P1^{\{L1+i\}}\times P2^{\{L1+i\}}\times \ldots \times P(k3)^{\{L1+i\}}\times M1^{\{L1+i\}}\times M2^{\{L1+i\}}\times \ldots \times M(k2)^{\{L1+i\}}$. The size of the "original dimensions" may be progressively increased. In other words, $M1^{\{L1+i\}}>=M1^{\{L1+i-1\}}$; $M2^{\{L1+i\}}>=M2^{\{L1+i-1\}};\ldots;M(k2)^{\{L1+i\}}>=M(k2)^{\{L1+i-1\}}$. In one embodiment, the size of the "original dimensions" may be recursively doubled (i.e. increased by a factor of 2), with $M1^{\{L1+i\}}=M1^{\{L1+i-1\}}*2; M2^{\{L1+i\}}=M2^{\{L1+i-1\}}*2;\ldots;M(k1)^{\{L1+i\}}>=M(k1)^{\{L1+i-1\}}*2$, until the size reaches the target value in $N1\times N2\times \ldots \times N(k2)$ at which point the size doubling stops.

In some embodiments, down-sampling in "expanded" dimensions of output matrix size is performed over subsequent decoder layers. While the size of the "original dimensions" may be progressively increased, the size of the expanded dimensions may be progressively reduced. In other words, $P1^{\{L1+i\}}<=P1^{\{L1+i-1\}}$; $P2^{\{L1+i\}}<=P2^{\{L1+i-1\}};\ldots;P(k3)^{\{L1+i\}}<=P(k3)^{\{L1+i-1\}}$. In one embodiment, the size of the expanded dimensions may be halved recursively (i.e. reduced by a factor of 2), with $P1^{\{L1+i\}}=P1^{\{L1+i-1\}}/2; P2^{\{L1+i\}}=P2^{\{L1+i-1\}}/2;\ldots;P(k3)^{\{L1+i\}}>=P(k3)^{\{L1+i-1\}}/2$, until the size becomes 1 at which point the size reduction stops. If the halving operation gives a non-integer, the halved value may be rounded up or down. After L2 layers/stages/steps/operations, $P1^{\{L1+L2\}}=1; P2^{\{L1+L2\}}=1;\ldots;P(k3)^{\{L1+L2\}}=1$ in the final output matrix. Removing trivial size-1 dimensions, the final output matrix may become the k2-D output matrix G(z).

In some embodiments, processing is performed in each decoder layer. Each layer/stage/step/operation $E^{\wedge}i$ may comprise applying a deconvolution using a respective kernel and an upsampling with a respective stride in respective dimension (e.g. a stride of 2 or 0.5 when the respective size doubled). ReLU or Re-LU activation may be applied. The respective kernel may be a (k2+k3)-D kernel. The (k2+k3)-D kernel may be separable/non-separable. The (k2+k3)-D kernel may be a matrix generated/computed based on two or more 1-dimensional (1-D) kernels (each 1-D kernel being a vector). The (k2+k3)-D kernel may be computed based on an outer-product of two 1-D kernels (outer-product of two vectors), or an outer-product of a 1-D kernel and a multi-dimensional kernel.

In some embodiments, there may be multiple k2-D encoder kernels. There may be a different amount of k2-D kernels for different layers/stages/steps/operations. For $D^{\wedge}i$, the multiple k2-D kernel may comprise a total of $(P1^{\{L1+i-1\}}/P1^{\{L1+i\}})\times(P2^{\{L1+i-1\}}/P2^{\{L1+i\}})\times \ldots \times (P(k3)^{\{L1+i-1\}}/P(k3)^{\{L1+i\}})$ of the k2-D kernels. Each k2-D kernel may be applied to the k2 dimensions associated with the k2-D spatial spectrums.

In some embodiments, in UNet architecture, skip connections are constructed between encoder/decoder. In the upsampling process of the decoder, it may be able to capture global structures but different to capture local structures. To capture both global and local structure, at least one "skip connection" may be constructed between the encoder layers and the decoder layers. For a decoder layer skip-connected with an encoder layer, the output matrix of an encoder layer (hereinafter called "encoder output matrix") may be used to modify the output matrix of the skip-connected decoder layer (hereinafter called "decoder output matrix") (e.g. by fusing/adding into it). The modification may comprise addition and/or multiplication (e.g. sum/average, weighted sum/ averaging, geometric mean, harmonic mean).

In some embodiments, modification of decoder output matrix is performed using modified encoder output matrix in skip connection. Normally, in typical skip connection, an encoder output matrix may be added (with some weighting) to a decoder output matrix. In some embodiments here, the dimension of the encoder output matrix is k3+k1 while the dimension of the decoder output matrix is k3+k2. Their dimensions may be different/mismatched and thus direct addition/multiplication may not be feasible. Even when the dimensions are the same/matching, the encoder output matrix need to have same size as the decoder output matrix in order for modification by addition/multiplication to be feasible. Thus the encoder output matrix may be dimension-adjusted and/or size-adjusted to generate a (k3+k2)-D adjusted/modified encoder output matrix with same/compatible dimension and size as the decoder output matrix such that the modified encoder output matrix may be used to modify the decoder output matrix.

In some embodiments, a (k3+k2)-D "modified" decoder output matrix (the one after skip connection) may be computed as an aggregate (e.g. weighted sum, weighted mean, weighted arithmetic mean, weighted geometric mean, weighted harmonic mean) of the (k3+k2)-D "adjusted" encoder output matrix (the one after dimension/size adjustment) and the (k3+k2)-D "original" (the one before skip connection) decoder output matrix. For the case where k3+k1>k3+k2, the dimension k3+k1 may be projected to k3+k2 dimension by aggregating (weighted sum, weighted arithmetic mean, weighted harmonic mean) over the additional dimensions.

In some embodiments, comparison of encoder output matrix and decoder output matrix is performed. Suppose the decoder output matrix is the (k3+k2)-D output matrix of $D^{\{i2\}}$ and has size $P1^{\{L1+i2\}}\times P2^{\{L1+i2\}}\times \ldots \times P(k3)^{\{L1+i2\}}\times M1^{\{L1+i2\}}\times M2^{\{L1+i2\}}\times \ldots \times M(k2)^{\{L1+i2\}}$. Recall that the (k3+k1)-D encoder output matrix of $E^{\{i1\}}$ has size $P1^{\{i1\}}\times P2^{\{i1\}}\times \ldots \times P(k3)^{\{i1\}}\times M1^{\{i1\}}\times M2^{\{i1\}}\times \ldots \times M(k1)^{\{i1\}}$. The first k3 dimensions (associated with the $P1^{\{i1\}}\times P2^{\{i1\}}\times \ldots \times P(k3)^{\{i1\}}$ portion of the size) of the encoder output matrix are the same k3 expanded dimensions as the first k3 dimension (associated with the $P1^{\{L1+i2\}} \times P2^{\{L1+i2\}} \times \ldots \times P(k3)^{\{L1+i2\}}$ portion of the size) of the decoder output matrix. The next k2 dimensions (associated with the $M1^{\{i1\}} \times M2^{\{i1\}} \times \ldots \times M(k2)^{\{i1\}}$ portion of the size) of the encoder output matrix are the same k2 dimensions of the k2-D spatial spectrum as the next k2 dimensions (associated with the $M1^{\{L1+i2\}} \times M2^{\{L1+i2\}} \times \ldots \times M(k2)^{\{L1+i2\}}$ portion of the size) of the decoder output matrix. The extra (k1–k2) dimensions of the encoder output matrix may correspond to the $M(k2+1)*M(k2+2)* \ldots *M(k1)$ spatial spectrums (each being k2-D) used to generate the k1-D input z.

In some embodiments, a desired/perfect encoder output matrix is generated for skip-connections. For each i2, the corresponding i1 to be chosen to be skip-connected with i2 should be such that their sizes in the first k3 dimensions and the next k2 dimensions are identical. In other words, the desired/perfect i1 for i2 should have matching size with i2 such that $P1^{\{L1+i2\}}=P1^{\{i1\}}$, $P2^{\{L1+i2\}}=P2^{\{i1\}}, \ldots$, $P(k3)^{\{L1+i2\}}=P(k3)^{\{i1\}}$, $M1^{\{L1+i2\}}=M1^{\{i1\}}$, $M2^{\{L1+i2\}}=M2^{\{i1\}}, \ldots, M(k2)^{\{L1+i2\}}=M(k2)^{\{i1\}}$. If the desired/perfect i1 can be found, then the (i1, i2) may be chosen for skip connection, and for each of the $M(k2+1)^{\{i1\}}*M(k2+2)^{\{i1\}}* \ldots *M(k1)^{\{i1\}}$ combinations of indices in the extra (k1–k2) dimension in the encoder output matrix, there is a (k3×k2)-D sub-matrix of the encoder output matrix.

In some embodiments, in lieu of perfect match, construct using good match. For the i2, if the desired/perfect i1 (with matching size with i2) cannot be found, in one embodiment, the i2 may not be chosen to form a skip connection. In another embodiment, in lieu of a perfect i1, one (or more) "good" (though not perfect) i1 may be identified. A size of the decoder output matrix (associated with i2) has k3+k2 components: $P1, P2, \ldots, P(k3), M1, M2, \ldots, M(k2)$ that ideally need to match the corresponding first k3+k2 components of the size of encoder output matrix. The size components can form a (k3+k2)-tuple vector. A size-distance may be defined between the k3+k2 size components of an encoder output matrix and a decoder output matrix, which may comprise one of: L_1 distance (sum of absolute difference between the k3+k2 size components), L_2 distance (square root of sum of square of difference between the k3+k2 size components), or L_k. The one (or more) "good" i1 may be the i1 with minimum size-distance with respect to i2. A temporary encoder output matrix may be constructed based on the output matrix associated with the one (or more) "good" i1. Slight scaling (upsampling or downsampling or both) may be performed on the less-than-perfect dimensions (dimensions/components with non-zero size component difference) among the first k3+k2 dimensions of the "good" encoder output matrix to ensure that the resulting first k3+k2 size components of the temporary encoder output matrix match perfectly with that of the decoder output matrix. The temporary encoder output matrix may then be considered as the adjusted encoder output matrix of the perfect i1 so that the following steps can be applied.

In some embodiments, element-wise construction of (k3× k2)-D modified encoder output matrix is performed from (k3+k1)-D encoder output matrix. For i2 and its perfect i1, in one embodiment, the (k3+k2)-D modified/adjusted encoder output matrix (of same size as the decoder output matrix) may be computed on an element-by-element basis (i.e. each element computed regardless of other elements). Recall that for the $M(k2+1)^{\{i1\}}*M(k2+2)^{\{i1\}}* \ldots *M(k1)^{\{i1\}}$ combinations of indices in the extra (k1-k2)

dimension in the (k3+k1)-D encoder output matrix (of the perfect i1), there are $M(k2+1)^{\{i1\}}*M(k2+2)^{\{i1\}}* \ldots *M(k1)^{\{i1\}}$ sub-matrices (each (k3+k2)-D, each with matching size with decoder output matrix) of the encoder output matrix, each index combination corresponding to a respective sub-matrix. The (k3+k2)-D modified encoder output matrix may be constructed as an element-by-element (or element-based) aggregate of the sub-matrices, wherein any aggregate may comprise at least one of: sum, weighted sum, product, weighted product, average, weighted average, arithmetic mean, geometric mean, harmonic mean, median, weighted median, mode, percentile, maximum, minimum, trimmed mean. Each of the $P1^{\{i1\}} \times P2^{\{i1\}} \times \ldots \times P(k3)^{\{i1\}} \times M1^{\{i1\}} \times M2^{\{i1\}} \times \ldots \times M(k2)^{\{i1\}}$ elements of the modified encoder output matrix may be the aggregate of the respective elements of all the sub-matrices, regardless of other elements (of the sub-matrices and of the modified encoder output matrix).

In some embodiments, submatrix-wise construction of (k3×k2)-D modified encoder output matrix is performed from (k3+k1)-D encoder output matrix. In another embodiment, the (k3+k2)-D modified encoder output matrix may be computed on a sub-matrix basis (i.e. all elements of each sub-matrix is used in exactly the same way to compute the modified encoder output matrix, e.g. all are selected, or all not selected, or all are weighted by same factor). Some of the $M(k2+1)^{\{i1\}}*M(k2+2)^{\{i1\}}* \ldots *M(k1)^{\{i1\}}$ sub-matrices may be selected to compute the modified encoder output matrix. In one embodiment, there may be only one selected sub-matrix (e.g. with max magnitude) and it may automatically become the modified encoder output matrix. In another embodiment, there may be more than one selected sub-matrices (e.g. top 10% magnitude) and the modified encoder output matrix may be computed as an aggregate (as listed above) of the selected sub-matrices.

In some embodiments, to select the selected sub-matrices, a respective representative value may be computed for the $P1^{\{i1\}} \times P2^{\{i1\}} \times \ldots \times P(k3)^{\{i1\}} \times M1^{\{i1\}} \times M2^{\{i1\}} \times \ldots \times M(k2)^{\{i1\}}$ elements of each sub-matrix. Magnitude of each element may be computed/considered. The representative value may comprise at least one of: an aggregate of element magnitudes, an aggregate of element magnitudes in a percentile range, an aggregate of element magnitudes in a sub-sub-matrix of the sub-matrix, a variation measure of element magnitudes, a variation measure of element magnitudes divided by an aggregate, or an aggregate of any of the above. In one embodiment, the representative value may be the maximum of the element magnitudes. In another embodiment, the representative value may be the mean of the top 10% element magnitudes. In some embodiments, the variation measure may comprise at least one of: variance, standard deviation, variation, derivative, slope, total variation, absolute variation, square variation, spread, dispersion, variability, deviation, absolute deviation, square deviation, total deviation, divergence, range, inter-quartile range, skewness, kurtosis, L-moment, coefficient of variation, quartile coefficient of dispersion, mean absolute difference, Gini coefficient, relative mean difference, median absolute deviation, average absolute deviation, distance standard deviation, coefficient of dispersion, entropy, variance-to-mean ratio, and/or maximum-to-minimum ratio. In some embodiments, at least one representative value(s) is selected. The selected representative value(s) may comprise one of: maximum, minimum, median, percentile, a percentile range (e.g. from 90% to 100%, or top 10%). The at least one sub-matrix associated with the at least one selected representative value may be selected.

In some embodiments, the discriminator of cGAN may comprise a first encoder which is the encoder E of the generator G and a second encoder. As explained regarding the Generator above, the first encoder E may take z as input and generate the intermediate output y=E(z) using a series of layers/stages/steps/operations $E^i$. The second encoder E2 may take an input z2 and perform a series of L3 layers/stages/steps/operations $E2^i$ to generate a second intermediate output y2=E2(z2). The discriminator may further comprise a classifier which take y and y2 as input and determine whether it is genuine or fake (i.e. synthetic, artificially generated).

In some embodiments, expansion of encoder input matrix of E2 is performed. The input matrix z2 of the second encoder E2 may be k2-D (same dimension as the output of Generator G(z)) and may have size N1×N2× . . . ×N(k2) (same size as G(z)). Similar to the first encoder, the k2-D input matrix z2 may be expanded as an expanded, higher dimensional (k4+k2)-D matrix, with k4 additional/expanded dimensions added to the original/initial k2 dimensions and a size of 1 in each of the k4 additional/expanded dimensions. In other words, the k2-D input matrix z2 may be considered as a (k4+k2)-D expanded matrix of size PA1× PA2× . . . ×PA(k4)×N1×N2× . . . ×N(k2), wherein PA1=PA2= . . . =P(k4)=1. The k4 may be equal to k3.

In some embodiments, the second encoder E2 may comprise a series/sequence/concatenation of L3 layers/stages/steps/operations $E2^i$ to progressively "down-sample" the expanded (k4+k2)-D matrix to a lower-dimensional second intermediate output y2, where y2=$E2^{L3}$($E2^{L3-1}$ ( . . . $E2^2$($E2^1$(z2)) . . . )). For example, $E2^1$ is first applied. Then $E2^2$. Then $E2^3$. And so on. $E2^{L3}$ is the last.

In some embodiments, for each layer/stage/step/operation $E2^i$, the respective input matrix and the respective output matrix may have same/different size. In general, the input matrix of $E2^i$ is the output matrix of $E2^{i-1}$. And the output matrix of $E2^i$ is the input matrix of $E2^{i+1}$. The input matrix of $E^1$ is the (k4+k2)-D expanded matrix of size PA1×PA2× . . . PA(k4)×N1×N2× . . . ×N(k2).

In some embodiments, downsampling in "original" dimensions of output matrix size over E2 layers is performed. For $E2^i$, let the respective input matrix be of size $PA1^{i-1}$x$PA2^{i-1}$× . . . x$PA(k4)^{i-1}$x$N1^{i-1}$x$N2^{i-1}$× . . . ×$N(k2)^{i-1}$. Let the respective output matrix be of size $PA1^{i}$x$PA2^{i}$× . . . x$PA(k4)^{i}$x$N1^{i}$x$N2^{i}$× . . . ×$N(k2)^{i}$. The size of the "original dimensions" may be progressively reduced. In other words, $N^{i}\{i\}$<=$N1^{i-1}$; $N2^{i}$<=$N2^{i-1}$; . . . ; $N(k2)^{i}$<=$N(k2)^{i-1}$. In one embodiment, the size of the "original dimensions" may be recursively halved (i.e. reduced by a factor of 2), with $N1^{i}$=$N1^{i-1}$/2; $N2^{i}$=$N2^{i-1}$/2; . . . ; $N(k2)^{i}$=$N(k2)^{i-1}$/2, until the size becomes 1 at which point the size reduction stops. If the halving operation gives a non-integer, the halved value may be rounded up or down.

In some embodiments, upsampling in "expanded" dimensions of output matrix size is performed over E2 layers. While the size of the "original dimensions" may be progressively reduced, the size of the expanded dimensions may be progressively increased. In other words, $PA1^{i}$>=$PA1^{i-1}$; $PA2^{i}$>=$PA2^{i-1}$; . . . ; $PA(k4)^{i}$>=$PA(k4)^{i-1}$. In one embodiment, the size of the expanded dimensions may be doubled recursively (i.e. increased by a factor of 2), with $PA1^{i}$=$PA1^{i-1}$*2; $PA2^{i}$=$PA2^{i-1}$*2; . . . ; $PA(k4)^{i}$>=$PA(k4)^{i-1}$*2.

In some embodiments, effective dimension reduction is performed in second intermediate encoder output. Let Q2 be the amount of dimensions of the second intermediate output y2 with corresponding size (of each such dimension) reduced to 1. Then the effective dimension of y2 may be k4+k2−Q2 (as any dimension with a size of 1 may be considered trivial/immaterial/redundant). The Q2 may be larger than k4 such that the effective dimension of y2 may be less than the k2 (dimension of the k2-D input matrix z2). In one embodiment, k4+k2−Q2 may be equal to k4 (i.e. Q2=k2). In another embodiment, k4+k2−Q2 may be equal to 1 (e.g. if k4=1).

In some embodiments, processing is performed in each E2 encoder layer. Each layer/stage/step/operation $E2^i$ may comprise applying a convolution using a respective kernel and a downsampling with a respective stride in respective dimension (e.g. a stride of 2 when the respective size halved). ReLU or Re-LU activation may be applied. The respective kernel may be a (k4+k2)-D kernel. The (k4+k2)-D kernel may be separable/non-separable. The (k4+k2)-D kernel may be a matrix generated/computed based on two or more 1-dimensional (1-D) kernels (each 1-D kernel being a vector). The (k4+k2)-D kernel may be computed based on an outer-product of two 1-D kernels (outer-product of two vectors), or an outer-product of a 1-D kernel and a multi-dimensional kernel.

In some embodiments, there may be multiple k2-D encoder kernels. There may be a different amount of k2-D kernels for different layers/stages/steps/operations. Each k2-D kernel may be applied to the k2 dimensions associated with the k2-D matrix z2. A k2-D kernel may be a convolutional kernel associated with a respective k2-D deconvolutional kernel of the decoder D of the Generator G. In one embodiment, L2=L3 and the multiple k2-D convolutional kernels of $E2^i$ may corresponding to the multiple k2-D deconvolutional kernels of $E^{L2-i}$. Each $E^{L2-i}$ may double the size in the original dimensions and each $E2^{i}$ may halve the size in the original dimensions.

In some embodiments, one or more supplementary reference/genuine/ground-truth z2 (e.g. RGB image, monochrome image, depth map, Kinect) may be available for training the HRNet. The HRNet may be trained by minimizing/optimize a loss function which is an aggregate of multiple cost functions. The multiple cost functions may comprise at least two of: a standard GAN loss function (L_G), a weighted L_k loss function (L_{k-weighted}), a perceptual loss function (L_p), a SSIM loss function (L_{SSIM}), or any aggregate of the above. In particular, the loss function may be an aggregate of all four of the named functions. The L_k loss function may be a $k^{th}$ root of sum of $k^{th}$ power of elements of (G(z)−z2). The L_k loss function may be weighted. As the generated image G(z) tend to have many background pixels, such background pixels may have lower weights in the L_k loss function. The perceptual loss (L_p) may be a perceptual cost extracted from pre-trained VGG network. The L_p may compare VGG(z2_depth) with VGG(G(z)). It may also compare VGG(z2_RGB) with VGG(G(z)). As VGG network may be pre-trained for 3-channel images (e.g. RGB), any depth map (e.g. from Kinect) or monochrome image may be used to create 3-channel image. The SSIM is structural similarity index measure which measures a perceptual/structural similarity between images. SSIM may compare z2_depth and G(z). It may also compare z2_RGB and G(z). In SSIM loss, RGB images may be converted to grayscale before comparison.

In some embodiments, the generated images may be used for pose estimation, human identification or activity recognition.

In some embodiments, in wireless sensing, a Type1 heterogeneous wireless device may transmit a wireless signal to a Type2 heterogeneous wireless device through a wireless channel of a venue. A time series of channel information (TSCI) may be obtained based on the received wireless signal. Some analytics, spatial-temporal information (STI), motion statistics (MS) or motion information (MI) may be computed based on the TSCI. A sensing task may be performed based on the TSCI and/or the analytics/STI/MS/MI.

The efficacy/effectiveness of performing the sensing task may be significantly influenced by environmental factors/signal propagation (e.g. physical barriers/walls/furniture, multipath environment, wireless channel traffic, interference, temperature, humidity, cooling), hardware variations (e.g. chip/IC, chip set, circuitry, interface, hardware design, antenna, defects, etc.), signal processing algorithms, and noise (e.g. due to background radiation) which may affect the TSCI. Thus there is a need to evaluate the quality of the TSCI produced by the Type1 device and the Type2 device. Characterizing the TSCI is crucial in wireless sensing applications. High quality TSCI may ensure superior sensing performance, whereas low quality TSCI may degrade results and add unnecessary training complexity. The quality of the TSCI may vary significantly due to differences in hardware design, signal processing algorithm. The TSCI may need to be evaluated when a new chipset is activated, or a firmware is updated, or the Type1/Type2 devices are deployed in new settings.

In some embodiments, CSI evaluation enables the evaluation of whether the Type1 device and the Type2 device form a plausible/reasonable pair to perform wireless sensing task and/or other tasks. It also enables the evaluation of an installation (e.g. placement, orientation, antenna choice) and/or setting (e.g. firmware, system software/OS, system setup/parameters) and/or modification (e.g. hardware/software, antenna/module/RAM/harddisk) of the Type1 device and/or the Type2 device.

Figure 4:
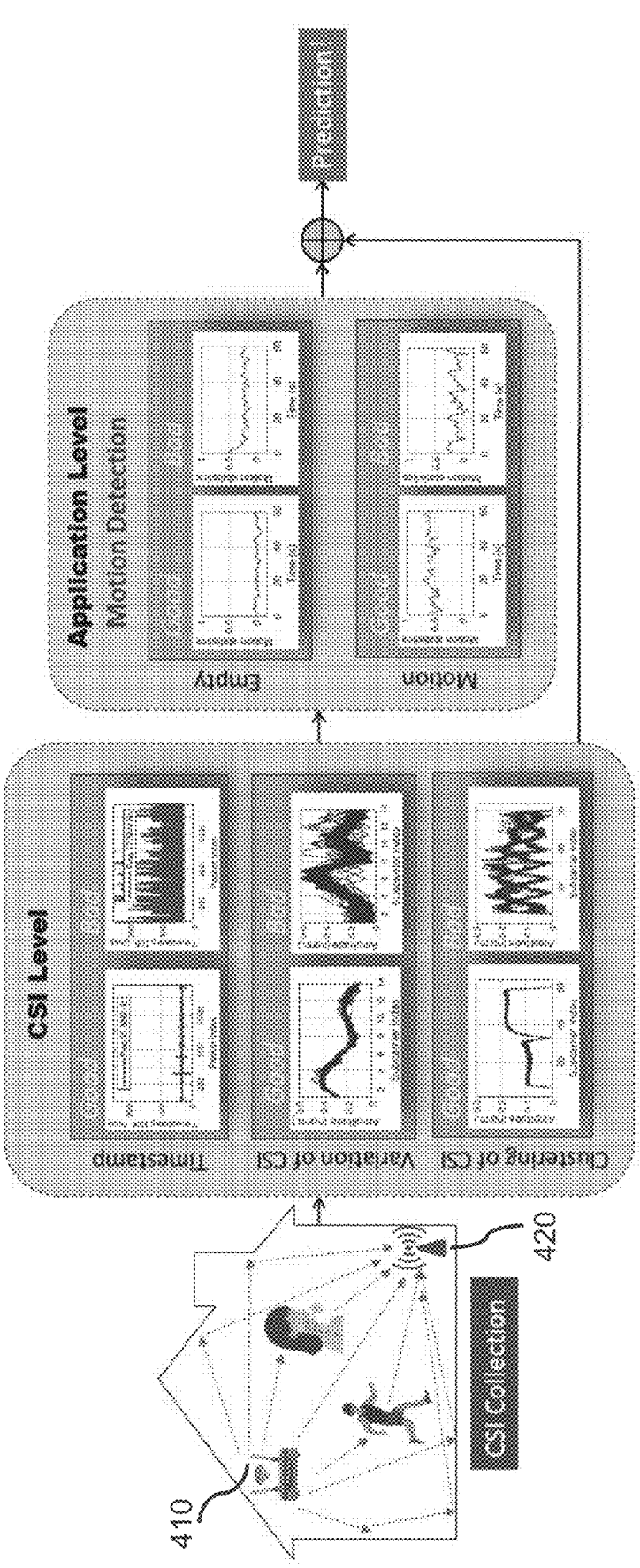
FIG. 4 illustrates an example diagram of a system for CSI evaluation, according to some embodiments of the present disclosure.

FIG. 4 illustrates an example diagram of a system 400 for CSI evaluation, according to some embodiments of the present disclosure. The evaluation of CSI is at CSI level and application level. As shown in FIG. 4, the system 400 may collect CSI based on wireless signals transmitted from a transmitter 410 to a receiver 420. In some embodiments, the transmitter 410 may serve as a Bot (e.g. Type1 device), while the receiver 420 may serve as an Origin (e.g. Type2 device). A Bot can transmit a wireless (sounding/probe) signal to the Origin in a venue (e.g. a house), which can obtain channel information of a wireless multipath channel based on the wireless signal, where the wireless multipath channel is impacted by motion/presence of any object/user in the venue.

In some embodiments, to evaluate the quality of the TSCI from the pair of the Type1 device and the Type2 device, more than one scores (e.g. channel information (CI) timing accuracy/integrity score, CI-timing rate score, CI-timing regularity score, CI amplitude integrity/accuracy score, CI amplitude regularity/variability/clustering/correlation score, application or task level/specific scores) may be computed to gauge/measure/evaluate different aspects of the quality of the TSCI. A composite score may be computed based on the multiple scores.

In some embodiments, high quality TSCI should have good timing accuracy/integrity. The wireless signal may comprise a train/sequence/series of sounding signals. Often for the sensing task, the sounding signals may be designed to be transmitted by the Type1 device at regular time intervals.

However, due to various reasons/factors (e.g. other competing/high-priority data transmission, interference, packet loss, etc.), the corresponding received signals by the Type2 device may have irregular timing. Thus at least one CI timing accuracy/integrity score related to the timing of the received signal and/or the TSCI may be computed.

In some embodiments, a first measure of quality of the TSCI is related to the ability for a sounding rate of the TSCI to be close to a target/nominal rate. A rate score may be computed. Time stamps of all the CI may be obtained. Time duration of adjacent CI (inter-CI duration obtained by subtracting time stamps of adjacent CI) may be computed. A rate (an effective sounding rate analytics, ESR) may be computed based on the time stamps and/or the inter-CI duration in a sliding time window and a rate score may be computed based on the rate (ESR). A first ESR may be computed as an average/mean $(\text{sum}\_\{i=1\}^N x\_i/N,$ called "effective mean", EM) or weighted average/weighted mean $(\text{sum}\_\{i=1\}^N x\_i*w\_i)/(\text{sum}\_\{i=1\}^N w\_i,$ called "effective weighted mean", EWM) of the inter-CI duration in the sliding time window and then taking the inverse (i.e. 1/x). Alternatively, instantaneous rate may be computed as the inverse of the inter-CI duration and a second ESR may be computed as an average or an weighted average of the instantaneous rate in the sliding time window. A third ESR may be a geometric mean of inter-CI duration. A fourth ESR may be a geometric mean of inverse of inter-CI duration. A fifth ESR may be a combined ESR computed based on the first ESR, second ESR, third ESR and/or fourth ESR (e.g. sum, weighted sum, average, weighted average, geometric mean, harmonic mean, etc.). In some embodiments, for inter-CI period/duration, the first ESR may be the inverse of arithmetic mean and the inverse of second ESR may be the harmonic mean. For CI or sounding rate/frequency, the second ESR may be the arithmetic mean and the first ESR may be the harmonic mean. Each of first/second/third/fourth/fifth ESR may take values from a range (e.g. between 0 and 1, or between 0 and 10, or between 0 and 100).

In some embodiments, multiple sliding time window durations may be used and the ESR (e.g. first/second/third/fourth/fifth ESR) may be computed accordingly. A long sliding time window (e.g. 1/2/3/5/7/10/12 hour/day/week/month) may be able to capture "long term" rate behavior while short sliding time window (e.g. 1/3/5/7/10/20/30 min) captures "short term" rate behavior. The ESR for different sliding time window durations may be further combined/aggregated to generate an aggregate (e.g. average, weighted average, geometric mean, harmonic mean, median, mode, percentile, average from A1-percentile to A2-percentile) as a sixth ESR.

In some embodiments, in any weighted average/weighted mean (e.g. in first/second/third/fourth/fifth/sixth ESR) of $x\_i, i=1 \ldots N,$ different $x\_i$ may be weighted differently. In one embodiment, any $x\_i$ far away from the mean (with a large deviation from its mean, $\text{abs}(x\_i-x\_{mean})$, such as outliers with $\text{abs}(x\_i-x\_{mean})>T1)$ may be weighted less to suppress outliers. The $x\_i$ near the mean (with a small deviation from its mean, such as the "normal" or "well-behaving" $x\_i$, e.g. with $\text{abs}(x\_i-x\_{mean})<T2)$ may be weighted more. In other words, the weight for any $x\_i$ may be a decreasing function of $\text{abs}(x\_i-x\_{mean})$. In another situation, the weight for any $x\_i$ may be an increasing function of $\text{abs}(x\_i-x\_{mean})$ to penalize the outliers more.

In some embodiments, a CI-timing rate score may be computed based on one (or more) ESR. The CI-timing rate score may be a monotonic non-decreasing (or monotonic increasing) function of the ESR. Any monotonic function may be/comprise one of: linear, piecewise linear, quadratic, polynomial, logarithm, exponential, convex, concave, or any combination, etc. The function may be based on a nominal rate and/or a minimum required rate. The nominal rate may be a target rate of the series of sounding signals in the wireless signal. The Type1 device may seek (e.g. with best effort) to send out the sounding signals at the nominal rate. However, some sounding signals may be late due to network traffic congestion, or even lost due to interference. Thus the ESR (any of the ESR) may be different from the nominal rate. Usually there is little cost/loss/penalty if the ESR is larger than nominal rate. But there can be considerable/significant/catastrophic cost/loss/penalty if the ESR is less than the nominal rate. Thus the CI-timing rate score may be the monotonic non-decreasing (or monotonic increasing) function of the ESR. The CI-timing rate score (and other scores, e.g. to be introduced below) may be normalized to take on values between L1 and L2. For example, L1=0 and L2=100. A small (or large) CI-timing rate score may suggest bad quality while a large (or small) CI-timing rate score may suggest good quality. The minimum required rate may be a rate needed by the sensing task. When the ESR is less than the minimum required rate, the CI-timing rate score may be clipped/set to L1 (e.g. zero). The CI-timing rate score may be clipped (e.g. upper-limited/lower-limited) at L2. In one embodiment, the CI-timing rate score may be max[0, (ESR–x_minimum)/(x_nominal–x_minimum)] or min(L2, max [L1, (ESR–x_minimum)^k/(x_nominal–x_minimum)^k]).

In some embodiments, a second measure of quality of the TSCI is related to the ability for the rate to remain stable, with little variation/deviation. A first effective variation (EV) analytics may be computed for the inter-CI duration or the instantaneous rate in the sliding time window. A second EV analytics may be computed for the inter-CI duration or the instantaneous rate in the sliding time window. A third EV may be computed based on the first EV and the second EV (e.g. sum, weighted sum, average, weighted average, geometric mean, harmonic mean, etc.). Any EV (e.g. first EV, second EV) may comprise any of the following quantities: variance, standard deviation, absolute deviation, variation, total variation, absolute variation, square variation, derivative, range, range between two percentiles (e.g. 10% and 90%), inter-quartile range, spread, dispersion, variability, divergence, entropy, skewness, kurtosis, coefficient of variation, maximum-to-minimum ratio, a combination, an aggregate and/or an aggregate of an aggregate. Any EV may be normalized by (e.g. being divided by) effective mean (EM). The EM may be an aggregate of the inter-CI duration or the instantaneous rate. In some embodiments, the first/second/third EV may be normalized by being divided by the EM/aggregate of corresponding inter-CI duration/instantaneous rate in the sliding time window.

In some embodiments, multiple sliding time window durations may be used and the EV (e.g. first/second/third EV) may be computed accordingly. The EV for different sliding time window durations may be combined/aggregated to generate an aggregate or aggregate-of-aggregate as a fourth EV. A CI-timing regularity score (e.g. "timestamp variation score") may be computed based on one (or more) EV. The CI-timing regularity score may be a monotonic non-increasing or monotonic decreasing function of the EV. The CI-timing regularity score may be normalized to take on values between L3 and L4. For example, L3=L1=0 and L4=L2=100. A small (or large) score value may suggest bad quality (highly fluctuating/variable/volatile) while a large (or small) score value may suggest good quality (stable, not fluctuating/variable/volatile).

In one embodiment, the monotonic function may comprise an inverse function (1/x) (e.g. "coefficient of variation" or "CV"). For example, it may be 1/(a1+max(EV–a2, a3)). A final CI-timing score may be computed as an aggregate of the CI-timing rate score may be combined with the CI-timing regularity score.

In some embodiments, a third measure of quality of the TSCI is related to the ability for a magnitude of the CI in the TSCI to remain stable, with little variation/deviation when the venue (sensing environment) is empty with no object and no object motion. Note that each CI of the TSCI may have multiple CI components (CIC). A fifth EV may be computed for a magnitude of each CIC of the CI of the TSCI.

In the case that the Type1 device and/or Type2 device has more than one antenna (leading to more than one spatial stream), there may be more than one wireless links and more than one TSCI may be obtained based on the received wireless signal, each TSCI associated with a respective wireless links. The fifth EV may be a per-TSCI EV computed for the magnitude of each CIC of the CI of each of the TSCI.

In some embodiments, all the fifth EV (all per-TSCI EV) may be aggregated/averaged/weighted-averaged to give a sixth EV. Any EV may be normalized by being divided by the corresponding EM. A CI-amplitude regularity score (e.g. "CI amplitude variation score") may be computed based on one (or more) EV (e.g. fifth EV, sixth EV). The CI-amplitude regularity score may be a monotonic non-increasing or monotonic decreasing function of the fifth EV. The CI-amplitude regularity score may be normalized to take on values between L5 and L6. For example, L5=L3=L1 and L6=L4=L2. A small (or large) score value may suggest bad quality (highly fluctuating/variable/volatile CI amplitude) while a large (or small) score value may suggest good quality (stable, not fluctuating/variable/volatile CI amplitude). In one embodiment, the monotonic function may comprise an inverse function (1/x).

In some embodiments, a fourth measure of quality of the TSCI is related to a clustering issue/problem of the CI in TSCI, i.e. whether the CI (e.g. CSI) magnitude form/shift between more than one clusters when the venue (sensing environment) is empty with no object and no object motion. This is because, when there is no object/object motion, the CI of TSCI should be stable around a single cluster. But in some bad situations, the CI in a TSCI may shift between two or more clusters when there is no object/object motion. Each CI with N CI components (CIC) may be represented as a first N-dimensional (N-D) vector (complex), or a sample point in a first N-D space. Alternatively, magnitude of each CIC may be computed, and the CIC magnitude of the CI may be represented as a second N-D vector (real), or a sample point in a second N-D space. Quantization/clustering may be performed on the CI in either the second (or first) N-D space. Clusters may be formed. Each CI of the TSCI may be assigned/associated with a respective cluster. A size of each cluster may be defined as the amount of CI being assigned/associated with the cluster. A CI-amplitude clustering score may be computed as a ratio of the size of the second-largest cluster to the size of the largest cluster. The closer this ratio is to 1, the more severe the clustering issue is. A final CI-amplitude score may be an aggregate of CI-amplitude regularity score and CI-amplitude clustering score.

In some embodiments, a fifth measure of quality of the TSCI is related to the usage of TSCI in applications. A fundamental or basic application/engine comprises the computation of a motion statistics based on autocorrelation function (ACF) of CI of the TSCI. For each CI with N CI components (CIC), a component ACF may be computed for each of the N CIC (or N CIC magnitude, or N CIC magnitude square) of CI. The ACF may be a sum/mean, or weighted sum/mean of the N1 component ACF. The weight for each component ACF may be the component ACF evaluated at one sampling period. Typically motion is detected if the motion statistics is larger than a threshold, and not detected otherwise. Suppose each CI is represented as an N-D vector (e.g. vector of CIC, or vector of CIC magnitude, or vector of CIC magnitude square). The motion statistics may be/comprise a similarity measure between two adjacent CI (e.g. inner-product of two CI vectors associated with two temporally adjacent CI, or ACF evaluated at one sampling period). The fifth measure of quality may be motion score related to behavior of motion statistics computed based on CI samples collected during periods of large motion (e.g. walking) around the devices (TX or RX), or during no motion. The motion statistics may be computed so as to determine its sample distribution, sample mean and sample variance. The motion statistics and its sample distribution can be normalized by subtracting by the sample mean and divided by the sample standard deviation (square root of sample variance).

In some embodiments, if the walking motion is continuous and consistent, the in-motion motion statistics should have a normal/Gaussian distribution with positive mean and variance for "good" or "well-behaving" CI. In other words, the normalized sample distribution should be standard Gaussian with zero mean and unity variance. Thus a first motion score is an in-motion MS-distribution score which is a Kullack-Leibler divergence (KL divergence) between normalized sample distribution and standard Gaussian distribution. The first motion score is non-negative. It is zero when the two distributions are identical the first motion score (KL divergence) is zero. Small KL divergence suggests that the two distributions are similar, while large KL divergence suggests that the two distributions are not so similar.

In some embodiments, a second motion score is an in-motion MS-tailedness score computed based on the kurtosis of the sample distribution which measures the "tailedness" of the sample distribution (i.e. whether it has heavy tail or light tail). Kurtosis of a random variable X with mean m and standard deviation s is $E([(X-m)/s]^4)$. To compute the second motion score, X is the observation (i.e. the motion statistics), m is the sample mean, s is the sample standard deviation (square root of sample variance). As the normalized observation is $X2=(X-m)/s$, the kurtosis is equal to $E(X2^4)$ and can be computed using the normalized motion statistics. For Gaussian distribution, the kurtosis should be 3. A kurtosis greater than 3 implies a tail of sample distribution heavier than Gaussian distribution. A kurtosis less than 3 implies a tail of sample distribution lighter than Gaussian. A related analytics "Excess kurtosis" is defined as kurtosis minus 3. The second motion score is a monotonic function of the excess kurtosis. For example, it may simply be the absolute value of excess kurtosis, or the square of excess kurtosis.

In some embodiments, a third motion score is an in-motion MS-magnitude score computed based on magnitude of "in-motion" MS. As the mean of the motion statistics should be positive under motion and zero under no motion, the magnitude may be a key feature to differentiate between "motion" and "no-motion". The third motion score is the probability of the in-motion MS being larger than some typical threshold (e.g. 0.2). The third motion score may be computed for multiple thresholds (e.g. 0.1, 0.2, 0.3).

In some embodiments, a fourth motion score is no-motion MS-magnitude score computed based on magnitude of "no-motion" motion statistics computed from CI collected when no user and no user motion is present. When there is no user/user motion, the motion statistics should be zero (or very small). The fourth motion score is the probability of the no-motion MS being less than some typical threshold (e.g. 0.2). The fourth motion score may be computed for multiple thresholds (e.g. 0.1, 0.2, 0.3).

In some embodiments, a respective mapping may be applied to each of the motion scores so that they take on values from within a range [L1, L2]. E.g. L1=0, L1=1 or L1=10 or L1=100.

Figure 5:
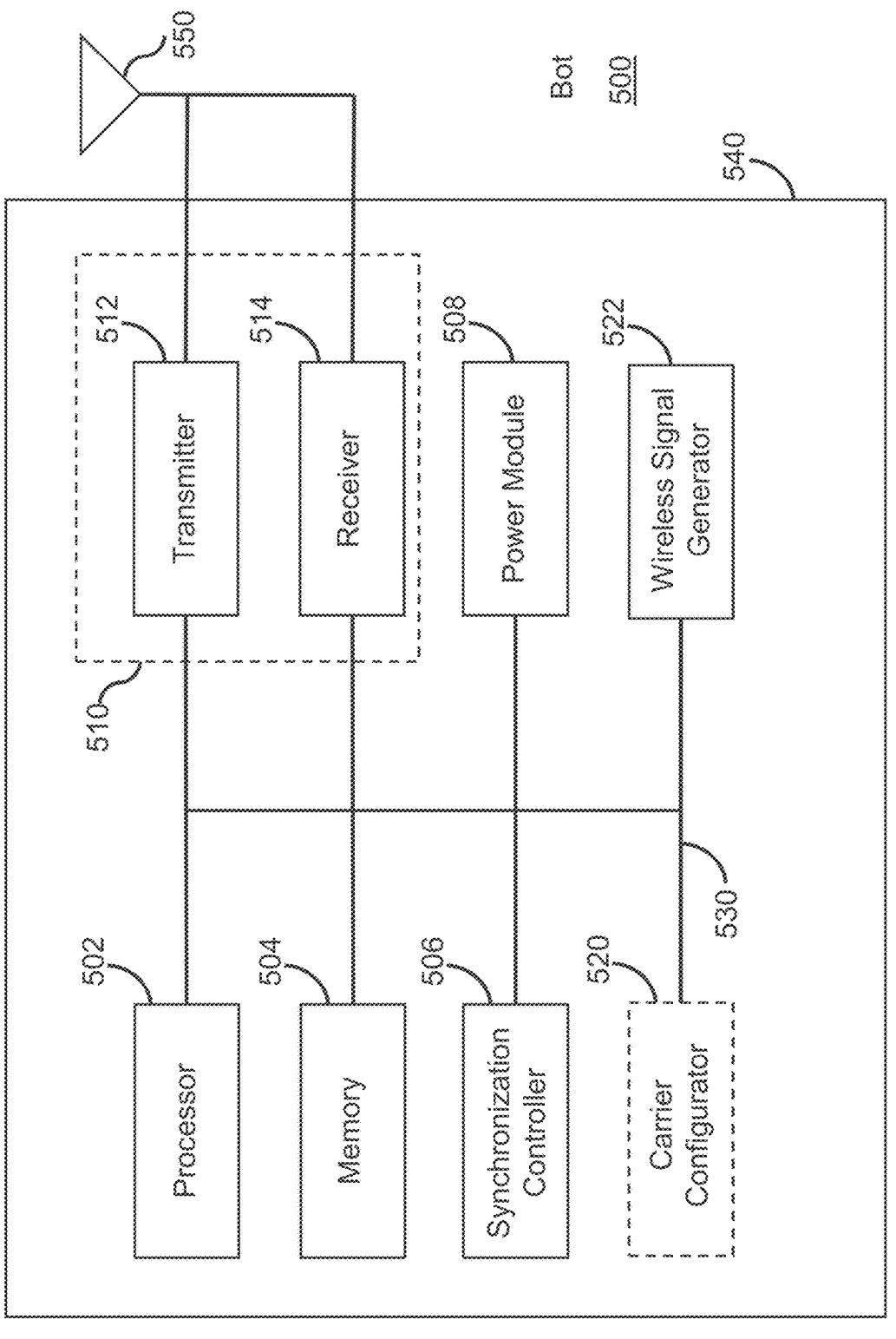
FIG. 5 illustrates an example block diagram of a first wireless device of a system for wireless sensing and imaging, according to some embodiments of the present disclosure.

FIG. 5 illustrates an example block diagram of a first wireless device, e.g. a Bot 500, of a wireless sensing system, according to one embodiment of the present teaching. The Bot 500 is an example of a device that can be configured to implement the various methods described herein. As shown in FIG. 5, the Bot 500 includes a housing 540 containing a processor 502, a memory 504, a transceiver 510 comprising a transmitter 512 and receiver 514, a synchronization controller 506, a power module 508, an optional carrier configurator 520 and a wireless signal generator 522.

In this embodiment, the processor 502 controls the general operation of the Bot 500 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 504, which can include both read-only memory (ROM) and random access memory (RAM), can provide instructions and data to the processor 502. A portion of the memory 504 can also include non-volatile random access memory (NVRAM). The processor 502 typically performs logical and arithmetic operations based on program instructions stored within the memory 504. The instructions (a.k.a., software) stored in the memory 504 can be executed by the processor 502 to perform the methods described herein. The processor 502 and the memory 504 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 510, which includes the transmitter 512 and receiver 514, allows the Bot 500 to transmit and receive data to and from a remote device (e.g., an Origin or another Bot). An antenna 550 is typically attached to the housing 540 and electrically coupled to the transceiver 510. In various embodiments, the Bot 500 includes (not shown) multiple transmitters, multiple receivers, and multiple transceivers. In one embodiment, the antenna 550 is replaced with a multi-antenna array 550 that can form a plurality of beams each of which points in a distinct direction. The transmitter 512 can be configured to wirelessly transmit signals having different types or functions, such signals being generated by the processor 502. Similarly, the receiver 514 is configured to receive wireless signals having different types or functions, and the processor 502 is configured to process signals of a plurality of different types.

The Bot 500 in this example may serve as Bot 410 in FIG. 4 for detecting user presence or motion in a venue. For example, the wireless signal generator 522 may generate and transmit, via the transmitter 512, a wireless signal through a wireless multipath channel impacted by a motion of an object in the venue. The wireless signal carries information of the channel. Because the channel was impacted by the motion, the channel information includes motion information that can represent the motion of the object. As such, the motion can be indicated and detected based on the wireless signal. The generation of the wireless signal at the wireless signal generator 522 may be based on a request for motion detection from another device, e.g. an Origin, or based on a system pre-configuration. That is, the Bot 500 may or may not know that the wireless signal transmitted will be used to detect motion.

The synchronization controller 506 in this example may be configured to control the operations of the Bot 500 to be synchronized or un-synchronized with another device, e.g. an Origin or another Bot. In one embodiment, the synchronization controller 506 may control the Bot 500 to be synchronized with an Origin that receives the wireless signal transmitted by the Bot 500. In another embodiment, the synchronization controller 506 may control the Bot 500 to transmit the wireless signal asynchronously with other Bots. In another embodiment, each of the Bot 500 and other Bots may transmit the wireless signals individually and asynchronously.

The carrier configurator 520 is an optional component in Bot 500 to configure transmission resources, e.g. time and carrier, for transmitting the wireless signal generated by the wireless signal generator 522. In one embodiment, each CI of the time series of CI has one or more components each corresponding to a carrier or sub-carrier of the transmission of the wireless signal. The detection of the motion may be based on motion detections on any one or any combination of the components.

The power module 508 can include a power source such as one or more batteries, and a power regulator, to provide regulated power to each of the above-described modules in FIG. 5. In some embodiments, if the Bot 500 is coupled to a dedicated external power source (e.g., a wall electrical outlet), the power module 508 can include a transformer and a power regulator.

The various modules discussed above are coupled together by a bus system 530. The bus system 530 can include a data bus and, for example, a power bus, a control signal bus, and/or a status signal bus in addition to the data bus. It is understood that the modules of the Bot 500 can be operatively coupled to one another using any suitable techniques and mediums.

Although a number of separate modules or components are illustrated in FIG. 5, persons of ordinary skill in the art will understand that one or more of the modules can be combined or commonly implemented. For example, the processor 502 can implement not only the functionality described above with respect to the processor 502, but also implement the functionality described above with respect to the wireless signal generator 522. Conversely, each of the modules illustrated in FIG. 5 can be implemented using a plurality of separate components or elements.

Figure 6:
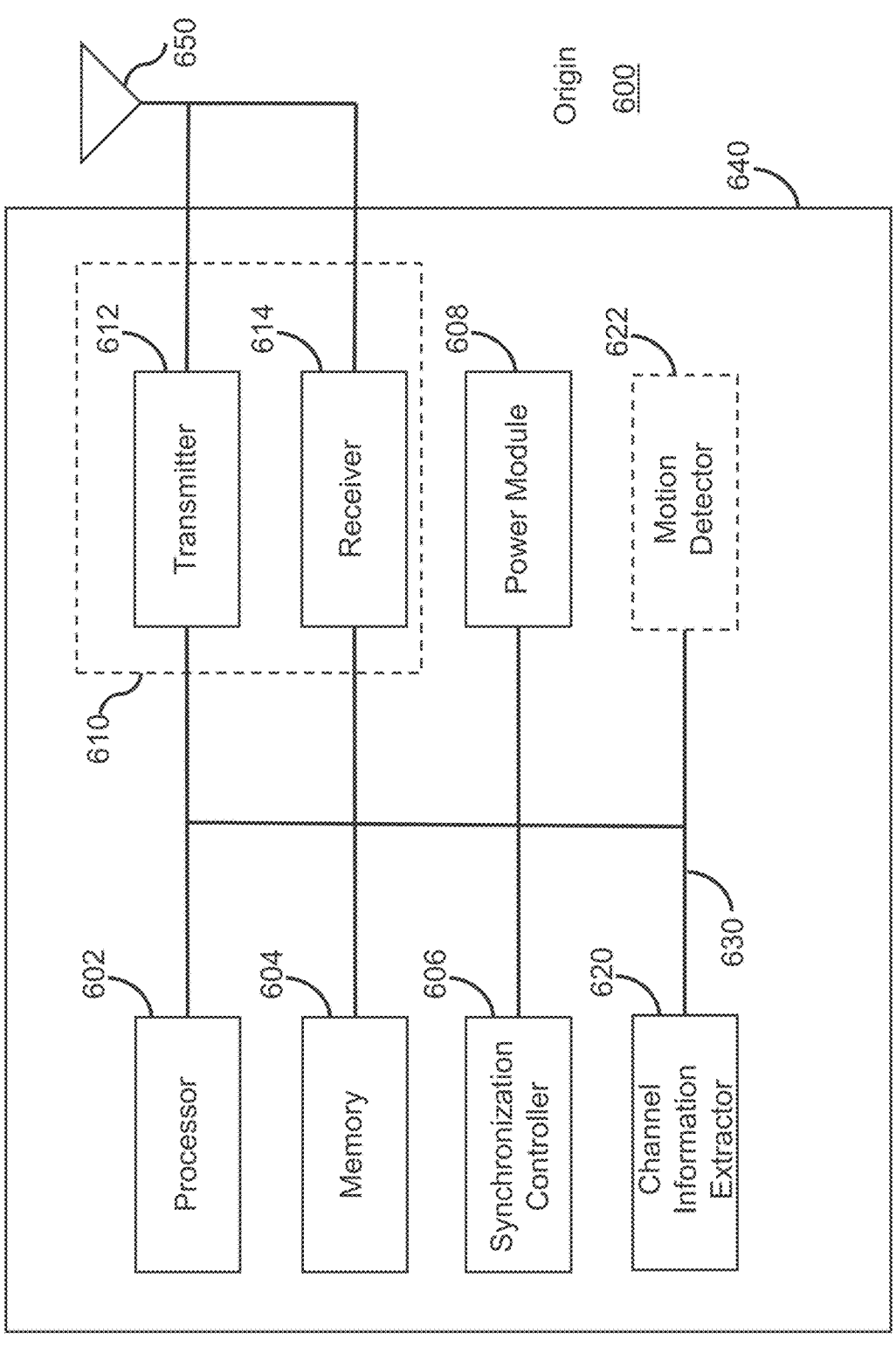
FIG. 6 illustrates an example block diagram of a second wireless device of a system for wireless sensing and imaging, according to some embodiments of the present disclosure.

FIG. 6 illustrates an example block diagram of a second wireless device, e.g. an Origin 600, of a wireless sensing system, according to one embodiment of the present teaching. The Origin 600 is an example of a device that can be configured to implement the various methods described herein. The Origin 600 in this example may serve as Origin 420 in FIG. 4 for detecting user presence or motion in a venue. As shown in FIG. 6, the Origin 600 includes a housing 640 containing a processor 602, a memory 604, a transceiver 610 comprising a transmitter 612 and a receiver 614, a power module 608, a synchronization controller 606, a channel information extractor 620, and an optional motion detector 622.

In this embodiment, the processor 602, the memory 604, the transceiver 610 and the power module 608 work similarly to the processor 502, the memory 504, the transceiver 510 and the power module 508 in the Bot 500. An antenna 650 or a multi-antenna array 650 is typically attached to the housing 640 and electrically coupled to the transceiver 610.

The Origin 600 may be a second wireless device that has a different type from that of the first wireless device (e.g. the Bot 500). In particular, the channel information extractor 620 in the Origin 600 is configured for receiving the wireless signal through the wireless multipath channel impacted by the motion of the object in the venue, and obtaining a time series of channel information (CI) of the wireless multipath channel based on the wireless signal. The channel information extractor 620 may send the extracted CI to the optional motion detector 622 or to a motion detector outside the Origin 600 for detecting object motion in the venue.

The motion detector 622 is an optional component in the Origin 600. In one embodiment, it is within the Origin 600 as shown in FIG. 6. In another embodiment, it is outside the Origin 600 and in another device, which may be a Bot, another Origin, a cloud server, a fog server, a local server, and an edge server. The optional motion detector 622 may be configured for detecting the motion of the object in the venue based on motion information related to the motion of the object. The motion information associated with the first and second wireless devices is computed based on the time series of CI by the motion detector 622 or another motion detector outside the Origin 600.

The synchronization controller 606 in this example may be configured to control the operations of the Origin 600 to be synchronized or un-synchronized with another device, e.g. a Bot, another Origin, or an independent motion detector. In one embodiment, the synchronization controller 606 may control the Origin 600 to be synchronized with a Bot that transmits a wireless signal. In another embodiment, the synchronization controller 606 may control the Origin 600 to receive the wireless signal asynchronously with other Origins. In another embodiment, each of the Origin 600 and other Origins may receive the wireless signals individually and asynchronously. In one embodiment, the optional motion detector 622 or a motion detector outside the Origin 600 is configured for asynchronously computing respective heterogeneous motion information related to the motion of the object based on the respective time series of CI.

The various modules discussed above are coupled together by a bus system 630. The bus system 630 can include a data bus and, for example, a power bus, a control signal bus, and/or a status signal bus in addition to the data bus. It is understood that the modules of the Origin 600 can be operatively coupled to one another using any suitable techniques and mediums.

Although a number of separate modules or components are illustrated in FIG. 6, persons of ordinary skill in the art will understand that one or more of the modules can be combined or commonly implemented. For example, the processor 602 can implement not only the functionality described above with respect to the processor 602, but also implement the functionality described above with respect to the channel information extractor 620. Conversely, each of the modules illustrated in FIG. 6 can be implemented using a plurality of separate components or elements.

In one embodiment, in addition to the Bot 500 and the Origin 600, the system may also comprise: an assistance device, a third wireless device, e.g. another Bot, configured for transmitting an additional heterogeneous wireless signal through an additional wireless multipath channel impacted by the motion of the object in the venue, or a fourth wireless device, e.g. another Origin, that has a different type from that of the third wireless device. The fourth wireless device may be configured for: receiving the additional heterogeneous wireless signal through the additional wireless multipath channel impacted by the motion of the object in the venue, and obtaining a time series of additional channel information (CI) of the additional wireless multipath channel based on the additional heterogeneous wireless signal. The additional CI of the additional wireless multipath channel is associated with a different protocol or configuration from that associated with the CI of the wireless multipath channel. For example, the wireless multipath channel is associated with LTE, while the additional wireless multipath channel is associated with Wi-Fi. In this case, the optional motion detector 622 or a motion detector outside the Origin 600 is configured for detecting the motion of the object in the venue based on both the motion information associated with the first and second wireless devices and additional motion information associated with the third and fourth wireless devices computed by at least one of: an additional motion detector and the fourth wireless device based on the time series of additional CI.

In some embodiments, the present teaching discloses systems and methods for encoder-decoder-based high resolution imaging.

FIG. 7 illustrates a flow chart of an example method 700 for encoder-decoder-based high resolution imaging, according to some embodiments of the present disclosure. In various embodiments, the method 700 can be performed by the systems disclosed above. At operation 710, a k1-dimensional (k1-D) imaging matrix is assembled by a processor based on arranging and concatenating a plurality of k2-dimensional (k2-D) input imaging matrices. At operation 720, the k1-D imaging matrix is encoded by an encoder, which is a k1-D encoding neural network, to generate a (k1+k3)-D first intermediate matrix. At operation 730, a (k2+k3)-D second intermediate matrix is generated based on the (k1+k3)-D first intermediate matrix. At operation 740, the (k2+k3)-D second intermediate matrix is decoded by a decoder, which is a k2-D decoding neural network, to generate a k2-D output imaging matrix. At least one skip connection is between the encoder and the decoder. An imaging resolution of the k2-D output imaging matrix is greater than the imaging resolution of any one of the plurality of k2-D input imaging matrices.

FIG. 8 illustrates a flow chart of an example method 800 for generating output matrices for different layers of an encoder, according to some embodiments of the present disclosure. In various embodiments, the method 800 can be performed by the systems disclosed above. At operation 810, a (k1+k3)-D expanded matrix is determined by adding k3 expanded dimensions to k1 original dimensions of the k1-D imaging matrix. A size of the (k1+k3)-D expanded matrix is 1 in each of the k3 expanded dimensions. The encoder comprises L1 layers, each associated with multiple convolution filters. The (k1+k3)-D expanded matrix is a (k1+k3)-D layer-1 input matrix to a layer 1 of the encoder, the first layer of the L1 layers of the encoder. The operation 820 in this example includes multiple sub-operations 822 and 828 performed for each n between 1 and L1. The sub-operation 822 includes step 824 and step 826 performed for each respective convolution filter of the convolution filters associated with layer n of the encoder. At step 824, a (k1+k3)-D layer-n input matrix is filtered with the respective convolution filter to generate a respective (k1+k3)-D layer-n per-filter output matrix. At step 826, the respective (k1+k3)-D layer-n per-filter output matrix is down-sampled in at least one of the k1 original dimensions with max-pooling. At sub-operation 828, all of the (k1+k3)-D layer-n per-filter output matrices are concatenated to form a (k1+k3)-D layer-n output matrix which is also a layer-(n+1) input matrix. A size of the layer-n output matrix in each of the k1 original dimensions is smaller than or equal to a size of a corresponding original dimension of the layer-n input matrix. A size of the layer-n output matrix in each of the k3 expanded dimensions is greater than or equal to a size of a corresponding expanded dimension of the layer-n input matrix. The (k1+k3)-D first intermediate matrix is the layer-(L1) output matrix. A size of the (k1+k3)-D first intermediate matrix is 1 in each of the k1 original dimensions.

FIG. 9 illustrates a flow chart of an example method 900 for generating an output imaging matrix, according to some embodiments of the present disclosure. In various embodiments, the method 900 can be performed by the systems disclosed above. At operation 910, (k1−k2) of the k1 original dimensions of the (k1+k3)-D first intermediate matrix are removed to generate the (k2+k3)-D second intermediate matrix. The decoder comprises L2 layers, each associated with multiple de-convolution filters. The (k2+k3)-D second intermediate matrix is a (k2+k3)-D layer-(L1+1) input matrix to a layer 1 of the decoder, the first layer of the L2 layers of the decoder. The operation 920 in this example includes multiple sub-operations 922-926 performed for each m between 1 and L2. At the sub-operation 922, a (k2+k3)-D layer-(L1+m) input matrix is up-sampled in at least one of the remaining k2 original dimensions to generate a (k2+k3)-D layer-(L1+m) up-sampled input matrix. At sub-operation 924, for each respective de-convolution filter of the multiple de-convolution filters associated with layer m of the decoder, the (k2+k3)-D layer-(L1+m) up-sampled input matrix is filtered with the respective de-convolution filter to generate a respective (k2+k3)-D layer-(L1+m) per-filter output matrix. At sub-operation 926, all of the (k2+k3)-D layer-(L1+m) per-filter output matrices are combined and concatenated to form a (k2+k3)-D layer-(L1+m) output matrix which is also a layer-(L1+m+1) input matrix. A size of the layer-(L1+m) output matrix in each of the remaining k2 original dimensions is greater than or equal to a size of a corresponding original dimension of the layer-(L1+m) input matrix. A size of the layer-(L1+m) output matrix in each of the k3 expanded dimensions is less than or equal to a size of a corresponding expanded dimension of the layer-(L1+m) input matrix. At operation 930, the k3 expanded dimensions of the layer-(L1+L2) output matrix are removed to generate the k2-D output imaging matrix.

FIG. 10 illustrates a flow chart of an example method 1000 for processing a skip connection, according to some embodiments of the present disclosure. In various embodiments, the method 1000 can be performed by the systems disclosed above. As shown in FIG. 10, the operation 1010 in this example includes multiple sub-operations 1012-1016 performed to process a m1–n1 skip connection, which is a skip connection between layer m1 of the encoder and layer n1 of the decoder, with 1<=m1<=L1, 1<=n1<=L2. At sub-operation 1012, the (k1+k3)-D layer-(m1) output matrix of the encoder is adjusted to generate a (k2+k3)-D adjusted layer-(m1) output matrix of the encoder, where the (k2+k3)-D adjusted layer-(m1) output matrix has a same dimension and a same size as the (k2+k3)-D layer-(L1+n1) output matrix of the decoder. At sub-operation 1014, a temporary output matrix is computed as a weighted average of the (k2+k3)-D adjusted layer-(m1) output matrix of the encoder and the (k2+k3)-D layer-(L1+n1) output matrix of the decoder. At sub-operation 1016, the (k2+k3)-D layer-(L1+n1+1) input matrix of the decoder is replaced by the temporary output matrix.

FIG. 11 illustrates a flow chart of an example method 1100 for quality evaluation of channel measurements for wireless sensing, according to some embodiments of the present disclosure. In various embodiments, the method 1100 can be performed by the systems disclosed above. At operation 1102, a time series of wireless sounding signals are transmitted by a transmitting device with a first system configuration of the transmitting device and a first placement of the transmitting device in a venue. At operation 1104, the time series of wireless sounding signals are received by a receiving device with a second system configuration of the receiving device and a second placement of the receiving device through a wireless channel of the venue, where each received wireless sounding signal differs from the transmitted wireless sounding signal due to the wireless channel and a motion of an object in the venue. At operation 1106, a time series of channel information (TSCI) is obtained by the receiving device based on the time series of received wireless sounding signals. At operation 1108, a task-specific CI-quality score associated with a quality of the TSCI is computed in relation to a wireless sensing task based on the TSCI. At operation 1110, a task-specific qualification test of the TSCI is performed based on the task-specific CI-quality score to qualify or disqualify the TSCI obtained from a wireless link between the transmitting device and the receiving device for the wireless sensing task. At operation 1112, when the TSCI is qualified, the wireless sensing task is performed based on the qualified TSCI.

FIG. 12A and FIG. 12B illustrate a flow chart of an example method 1200 for task-specific qualification, according to some embodiments of the present disclosure. In various embodiments, the method 1200 can be performed by the systems disclosed above. As shown in FIG. 12A, at operation 1202, when no TSCI is qualified, the first system configuration of the transmitting device, the first placement of the transmitting device in the venue, the second system configuration of the receiving device, and the second placement of the receiving device in the venue are adjusted based on the CI-quality score of all disqualified TSCI. At operation 1204, a second wireless sounding signal is transmitted by the transmitting device with the adjusted first system configuration and the adjusted first placement of the transmitting device. At operation 1206, the second wireless sounding signal is received by the receiving device with the adjusted second system configuration and the adjusted second placement of the receiving device through the wireless channel of the venue, where the received wireless sounding signal differs from the transmitted wireless sounding signal due to the wireless channel and the motion of the object in the venue. At operation 1208, a second TSCI is obtained by the receiving device based on the received second wireless sounding signal.

As shown in FIG. 12B, at operation 1210, a second task-specific CI-quality score associated with the quality of the second TSCI is computed in relation to the wireless sensing task based on the second TSCI. At operation 1212, the task-specific qualification test of the second TSCI is performed based on the second task-specific CI-quality score to qualify or disqualify the second TSCI for the wireless sensing task. At operation 1214, when the second TSCI is not qualified, the iterative adjustment and task-specific qualification are repeated until a qualified second TSCI is obtained or a time out is reached. At operation 1216, when the second TSCI is qualified, the wireless sensing task is performed based on the qualified second TSCI.

FIG. 13 illustrates a flow chart of an example method 1300 for computing a task-specific CI-timing rate score, according to some embodiments of the present disclosure. In various embodiments, the method 1300 can be performed by the systems disclosed above. At operation 1302, a plurality of instantaneous inter-CI durations in a sliding time window are computed based on the TSCI, each inter-CI duration being computed by subtracting time stamps of a respective pair of temporally adjacent CI of the TSCI in the sliding time window. At operation 1304, an effective sounding rate (ESR) is computed for the sliding time window based on the plurality of instantaneous inter-CI durations, by computing one of the following: a first aggregate of an inverse of instantaneous inter-CI duration, where the inverse of instantaneous inter-CI duration is an instantaneous rate; or an inverse of a second aggregate of the plurality of instantaneous inter-CI durations. At operation 1306, the ESR is compared with a task-specific reference sounding rate of the wireless sensing task, where the time series of wireless sounding signals are configured to be transmitted by the transmitting device at uniform time intervals at the task-specific reference sounding rate. At operation 1308, a task-specific CI-timing rate score is computed for the wireless sensing task based on the ESR and the task-specific reference sounding rate of the wireless sensing task.

FIG. 14 illustrates a flow chart of an example method 1400 for computing a CI-timing regularity score, according to some embodiments of the present disclosure. In various embodiments, the method 1400 can be performed by the systems disclosed above. The operation 1410 in this example includes multiple sub-operations 1412 and 1418 performed to compute a CI-timing variation based on the plurality of instantaneous inter-CI durations for the sliding time window, where the CI-timing variation comprise an effective variation (EV). At sub-operation 1412, a first CI-timing variation is computed as an EV of the instantaneous inter-CI durations. At sub-operation 1414, a second CI-timing variation is computed as an EV of the instantaneous rate, where the instantaneous rate is an inverse of the instantaneous inter-CI duration. At sub-operation 1416, a third CI-timing variation is computed as a task-specific deviation of instantaneous rate from the task-specific reference sounding rate which is a monotonic non-decreasing function of the absolute difference between the instantaneous rate and the reference sounding rate, where the instantaneous rate is an inverse of the instantaneous inter-CI duration. At sub-operation 1418, a fourth CI-timing variation is computed as a task-specific deviation of instantaneous inter-CI duration from a task-specific reference inter-CI duration which is a monotonic non-decreasing function of the absolute difference between the instantaneous inter-CI duration and the task-specific reference inter-CI duration, where the reference inter-CI duration is an inverse of the reference sounding rate. At operation 1420, a CI-timing regularity score is computed for the wireless sensing task based on the CI-timing variation.

FIG. 15 illustrates a flow chart of an example method 1500 for computing an aggregate of a plurality of CI-timing variations, according to some embodiments of the present disclosure. In various embodiments, the method 1500 can be performed by the systems disclosed above. At operation 1502, a first plurality of CI-timing variations are computed based on the plurality of instantaneous inter-CI durations for the sliding time window. At operation 1504, another CI-timing variation is computed as an aggregate of the first plurality of CI-timing variations. At operation 1506, a second plurality of CI-timing variations are computed based on a number of concurrent sliding time windows each with respective durations, each CI-timing variation computed based on a respective concurrent sliding time window with respective duration. At operation 1508, another CI-timing variation is computed as an aggregate of the second plurality of CI-timing variations, where: the number of concurrent sliding time windows share a common time stamp, the another CI-timing variation is associated with the common time stamp, and at least two concurrent sliding time windows have different durations.

FIG. 16 illustrates a flow chart of an example method 1600 for computing a CI-amplitude score, according to some embodiments of the present disclosure. In various embodiments, the method 1600 can be performed by the systems disclosed above. At operation 1602, a CI-amplitude variation is computed as an EV of a magnitude of each CI of the TSCI in the sliding time window, where: each CI comprises N1 components, each CI is represented as a vector with the N1 components, the magnitude of each CI is a function of an L–k norm of the vector of the CI, with k being a positive integer. At operation 1604, a CI-amplitude regularity score is computed based on the CI-amplitude variation. At operation 1606, the CI of the TSCI in the N1-D vector space are clustered to obtain a set of clusters. At operation 1608, the largest cluster with a largest cluster size is identified among the set of clusters. At operation 1610, the second largest cluster with a second largest cluster size is identified among the set of clusters. At operation 1612, a CI-amplitude clustering feature is computed as a quotient of the cluster size of the second largest cluster over the cluster size of the largest cluster. At operation 1614, a CI-amplitude clustering score is computed based on the CI-amplitude clustering feature. At operation 1616, a CI-amplitude score is computed as an aggregate of the CI-amplitude regularity score and the CI-amplitude clustering score.

The following numbered clauses provide examples for encoder-decoder-based high resolution imaging.

Clause 1. A method/device/system for encoder-decoder-based high resolution imaging, comprising: assembling a k1-dimensional (k1-D) imaging matrix by a processor by arranging and concatenating a plurality of k2-dimensional (k2-D) input imaging matrices; encoding the k1-D imaging matrix by a k1-D encoding neural network (encoder) to generate a (k1+k3)-D first intermediate matrix; generating a (k2+k3)-D second intermediate matrix based on the (k1+k3)-D first intermediate matrix; and decoding the (k2+k3)-D second intermediate matrix by a k2-D decoding neural network (decoder) to generate a k2-D output imaging matrix, wherein there is at least one k1-D-to-k2-D skip connection between the k1-D encoder and the k2-D decoder, wherein an imaging resolution of the k2-D output imaging matrix is greater than the imaging resolution of any one of the plurality of k2-D input imaging matrices.

Clause 2. The method/device/system for encoder-decoder-based high resolution imaging of clause 1, comprising: determining a (k1+k3)-dimensional ((k1+k3)-D) expanded matrix by adding k3 expanded dimensions to the existing k1 original dimensions of the k1-D imaging matrix, wherein the size of the (k1+k3)-D expanded matrix is 1 in each of the k3 expanded dimensions, wherein the k1-D encoder comprises L1 layers, each associated with multiple convolution filters, wherein the (k1+k3)-D expanded matrix is a (k1+k3)-D layer-1 input matrix to a layer 1 of the encoder, the first of the L1 layers of the encoder.

Clause 3. The method/device/system for encoder-decoder-based high resolution imaging of clause 2, comprising: for n=1 to L1: for each of the multiple respective convolution filter associated with the layer n of the encoder: filtering the (k1+k3)-D layer-n input matrix with the respective convolution filter to generate respective (k1+k3)-D layer-n per-filter output matrix, and down-sampling the respective (k1+k3)-D layer-n per-filter output matrix in at least one of the k1 original dimensions with max-pooling, and concatenating all the (k1+k3)-D layer-n per-filter output matrix to form a (k1+k3)-D layer-n output matrix which is also a layer-(n+1) input matrix, wherein the size of the layer-n output matrix in each of the k1 original dimensions is smaller than or equal to the size of the corresponding original dimension of the layer-n input matrix, wherein the size of the layer-n output matrix in each of the k3 expanded dimensions is greater than or equal to the size of the corresponding expanded dimension of the layer-n input matrix, wherein the (k1+k3)-D first intermediate matrix is the layer-(L1) output matrix.

Clause 4. The method/device/system for encoder-decoder-based high resolution imaging of clause 3: wherein the size of the (k1+k3)-D first intermediate matrix is 1 in at least (k1–k2) of the k1 original dimensions.

Clause 5. The method/device/system for encoder-decoder-based high resolution imaging of clause 3: wherein the size of the (k1+k3)-D first intermediate matrix is 1 in each of the k1 original dimensions.

Clause 6. The method/device/system for encoder-decoder-based high resolution imaging of clause 5, further comprising: removing (k1–k2) of the k1 original dimensions of the (k1+k3)-D first intermediate matrix to generate the (k2+k3)-D second intermediate matrix, wherein the decoder comprises L2 layers, each associated with multiple de-convolution filters, wherein the (k2+k3)-D second intermediate matrix is a (k2+k3)-D layer-(L1+1) input matrix to a layer 1 of the decoder, the first of the L2 layers of the decoder.

Clause 7. The method/device/system for encoder-decoder-based high resolution imaging of clause 6, comprising: for n=1 to L2: up-sampling a (k2+k3)-D layer-(L1+n) input matrix in at least one of the k2 original dimensions to generate a (k2+k3)-D layer-(L1+n) up-sampled input matrix, for each of the multiple respective de-convolution filter associated with the layer n of the decoder: filtering the (k2+k3)-D layer-(L1+n) up-sampled input matrix with the respective de-convolution filter to generate respective (k2+k3)-D layer-(L1+n) per-filter output matrix, and combining and concatenating the multiple (k2+k3)-D layer-(L1+n) per-filter output matrix to form a (k2+k3)-D layer-(L1+n) output matrix which is also a layer-(L1+n+1) input matrix, wherein the size of the layer-(L1+n) output matrix in each of the k2 original dimensions is greater than or equal to the size of the corresponding original dimension of the layer-(L1+n) input matrix, wherein the size of the layer-(L1+n) output matrix in each of the k3 expanded dimensions is less than or equal to the size of the corresponding expanded dimension of the layer-(L1+n) input matrix; and removing the k3 expanded dimensions of the layer-(L1+L2) output matrix to generate the k2-D output imaging matrix.

Clause 8. The method/device/system for encoder-decoder-based high resolution imaging of clause 7, comprising: wherein there is a m1–n1 skip connection, which is a skip connection between layer m1 of the encoder and layer n1 of the decoder, with 1<=m1<=L1, 1<=n1<=L2; processing the m1–n1 skip connection by: adjusting the (k1+k3)-D layer-(m1) output matrix of the encoder to generate a (k2+k3)-D adjusted layer-(m1) output matrix of the encoder such that the adjusted matrix has same dimension and size as the (k2+k3)-D layer-(L1+n1) output matrix of the decoder; computing a temporary output matrix as a weighted average of the (k2+k3)-D adjusted layer-(m1) output matrix of the encoder and the (k2+k3)-D layer-(L1+n1) output matrix of the decoder; replacing the (k2+k3)-D layer-(L1+n1+1) input matrix of the decoder by the temporary output matrix.

Clause 9. The method/device/system for encoder-decoder-based high resolution imaging of clause 8, comprising: wherein there is a m2–n2 skip connection, which is a skip connection between layer m2 of the encoder and layer n2 of the decoder, with 1<=m1<m2<=L1, 1<=n2<n1<=L2; processing all skip connections in ascending order of the layer index of the decoder such that the m2–n2 skip connection is processed before the m1–n1 skip connection.

Clause 10. The method/device/system for encoder-decoder-based high resolution imaging of clause 8, comprising: for any n1 and the (k2+k2)-D layer-(L1+n1) output matrix of the decoder: performing a search among all L1 layers of the encoder to identify the m1 layer of the encoder which has an adjusted output matrix size matching the size of the layer-(L1+n1) output matrix of the decoder, in order to form the m1–n1 skip connection.

Clause 11. The method/device/system for encoder-decoder-based high resolution imaging of clause 10, comprising: when no perfectly matching layer of the encoder is found, a best match is used for the m1–n1 skip connection, wherein the best match m1 is a layer of the encoder with minimum absolute difference between the size of its adjusted output matrix and the size of the layer-(L1+n1) output matrix of the decoder.

Clause 12. The method/device/system for encoder-decoder-based high resolution imaging of clause 8, comprising: computing each element of the (k2+k3)-D adjusted layer-(m1) output matrix of the encoder as a characteristic value of a respective (k1–k2)-D sub-matrix of the (k1+k3)-D layer-(m1) output matrix of the encoder, wherein the characteristic value is an aggregate of the elements in the respective (k1–k2)-D submatrix, the aggregate comprising one of: mean, arithmetic mean, geometric mean, harmonic mean, weighted average, percentile, minimum (0-percentile), median (50-percentile), maximum (100-percentile), trimmed mean (mean of percentile from A1-percentile to A2-percentile), mode, sum, weighted sum, product or weighted product.

Clause 13. The method/device/system for encoder-decoder-based high resolution imaging of clause 1, comprising: training the k1-D encoder and the k2-D decoder as part of a conditional generative adversarial network (cGAN)

comprising a generator and a discriminator, wherein the generator comprises the k1-D encoder and the k2-D decoder with the at least one skip connection, with the k1-D imaging matrix as input of the generator and the k2-D output imaging matrix as output of the generator, wherein the discriminator comprises: the k1-D encoder with the k1-D imaging matrix as input and the (k2+k3)-D second intermediate matrix as output, a second k2-D encoder with a k2-D supplementary input imaging matrix as input, and a full-connected network to compute a real-fake score.

Clause 14. The method/device/system for encoder-decoder-based high resolution imaging of clause 1, comprising: training the cGAN with a cost function which is a weighted sum of a standard generative adversarial network (GAN) loss function and at least one of: a L–k loss function or a weighted L–k loss function between the k2-D output imaging matrix and the k2-D supplement input imaging matrix, with k being an integer, a visual loss function, a pre-trained perceptual loss function, a SSIM loss function, an image structural loss function, or an image-based loss function.

Clause 15. The method/device/system for encoder-decoder-based high resolution imaging of clause 1, comprising: transmitting a wireless signal through a wireless channel of a venue by a Type1 heterogeneous wireless device with a first number, B1, of transmit antennas; receiving the wireless signal by a Type2 heterogeneous wireless device with a second number, B2, of receive antennas, wherein the received wireless signal is different from the transmitted wireless signal due to the wireless channel and a motion of an object, wherein B2*B2>100; obtaining a set of time series of channel information (TSCI) of the wireless channel based on the received wireless signal, wherein each channel information (CI) comprises one of: channel state information (CSI), channel impulse response (CIR), frequency computing the plurality of k2-D input imaging matrices based on the set of TSCI.

Clause 16. The method/device/system for encoder-decoder-based high resolution imaging of clause 15, comprising: wherein each of the plurality of k2-D input imaging matrices is associated with a respective antenna of the Type1 device.

Clause 17. The method/device/system for encoder-decoder-based high resolution imaging of clause 15, comprising: wherein each of the plurality of k2-D input imaging matrix is associated with a respective antenna of the Type2 device.

Clause 18. The method/device/system for encoder-decoder-based high resolution imaging of clause 15, comprising: wherein each of the plurality of k2-D input imaging matrix is computed based on CI at one time stamp.

Clause 19. The method/device/system for encoder-decoder-based high resolution imaging of clause 15, comprising: wherein each of the plurality of k2-D input imaging matrix is computed based on CI at more than one time stamps.

Clause 20. The method/device/system for encoder-decoder-based high resolution imaging of clause 1: wherein k2=2; wherein each k2-D input imaging matrix is a 2-D input image.

Clause 21. The method/device/system for encoder-decoder-based high resolution imaging of clause 20: wherein k1=k2+1; wherein the 3-D imaging matrix is assembled by stacking the plurality of correlated 2-D input imaging matrices.

Clause 22. The method/device/system for encoder-decoder-based high resolution imaging of clause 20: wherein k1=k2+2; wherein the 4-D imaging matrix is assembled by stacking the plurality of correlated 2-D input imaging matrices.

The following numbered clauses provide examples for quality evaluation of channel measurements for wireless sensing.

In some embodiments, a wireless sensing system may comprise a Type1 device (TX) and a Type2 device (RX). Each device may have respective software/system configuration, and respective device/antenna placement (location+ orientation). The system may be designed for a wireless sensing task. However, the quality of raw sensing measurements (TSCI) from the wireless sounding signals may be tested/evaluated to determine whether the TX/RX and respective configuration/placement are good for the wireless sensing task, or not. In some embodiments, to evaluate/ qualify/disqualify the TSCI, task-specific CI-quality score may be computed based on TSCI. A task-specific qualification test may be performed based on the task-specific CI-quality score.

Clause A1. A method/device/system of quality evaluation of channel measurements for wireless sensing, comprising: transmitting a time series of wireless sounding signals by a Type1 heterogeneous wireless device with a first system configuration of the Type1 device and a first placement of the Type1 device in a venue; receiving the time series of wireless sounding signals by a Type2 heterogeneous wireless device with a second system configuration of the Type2 device and a second placement of the Type2 device through a wireless channel of the venue, wherein each received wireless sounding signal differs from the transmitted wireless sounding signal due to the wireless channel and a motion of an object in the venue; obtaining a time series of channel information (TSCI) by the Type2 device based on the time series of received wireless sounding signal; computing a task-specific CI-quality score associated with a quality of the TSCI in relation to a wireless sensing task based on the TSCI; performing a task-specific qualification test of the TSCI based on the task-specific CI-quality score to qualify or disqualify the TSCI obtained from a wireless link between the Type1 device and the Type2 device for the wireless sensing task; when the TSCI is qualified, performing the wireless sensing task based on the qualified TSCI.

Clause A2. The method/device/system of quality evaluation of channel measurements for wireless sensing of clause A1, comprising: qualifying or disqualifying at least one of: the first system configuration of the Type1 device, the first placement of the Type1 device, the second system configuration of the Type2 device, and the second placement of the Type2 device, for the wireless sensing task, together with the TSCI, based on the CI-quality score.

In some embodiments, when TSCI is disqualified (not good enough), the two devices/system configuration/placement may be adjusted and qualification may be done again. The adjustment/qualification may be performed repeatedly/ iteratively/recursively until the TSCI is qualified/good enough, or a time out (e.g. max iteration) is reached. Then the wireless sensing task may be performed based on the final qualified setup.

Clause A3. The method/device/system of quality evaluation of channel measurements for wireless sensing of clause A2, comprising: when no TSCI is qualified, adjusting the first system configuration of the Type1 device, the first placement of the Type1 device in the venue, the second system configuration of the Type2 device, and the second placement of the Type2 device in the venue based on the CI-quality score of all the disqualified TSCI; transmitting a second wireless sounding signal by the Type1 device with the adjusted first system configuration and the adjusted first placement of the Type1 device; receiving the second wireless sounding signal by the Type2 device with the adjusted second system configuration and the adjusted second placement of the Type2 device through the wireless channel of the venue, wherein the received wireless sounding signal differs from the transmitted wireless sounding signal due to the wireless channel and the motion of the object in the venue; obtaining a second TSCI by the Type2 device based on the received second wireless sounding signal; computing a second task-specific CI-quality score associated with the quality of the second TSCI in relation to the wireless sensing task based on the second TSCI; performing the task-specific qualification test of the second TSCI based on the second task-specific CI-quality score to qualify or disqualify the second TSCI for the wireless sensing task; repeating the iterative adjustment and task-specific qualification until a qualified second TSCI is obtained or a time out is reached; when the second TSCI is qualified, performing the wireless sensing task based on the qualified second TSCI.

In some embodiments, when qualifying the system, one of the TX or RX may be a pre-qualified device (e.g. with pre-qualified system configuration and/or placement) and the other one of the TX or RX may be a to-be-qualified device. So when qualification fails, the adjustment may be performed only on the to-be-qualified device. In some embodiments, the pre-qualified device may have several pre-qualified system configuration and/or placement. When the TSCI is disqualified, the to-be-qualified device may be adjusted. If many adjustments were applied and the TSCI still failed, then the system configuration/placement of the pre-qualified device may be adjusted to another qualified configuration/placement. And the recursion of qualification/ adjustment may be repeated.

Clause A4. The method/device/system of quality evaluation of channel measurements for wireless sensing of clause A3, comprising: wherein one of the Type1 device and the Type2 device is a pre-qualified device with pre-qualified system configuration and pre-qualified placement, performing the task-specific qualification test of the second TSCI based on the second task-specific CI-quality score to qualify or disqualify, together with the second TSCI, the other one of the Type1 device and the Type2 device with associated system configuration and placement for the wireless sensing task.

Clause A5. The method/device/system of quality evaluation of channel measurements for wireless sensing of clause A4, comprising: wherein the system configuration of the pre-qualified device is not adjusted in the iterative adjustment and task-specific qualification.

In some embodiments, to qualify TSCI, instantaneous inter-CI duration and instantaneous rate (inverse of instantaneous inter-CI duration) may be measured/computed. Both are related to CI timing accuracy. In some embodiments, for the wireless sensing task, there may be a required sounding rate. ("reference sounding rate"). The wireless sounding signal may be designed to be transmitted by the Type1 device (TX) at the reference sounding rate. In some embodiments, some effective sounding rate (ESR) may be computed. It may be compared with reference sounding rate (e.g. required sounding rate for wireless sensing task). The sounding signal sent by TX to RX may be configured to be the reference sounding rate. If they match, the TSCI may be good. If they differ a lot, the TSCI may be bad. In some embodiments, more than one reference sounding rate may be studied. For TX/RX configuration/placement and associated TSCI may be good/qualified for low sounding rate, but not good/disqualified for high sounding rate. The particular sounding rate at which the ESR fails to catch up with the respective reference sounding rate (with considerable/significant deviation) may be computed. The system/configuration/placement/setup may then be qualified up to the particular sounding rate. In some embodiments, task-specific CI-timing rate score may be computed based on ESR and task-specific reference sounding rate.

Clause A6. The method/device/system of quality evaluation of channel measurements for wireless sensing of clause A1, comprising: computing a plurality of instantaneous inter-CI durations in a sliding time window based on the TSCI, each inter-CI duration being computed by subtracting time stamps of a respective pair of temporally adjacent CI of the TSCI in the sliding time window; computing an effective sounding rate (ESR) for the sliding time window based on the plurality of instantaneous inter-CI durations; comparing the ESR with a task-specific reference sounding rate of the wireless sensing task, wherein the time series of wireless sounding signals are configured to be transmitted by the Type1 device at uniform time intervals at the task-specific reference sounding rate; computing a task-specific CI-timing rate score for the wireless sensing task based on the ESR and the task-specific reference sounding rate of the wireless sensing task.

In some embodiments, ESR may be an inverse of aggregate/average of instantaneous inter-CI duration, or aggregate/average of instantaneous rate (which is inverse of inter-CI duration).

Clause A7. The method/device/system of quality evaluation of channel measurements for wireless sensing of clause A6, comprising: computing the ESR by computing one of the following: a first aggregate of an inverse of instantaneous inter-CI duration, wherein the inverse of instantaneous inter-CI duration is an instantaneous rate, and an inverse of a second aggregate of the plurality of instantaneous inter-CI durations, wherein any aggregate comprises sum, weighted sum, product, weighted product, mean, weighted mean, arithmetic mean, geometric mean, harmonic mean, percentile, minimum (0-percentile), maximum (100-percentile), median (50-percentile), trimmed mean, (mean of percentile from A1-percentile to A2-percentile), mode, or another aggregate of any of the above.

In some embodiments, when multiple ESR are computed, they can be combined/aggregated to form another ESR (a combined ESR).

Clause A8. The method/device/system of quality evaluation of channel measurements for wireless sensing of clause A7, comprising: computing a plurality of ESR; computing another ESR as an aggregate of the plurality of ESR.

In some embodiments, in a special case, windows with different window length/duration may be used to compute the same ESR (e.g. average of instantaneous rate, for several window lengths: 10 sec, 1 min, 1 hour) lead to a plurality of ESR. Each ESR is associated with all the time stamps in the respective time window. Large window may give medium/long term behavior while short window may give short-term behavior. All these windows may be concurrent/contemporaneous/overlapping with at least one common time stamp being in all these windows. The plurality of ESR may be combined/aggregated to form a new ESR. The new ESR may be associated with the at least one common time stamp. In some embodiments, the window size may be so different that a long window (e.g. 10 min long) may totally encompass a short window (e.g. 1 min long).

Clause A9. The method/device/system of quality evaluation of channel measurements for wireless sensing of clause A8, comprising: computing a plurality of ESR, each being a same ESR computed based on a number of concurrent sliding time windows each with respective durations; computing another ESR as an aggregate of the plurality of ESR.

Clause A10. The method/device/system of quality evaluation of channel measurements for wireless sensing of clause A9: wherein the number of concurrent sliding time windows share at least one common time stamp.

Clause A11. The method/device/system of quality evaluation of channel measurements for wireless sensing of clause A10: wherein at least two concurrent sliding time windows have different durations.

Clause A12. The method/device/system of quality evaluation of channel measurements for wireless sensing of clause A11: wherein one of the at least two concurrent sliding time windows is a subset of another one of the at least two concurrent sliding time windows.

In some embodiments, while ESR may be computed independent of the wireless sensing task, the reference sounding rate may reflect a requirement/setting of the wireless sensing task. In some embodiments, to gauge how good/bad the ESR is in relation to the reference sounding rate, a difference (ESR-reference sounding rate) or a quotient/ratio (ESR/reference sounding rate) may be computed in order to compute task-specific CI-timing rate score.

Clause A13. The method/device/system of quality evaluation of channel measurements for wireless sensing of clause A7: the task-specific CI-timing rate score comprises at least one of: a difference between the ESR and the task-specific reference sounding rate, a quotient of the ESR over the task-specific reference sounding rate, a function of the difference or the quotient, a mapping to a target range [L1, L2] between L1 and L2.

In some embodiments, when multiple wireless sensing tasks may be/may need to be considered, a task-nonspecific score (i.e. general score) may be computed without consider task-specific setting/configuration/requirement.

Clause A14. The method/device/system of quality evaluation of channel measurements for wireless sensing of clause A7: computing a task-nonspecific CI-timing rate score based on the ESR, without using the reference sounding rate of the wireless sensing task.

In some embodiments, in general, higher achievable EST is better and thus may have higher/larger score.

Clause A15. The method/device/system of quality evaluation of channel measurements for wireless sensing of clause A14: wherein the task-nonspecific CI-timing rate score is a monotonic non-decreasing function of the ESR.

In some embodiments, the score may have limited range (e.g. between 0 and 1) and thus clipping may be applied to clip at the min or max values.

Clause A16. The method/device/system of quality evaluation of channel measurements for wireless sensing of clause A15: wherein the monotonic non-decreasing function comprise a clipping function.

In some embodiments, in aggregate, there may be some weighted quantities such as weighted sum, weighted average, weighted product. The weight may be related to how far the individual values from the mean value. In some embodiments, a value very far away from the mean value may likely be an outlier and thus the weight may be less. A value close to the mean may likely not be outlier and thus the weight may be larger.

Clause A17. The method/device/system of quality evaluation of channel measurements for wireless sensing of clause A7: wherein a weight for a measurement in a weighted aggregate is a decreasing function of an absolute distance between the measurement and another aggregate In some embodiments, in addition to ESR and whether it is close to reference sound rate or not, it may be useful to measure how fluctuating/varying/variable is the CI timing. In some embodiments, some effective variation (e.g. variance) may be computed.

Clause A18. The method/device/system of quality evaluation of channel measurements for wireless sensing of clause A6: computing a CI-timing variation based on the plurality of instantaneous inter-CI durations for the sliding time window, wherein the CI-timing variation comprise an effective variation (EV), wherein any EV comprise at least one of: variance, standard deviation, absolute deviation, variation, total variation, absolute variation, square variation, derivative, range, range between two percentiles (e.g. 10% and 90%), inter-quartile range, spread, dispersion, variability, divergence, entropy, skewness, kurtosis, coefficient of variation, maximum-to-minimum ratio, a combination, an aggregate of the above; computing a CI-timing regularity score for the wireless sensing task based on the CI-timing variation.

In some embodiments, effective variation may be computed for instantaneous inter-CI duration.

Clause A19. The method/device/system of quality evaluation of channel measurements for wireless sensing of clause A18: computing a first CI-timing variation as an EV of the instantaneous inter-CI durations.

In some embodiments, effective variation may be computed for instantaneous rate (inverse of inter-CI duration).

Clause A20. The method/device/system of quality evaluation of channel measurements for wireless sensing of clause A18: computing a second CI-timing variation as an EV of the instantaneous rate, wherein the instantaneous rate is an inverse of the instantaneous inter-CI duration.

In some embodiments, while EV may compute deviation from mean, the system may compute deviation from reference sounding rate (or reference inter-CI duration) related to the wireless sensing task.

Clause A21. The method/device/system of quality evaluation of channel measurements for wireless sensing of clause A18: computing a third CI-timing variation as a task-specific deviation of instantaneous rate from the task-specific reference sounding rate which is a monotonic non-decreasing function of the absolute difference between the instantaneous rate and the reference sounding rate, where the instantaneous rate is an inverse of the instantaneous inter-CI duration.

Clause A22. The method/device/system of quality evaluation of channel measurements for wireless sensing of clause A18: computing a fourth CI-timing variation as a task-specific deviation of instantaneous inter-CI duration from a task-specific reference inter-CI duration which is a monotonic non-decreasing function of the absolute difference between the instantaneous inter-CI duration and the task-specific reference inter-CI duration, wherein the reference inter-CI duration is an inverse of the reference sounding rate.

In some embodiments, when multiple CI-timing variations are computed, they may be combined/aggregated to form another (combined) CI-timing variation.

Clause A23. The method/device/system of quality evaluation of channel measurements for wireless sensing of clause A18: computing a plurality of CI-timing variation based on the plurality of instantaneous inter-CI durations for the sliding time window; computing another CI-timing variation as an aggregate of a plurality of CI-timing variation.

In some embodiments, in a special case, a same CI-timing variation may be computed for concurrent/contemporary windows with different window lengths/durations to generate a plurality of CI-timing variation. Such concurrent/contemporary windows may have at least one common time stamp. In some embodiments, the plurality of CI-timing variation may be combined/aggregated to form a new/combined CI-timing variation, associated with the at least one common time stamp. In some embodiments, a special case: a long concurrent window may totally encompass/contain/comprise a short concurrent window.

Clause A24. The method/device/system of quality evaluation of channel measurements for wireless sensing of clause A23, comprising: computing a plurality of CI-timing variation based on a number of concurrent sliding time windows each with respective durations, each CI-timing variation computed based on a respective concurrent sliding time window with respective duration; computing another CI-timing variation as an aggregate of the plurality of CI-timing variation.

Clause A25. The method/device/system of quality evaluation of channel measurements for wireless sensing of clause A24: wherein the number of concurrent sliding time windows share a common time stamp; wherein the another CI-timing variation is associated with the common time stamp.

Clause A26. The method/device/system of quality evaluation of channel measurements for wireless sensing of clause A25: wherein at least two concurrent sliding time windows have different durations.

Clause A27. The method/device/system of quality evaluation of channel measurements for wireless sensing of clause A26: wherein one of the at least two concurrent sliding time windows is a subset of another one of the at least two concurrent sliding time windows.

In some embodiments, any CI-timing variation may be normalized (e.g. EV of observable X divided by mean of X).

Clause A28. The method/device/system of quality evaluation of channel measurements for wireless sensing of clause A18: normalizing the CI-timing variation by dividing the respective EV by a respective CI-timing mean computed based on the plurality of instantaneous inter-CI durations for the sliding time window, wherein the respective CI-timing mean comprise an aggregate.

In some embodiments, CI-timing rate score and CI-timing regularity score may be combined to form a new/combined CI-timing score.

Clause A29. The method/device/system of quality evaluation of channel measurements for wireless sensing of clause A18: computing a CI-timing score as an aggregate of CI-timing rate score and CI-timing regularity score.

In some embodiments, in addition to CI timing, the goodness/qualification of TSCI in relation magnitude of CI may be investigated/monitored/computed/analyzed. Good TSCI may have low variation/variability/variance. Bad TSCI may have large variation/variability/variance. In some embodiments, a CI-amplitude regularity score may be computed based on the CI-amplitude variation. Large variation may give low regularity score.

Clause A30. The method/device/system of quality evaluation of channel measurements for wireless sensing of clause A18: computing a CI-amplitude variation as an EV of a magnitude of each CI of the TSCI in the sliding time window; computing a CI-amplitude regularity score based on the CI-amplitude variation.

In some embodiments, CI magnitude may be L–k norm (e.g. L1/L2/L3/ . . . /Lk norm), or L–k norm square of CI vector.

Clause A31. The method/device/system of quality evaluation of channel measurements for wireless sensing of clause A30: wherein each CI comprises N1 components; wherein each CI is represented as a vector with the N1 components; wherein the magnitude of each CI is a function of an L–k norm of the vector of the CI, with k being a positive integer.

Clause A32. The method/device/system of quality evaluation of channel measurements for wireless sensing of clause A31: wherein the magnitude of each CI is the L–k norm of the vector of the CI.

Clause A33. The method/device/system of quality evaluation of channel measurements for wireless sensing of clause A31: wherein the magnitude of each CI is a square of the L–k norm of the vector of the CI.

In some embodiments, for good/qualified TSCI, CI-amplitude should have a largest cluster of CI magnitude much bigger (i.e. with much/significantly larger cluster size) than the second largest cluster. In some embodiments, clustering may be performed to find largest and second largest clusters. CI-amplitude clustering feature may be quotient (or ratio) of second largest cluster size over/to largest cluster size.

Clause A34. The method/device/system of quality evaluation of channel measurements for wireless sensing of clause A30: wherein each CI comprises N1 CI components (CIC); wherein each CI is represented a N1-dimensional (N1-D) vector in a N1-D vector space, the N1-D vector comprising the N1 CIC of the CI; clustering the CI of the TSCI in the N1-D vector space to obtain a set of clusters; identifying the largest cluster with largest cluster size among the set of clusters; identifying the second largest cluster with second largest cluster size among the set of clusters; computing a CI-amplitude clustering feature as a quotient of the cluster size of the second largest cluster over the cluster size of the largest cluster; computing a CI-amplitude clustering score based on the CI-amplitude clustering feature.

Clause A35. The method/device/system of quality evaluation of channel measurements for wireless sensing of clause A34: computing a CI-amplitude score as an aggregate of the CI-amplitude regularity score and the CI-amplitude clustering score.

In some embodiments, in wireless sensing applications, a basic/fundamental sensing task is motion detection. A motion statistics may be computed, such as TRRS (time reversal resonance strength), or similarity score/inner product of CI-vector of two temporally adjacent CI, autocorrelation function (ACF) evaluated at one sampling period. In some embodiments, in good/qualified TSCI, the in-motion motion statistics computed from TSCI obtained during large/significant user motion (e.g. user walking next to TX or RX) should have Gaussian/normal distribution. In some embodiments, thus an in-motion MS-distribution feature may be computed as a statistic distance, such as Kullback-Leibler (KL) divergence between sample distribution of motion statistics and Gaussian distribution.

Clause A36. The method/device/system of quality evaluation of channel measurements for wireless sensing of clause A35: computing a sample distribution of CI magnitude vector and corresponding sample mean and sample variance; computing a statistical distance between the sample distribution and a Gaussian distribution with mean being the sample mean and variance being the sample variance, wherein the statistical distance comprises one of: Kullback-Leibler distance, relative entropy, f-divergence, discriminability index, Bhattacharyya distance, Jensen-Shannon divergence, Renyi divergence, total variation distance, Hellinger distance, Levy-Prokhorov metric, Wasserstein metric, Mahalanobis distance, Amari distance, or integral probability metric; computing an in-motion MS-distribution score based on the statistical distance.

In some embodiments, for good/qualified TSCI, MS should have a high likelihood/probability to be greater than a reference threshold to enable detection of user motion when there is user motion.

Clause A37. The method/device/system of quality evaluation of channel measurements for wireless sensing of clause A36: computing an in-motion MS likelihood based on the in-motion sample distribution of CI magnitude vector, the in-motion MS likelihood being that the MS greater than a reference threshold when there is user motion, wherein the reference threshold is a task-specific threshold for a supplementary motion detection task; computing an in-motion MS-likelihood score based on the in-motion MS likelihood.

In some embodiments, for good/qualified TSCI, MS should have a high likelihood/probability to be less than a reference threshold to enable detection of no user motion when there is no motion.

Clause A38. The method/device/system of quality evaluation of channel measurements for wireless sensing of clause A36: computing a no-motion MS likelihood based on the sample distribution of CI magnitude vector, the no-motion MS likelihood being that the MS magnitude less than the reference threshold when there is no user motion, wherein the reference threshold is a task-specific threshold for a supplementary motion detection task; computing a no-motion MS-likelihood score based on the no-motion MS likelihood.

In some embodiments, for good/qualified TSCI, the tailedness of MS (kurtosis) should be equal to that of Gaussian distribution.

Clause A39. The method/device/system of quality evaluation of channel measurements for wireless sensing of clause A36: computing a in-motion MS-tailedness based on the sample distribution of CI magnitude vector, the in-motion MS-tailedness being the kurtosis of the sample distribution; computing a deviation of the in-motion MS-tailedness with a tailedness of a Gaussian distribution, computing an in-motion MS-tailedness score based on the in-motion MS-tailedness.

Clause A40. The method/device/system of quality evaluation of channel measurements for wireless sensing of clause A36: computing a MS score based on an aggregate of at least two of: in-motion MS-distribution score, in-motion MS-likelihood score, no-motion MS-likelihood score, or in-motion MS-tailedness score.

In some embodiments, when there are multiple TSCI, the analytics such as ESR, EV, CI-timing variation, CI-amplitude variation, CI-amplitude clustering feature/score, etc. may be computed based on all the TSCI.

Clause A41. The method/device/system of quality evaluation of channel measurements for wireless sensing of clause A6: receiving multiple TSCI by the Type2 device based on the time series of received wireless sounding signal, wherein each TSCI is associated with a respective antenna of the Type 1 device and a respective antenna of the Type2 device; computing a respective plurality of instantaneous inter-CI durations in the sliding time window based on the multiple TSCI, each plurality of instantaneous inter-CI duration computed from respective TSCI, each inter-CI duration being computed by subtracting time stamps of a respective pair of temporally adjacent CI of respective TSCI in the sliding time window, computing the ESR for the sliding time window based on the multiple plurality of instantaneous inter-CI durations.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A method for encoder-decoder-based high resolution imaging, comprising:
   assembling a k1-dimensional (k1-D) imaging matrix by a processor based on arranging and concatenating a plurality of k2-dimensional (k2-D) input imaging matrices;
   encoding the k1-D imaging matrix by an encoder, which is a k1-D encoding neural network, to generate a (k1+k3)-D first intermediate matrix that includes k1 original dimensions of the k1-D imaging matrix and k3 expanded dimensions;
   generating a (k2+k3)-D second intermediate matrix by removing (k1−k2) of the k1 original dimensions in the (k1+k3)-D first intermediate matrix, wherein each of k1, k2, k3 is a positive integer; and
   decoding the (k2+k3)-D second intermediate matrix by a decoder, which is a k2-D decoding neural network, to generate a k2-D output imaging matrix, wherein:
   there is at least one skip connection between the encoder and the decoder, and
   an imaging resolution of the k2-D output imaging matrix is greater than the imaging resolution of any one of the plurality of k2-D input imaging matrices.

2. The method of claim 1, further comprising:
   determining a (k1+k3)-D expanded matrix by adding k3 expanded dimensions to the k1 original dimensions of the k1-D imaging matrix, wherein:
   a size of the (k1+k3)-D expanded matrix is 1 in each of the k3 expanded dimensions,
   the encoder comprises L1 layers, each associated with multiple convolution filters,
   the (k1+k3)-D expanded matrix is a (k1+k3)-D layer-1 input matrix to a layer 1 of the encoder, the first layer of the L1 layers of the encoder.

3. The method of claim 2, further comprising:
   for each n between 1 and L1:
   for each respective convolution filter of the multiple convolution filters associated with layer n of the encoder:
   filtering a (k1+k3)-D layer-n input matrix with the respective convolution filter to generate a respective (k1+k3)-D layer-n per-filter output matrix, and
   down-sampling the respective (k1+k3)-D layer-n per-filter output matrix in at least one of the k1 original dimensions with max-pooling; and
   concatenating all of the (k1+k3)-D layer-n per-filter output matrices to form a (k1+k3)-D layer-n output matrix which is also a layer-(n+1) input matrix, wherein:
   a size of the layer-n output matrix in each of the k1 original dimensions is smaller than or equal to a size of a corresponding original dimension of the layer-n input matrix, a size of the layer-n output matrix in each of the k3 expanded dimensions is greater than or equal to a size of a corresponding expanded dimension of the layer-n input matrix, the (k1+k3)-D first intermediate matrix is the layer-(L1) output matrix, and a size of the (k1+k3)-D first intermediate matrix is 1 in each of the k1 original dimensions.

4. The method of claim 3, wherein:

the decoder comprises L2 layers, each associated with multiple de-convolution filters, the (k2+k3)-D second intermediate matrix is a (k2+k3)-D layer-(L1+1) input matrix to a layer 1 of the decoder, the first layer of the L2 layers of the decoder.

5. The method of claim 4, further comprising:

for each m between 1 and L2:

up-sampling a (k2+k3)-D layer-(L1+m) input matrix in at least one of the remaining k2 original dimensions to generate a (k2+k3)-D layer-(L1+m) up-sampled input matrix, for each respective de-convolution filter of the multiple de-convolution filters associated with layer m of the decoder, filtering the (k2+k3)-D layer-(L1+m) up-sampled input matrix with the respective de-convolution filter to generate a respective (k2+k3)-D layer-(L1+m) per-filter output matrix, and combining and concatenating all of the (k2+k3)-D layer-(L1+m) per-filter output matrices to form a (k2+k3)-D layer-(L1+m) output matrix which is also a layer-(L1+m+1) input matrix, wherein:

a size of the layer-(L1+m) output matrix in each of the remaining k2 original dimensions is greater than or equal to a size of a corresponding original dimension of the layer-(L1+m) input matrix, a size of the layer-(L1+m) output matrix in each of the k3 expanded dimensions is less than or equal to a size of a corresponding expanded dimension of the layer-(L1+m) input matrix; and removing the k3 expanded dimensions of the layer-(L1+L2) output matrix to generate the k2-D output imaging matrix.

6. The method of claim 5, further comprising:

processing a m1–n1 skip connection, which is a skip connection between layer m1 of the encoder and layer n1 of the decoder, with 1<=m1<=L1, 1<=n1<=L2, wherein the m1–n1 skip connection is processed based on:

adjusting the (k1+k3)-D layer-(m1) output matrix of the encoder to generate a (k2+k3)-D adjusted layer-(m1) output matrix of the encoder, wherein the (k2+k3)-D adjusted layer-(m1) output matrix has a same dimension and a same size as the (k2+k3)-D layer-(L1+n1) output matrix of the decoder;

computing a temporary output matrix as a weighted average of the (k2+k3)-D adjusted layer-(m1) output matrix of the encoder and the (k2+k3)-D layer-(L1+n1) output matrix of the decoder; and replacing the (k2+k3)-D layer-(L1+n1+1) input matrix of the decoder by the temporary output matrix.

7. The method of claim 6, wherein:

there is a m2-n2 skip connection, which is a skip connection between layer m2 of the encoder and layer n2 of the decoder, with 1<=m1<m2<=L1, 1<=n2<n1<=L2; and the method further comprises processing all skip connections in an ascending order of layer index of the decoder such that the m2-n2 skip connection is processed before the m1–n1 skip connection.

8. The method of claim 6, further comprising:

for any n1 and the (k2+k3)-D layer-(L1+n1) output matrix of the decoder: performing a search among all L1 layers of the encoder to identify the m1 layer of the encoder which has an adjusted output matrix with a size matching the size of the layer-(L1+n1) output matrix of the decoder, in order to form the m1–n1 skip connection, wherein:

when no matching layer of the encoder is found, a best match is used for the m1-n1 skip connection, the best match m1 is a layer of the encoder with a minimum absolute difference between the size of its adjusted output matrix and the size of the layer-(L1+n1) output matrix of the decoder.

9. The method of claim 6, further comprising:

computing each element of the (k2+k3)-D adjusted layer-(m1) output matrix of the encoder as a characteristic value of a respective (k1–k2)-D sub-matrix of the (k1+k3)-D layer-(m1) output matrix of the encoder, wherein:

the characteristic value is an aggregate of the elements in the respective (k1–k2)-D submatrix, the aggregate comprises at least one of: mean, arithmetic mean, geometric mean, harmonic mean, weighted average, percentile, minimum (0-percentile), median (50-percentile), maximum (100-percentile), trimmed mean (mean of percentile from A1-percentile to A2-percentile), mode, sum, weighted sum, product or weighted product.

10. The method of claim 1, further comprising:

training the encoder and the decoder as part of a conditional generative adversarial network (cGAN) comprising a generator and a discriminator, wherein:

the generator comprises the encoder and the decoder with the at least one skip connection;

the k1-D imaging matrix is an input of the generator;

the k2-D output imaging matrix is an output of the generator; and the discriminator comprises:

the encoder with the k1-D imaging matrix as input and the (k2+k3)-D second intermediate matrix as output, an additional encoder with a k2-D supplementary input imaging matrix as input, and a full-connected network configured to compute a real-fake score.

11. The method of claim 10, further comprising:

training the cGAN with a cost function which is a weighted sum of a standard generative adversarial network (GAN) loss function and an additional cost function, wherein the additional cost function is at least one of:

a L-k loss function or a weighted L-k loss function between the k2-D output imaging matrix and the k2-D supplement input imaging matrix, with k being an integer, a visual loss function, a pre-trained perceptual loss function, a SSIM loss function, an image structural loss function, or an image-based loss function.

12. A system for encoder-decoder-based high resolution imaging, comprising:

a processor configured to assemble a k1-dimensional (k1-D) imaging matrix by arranging and concatenating a plurality of k2-dimensional (k2-D) input imaging matrices;

an encoder, which is a k1-D encoding neural network, configured to encode the k1-D imaging matrix to generate a (k1+k3)-D first intermediate matrix that includes k1 original dimensions of the k1-D imaging matrix and k3 expanded dimensions, wherein the processor is further configured to generate a (k2+k3)-D second intermediate matrix by removing (k1−k2) of the k1 original dimensions in the (k1+k3)-D first intermediate matrix, wherein each of k1, k2, k3 is a positive integer; and a decoder, which is a k2-D decoding neural network, configured to decode the (k2+k3)-D second intermediate matrix to generate a k2-D output imaging matrix, wherein:

there is at least one skip connection between the encoder and the decoder, and an imaging resolution of the k2-D output imaging matrix is greater than the imaging resolution of any one of the plurality of k2-D input imaging matrices.

13. The system of claim 12, wherein the processor is further configured to:

determine a (k1+k3)-D expanded matrix by adding k3 expanded dimensions to the k1 original dimensions of the k1-D imaging matrix, wherein:

a size of the (k1+k3)-D expanded matrix is 1 in each of the k3 expanded dimensions, the encoder comprises L1 layers, each associated with multiple convolution filters, the (k1+k3)-D expanded matrix is a (k1+k3)-D layer-1 input matrix to a layer 1 of the encoder, the first layer of the L1 layers of the encoder.

14. The system of claim 13, wherein the processor is further configured to:

for each n between 1 and L1:

for each respective convolution filter of the multiple convolution filters associated with layer n of the encoder:

filter a (k1+k3)-D layer-n input matrix with the respective convolution filter to generate a respective (k1+k3)-D layer-n per-filter output matrix, and down-sample the respective (k1+k3)-D layer-n per-filter output matrix in at least one of the k1 original dimensions with max-pooling; and concatenate all of the (k1+k3)-D layer-n per-filter output matrices to form a (k1+k3)-D layer-n output matrix which is also a layer-(n+1) input matrix, wherein:

a size of the layer-n output matrix in each of the k1 original dimensions is smaller than or equal to a size of a corresponding original dimension of the layer-n input matrix, a size of the layer-n output matrix in each of the k3 expanded dimensions is greater than or equal to a size of a corresponding expanded dimension of the layer-n input matrix, the (k1+k3)-D first intermediate matrix is the layer-(L1) output matrix, and a size of the (k1+k3)-D first intermediate matrix is 1 in each of the k1 original dimensions.

15. The system of claim 14, wherein:

the decoder comprises L2 layers, each associated with multiple de-convolution filters, the (k2+k3)-D second intermediate matrix is a (k2+k3)-D layer-(L1+1) input matrix to a layer 1 of the decoder, the first layer of the L2 layers of the decoder.

16. The system of claim 15, wherein the processor is further configured to:

for each m between 1 and L2:

up-sample a (k2+k3)-D layer-(L1+m) input matrix in at least one of the remaining k2 original dimensions to generate a (k2+k3)-D layer-(L1+m) up-sampled input matrix, for each respective de-convolution filter of the multiple de-convolution filters associated with layer m of the decoder, filter the (k2+k3)-D layer-(L1+m) up-sampled input matrix with the respective de-convolution filter to generate a respective (k2+k3)-D layer-(L1+m) per-filter output matrix, and combine and concatenate all of the (k2+k3)-D layer-(L1+m) per-filter output matrices to form a (k2+k3)-D layer-(L1+m) output matrix which is also a layer-(L1+m+1) input matrix, wherein:

a size of the layer-(L1+m) output matrix in each of the remaining k2 original dimensions is greater than or equal to a size of a corresponding original dimension of the layer-(L1+m) input matrix, a size of the layer-(L1+m) output matrix in each of the k3 expanded dimensions is less than or equal to a size of a corresponding expanded dimension of the layer-(L1+m) input matrix; and remove the k3 expanded dimensions of the layer-(L1+L2) output matrix to generate the k2-D output imaging matrix.

17. The system of claim 16, wherein the processor is further configured to:

process a m1−n1 skip connection, which is a skip connection between layer m1 of the encoder and layer n1 of the decoder, with 1<=m1<=L1, 1<=n1<=L2, wherein the m1−n1 skip connection is processed based on:

adjusting the (k1+k3)-D layer-(m1) output matrix of the encoder to generate a (k2+k3)-D adjusted layer-(m1) output matrix of the encoder, wherein the (k2+k3)-D adjusted layer-(m1) output matrix has a same dimension and a same size as the (k2+k3)-D layer-(L1+n1) output matrix of the decoder;

computing a temporary output matrix as a weighted average of the (k2+k3)-D adjusted layer-(m1) output matrix of the encoder and the (k2+k3)-D layer-(L1+n1) output matrix of the decoder; and replacing the (k2+k3)-D layer-(L1+n1+1) input matrix of the decoder by the temporary output matrix.

18. The system of claim 17, wherein:

there is a m2-n2 skip connection, which is a skip connection between layer m2 of the encoder and layer n2 of the decoder, with 1<=m1<m2<=L1, 1<=n2<n1<=L2; and the processor is further configured to process all skip connections in an ascending order of layer index of the decoder such that the m2-n2 skip connection is processed before the m1−n1 skip connection.

19. The system of claim 17, wherein the processor is further configured to:

for any n1 and the (k2+k3)-D layer-(L1+n1) output matrix of the decoder: perform a search among all L1 layers of the encoder to identify the m1 layer of the encoder which has an adjusted output matrix with a size matching the size of the layer-(L1+n1) output matrix of the decoder, in order to form the m1–n1 skip connection, wherein:

when no matching layer of the encoder is found, a best match is used for the m1-n1 skip connection, the best match m1 is a layer of the encoder with a minimum absolute difference between the size of its adjusted output matrix and the size of the layer-(L1+n1) output matrix of the decoder.

20. The system of claim 17, wherein the processor is further configured to:

compute each element of the (k2+k3)-D adjusted layer-(m1) output matrix of the encoder as a characteristic value of a respective (k1–k2)-D sub-matrix of the (k1+k3)-D layer-(m1) output matrix of the encoder, wherein:

the characteristic value is an aggregate of the elements in the respective (k1–k2)-D submatrix, the aggregate comprises at least one of: mean, arithmetic mean, geometric mean, harmonic mean, weighted average, percentile, minimum (0-percentile), median (50-percentile), maximum (100-percentile), trimmed mean (mean of percentile from A1-percentile to A2-percentile), mode, sum, weighted sum, product or weighted product.

21. The system of claim 12, wherein the processor is further configured to:

train the encoder and the decoder as part of a conditional generative adversarial network (cGAN) comprising a generator and a discriminator, wherein:

the generator comprises the encoder and the decoder with the at least one skip connection;

the k1-D imaging matrix is an input of the generator;

the k2-D output imaging matrix is an output of the generator; and the discriminator comprises:

the encoder with the k1-D imaging matrix as input and the (k2+k3)-D second intermediate matrix as output, an additional encoder with a k2-D supplementary input imaging matrix as input, and a full-connected network configured to compute a real-fake score.

22. The system of claim 21, wherein the processor is further configured to:

train the cGAN with a cost function which is a weighted sum of a standard generative adversarial network (GAN) loss function and an additional cost function, wherein the additional cost function is at least one of:

a L-k loss function or a weighted L-k loss function between the k2-D output imaging matrix and the k2-D supplement input imaging matrix, with k being an integer, a visual loss function, a pre-trained perceptual loss function, a SSIM loss function, an image structural loss function, or an image-based loss function.

23. A device for encoder-decoder-based high resolution imaging, comprising:

a processor; and a memory storing instructions, which when executed, cause the processor to perform operations comprising:

assembling a k1-dimensional (k1-D) imaging matrix by arranging and concatenating a plurality of k2-dimensional (k2-D) input imaging matrices, encoding the k1-D imaging matrix by an encoder, which is a k1-D encoding neural network, to generate a (k1+k3)-D first intermediate matrix that includes k1 original dimensions of the k1-D imaging matrix and k3 expanded dimensions, generating a (k2+k3)-D second intermediate matrix by removing (k1–k2) of the k1 original dimensions in the (k1+k3)-D first intermediate matrix, wherein each of k1, k2, k3 is a positive integer, and decoding the (k2+k3)-D second intermediate matrix using a decoder, which is a k2-D decoding neural network, to generate a k2-D output imaging matrix, wherein:

there is at least one skip connection between the encoder and the decoder, and an imaging resolution of the k2-D output imaging matrix is greater than the imaging resolution of any one of the plurality of k2-D input imaging matrices.

24. The device of claim 23, wherein the operations further comprise:

determining a (k1+k3)-D expanded matrix by adding k3 expanded dimensions to the k1 original dimensions of the k1-D imaging matrix, wherein:

a size of the (k1+k3)-D expanded matrix is 1 in each of the k3 expanded dimensions, the encoder comprises L1 layers, each associated with multiple convolution filters, the (k1+k3)-D expanded matrix is a (k1+k3)-D layer-1 input matrix to a layer 1 of the encoder, the first layer of the L1 layers of the encoder.

25. The device of claim 24, wherein the operations further comprise:

for each n between 1 and L1:

for each respective convolution filter of the multiple convolution filters associated with layer n of the encoder:

filtering a (k1+k3)-D layer-n input matrix with the respective convolution filter to generate a respective (k1+k3)-D layer-n per-filter output matrix, and down-sampling the respective (k1+k3)-D layer-n per-filter output matrix in at least one of the k1 original dimensions with max-pooling; and concatenating all of the (k1+k3)-D layer-n per-filter output matrices to form a (k1+k3)-D layer-n output matrix which is also a layer-(n+1) input matrix, wherein:

a size of the layer-n output matrix in each of the k1 original dimensions is smaller than or equal to a size of a corresponding original dimension of the layer-n input matrix, a size of the layer-n output matrix in each of the k3 expanded dimensions is greater than or equal to a size of a corresponding expanded dimension of the layer-n input matrix, the (k1+k3)-D first intermediate matrix is the layer-(L1) output matrix, and a size of the (k1+k3)-D first intermediate matrix is 1 in each of the k1 original dimensions.

26. The device of claim 25, wherein:

the decoder comprises L2 layers, each associated with multiple de-convolution filters, the (k2+k3)-D second intermediate matrix is a (k2+k3)-D layer-(L1+1) input matrix to a layer 1 of the decoder, the first layer of the L2 layers of the decoder.

27. The device of claim 26, wherein the operations further comprise:

for each m between 1 and L2:

up-sampling a (k2+k3)-D layer-(L1+m) input matrix in at least one of the remaining k2 original dimensions to generate a (k2+k3)-D layer-(L1+m) up-sampled input matrix, for each respective de-convolution filter of the multiple de-convolution filters associated with layer m of the decoder, filtering the (k2+k3)-D layer-(L1+m) up-sampled input matrix with the respective de-convolution filter to generate a respective (k2+k3)-D layer-(L1+m) per-filter output matrix, and combining and concatenating all of the (k2+k3)-D layer-(L1+m) per-filter output matrices to form a (k2+k3)-D layer-(L1+m) output matrix which is also a layer-(L1+m+1) input matrix, wherein:

a size of the layer-(L1+m) output matrix in each of the remaining k2 original dimensions is greater than or equal to a size of a corresponding original dimension of the layer-(L1+m) input matrix, a size of the layer-(L1+m) output matrix in each of the k3 expanded dimensions is less than or equal to a size of a corresponding expanded dimension of the layer-(L1+m) input matrix; and removing the k3 expanded dimensions of the layer-(L1+L2) output matrix to generate the k2-D output imaging matrix.

28. The device of claim 27, wherein the operations further comprise:

processing a m1–n1 skip connection, which is a skip connection between layer m1 of the encoder and layer n1 of the decoder, with 1<=m1<=L1, 1<=n1<=L2, wherein the m1–n1 skip connection is processed based on:

adjusting the (k1+k3)-D layer-(m1) output matrix of the encoder to generate a (k2+k3)-D adjusted layer-(m1) output matrix of the encoder, wherein the (k2+k3)-D adjusted layer-(m1) output matrix has a same dimension and a same size as the (k2+k3)-D layer-(L1+n1) output matrix of the decoder;

computing a temporary output matrix as a weighted average of the (k2+k3)-D adjusted layer-(m1) output matrix of the encoder and the (k2+k3)-D layer-(L1+n1) output matrix of the decoder; and replacing the (k2+k3)-D layer-(L1+n1+1) input matrix of the decoder by the temporary output matrix.

29. The device of claim 28, wherein:

there is a m2-n2 skip connection, which is a skip connection between layer m2 of the encoder and layer n2 of the decoder, with 1<=m1<m2<=L1, 1<=n2<n1<=L2; and the operations further comprise processing all skip connections in an ascending order of layer index of the decoder such that the m2-n2 skip connection is processed before the m1–n1 skip connection.

30. The device of claim 29, wherein the operations further comprise:

for any n1 and the (k2+k3)-D layer-(L1+n1) output matrix of the decoder: performing a search among all L1 layers of the encoder to identify the m1 layer of the encoder which has an adjusted output matrix with a size matching the size of the layer-(L1+n1) output matrix of the decoder, in order to form the m1–n1 skip connection, wherein:

when no matching layer of the encoder is found, a best match is used for the m1-n1 skip connection, the best match m1 is a layer of the encoder with a minimum absolute difference between the size of its adjusted output matrix and the size of the layer-(L1+n1) output matrix of the decoder.

*   *   *   *   *